(12) United States Patent
Jiang

(10) Patent No.: US 12,474,435 B2
(45) Date of Patent: Nov. 18, 2025

(54) ANGLE PROCESSING METHOD AND APPARATUS, AND COMMUNICATION DEVICE

(71) Applicant: Beijing Xiaomi Mobile Software Co., Ltd., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 269 days.

(21) Appl. No.: 18/252,828

(22) PCT Filed: Nov. 13, 2020

(86) PCT No.: PCT/CN2020/128865
§ 371 (c)(1),
(2) Date: May 12, 2023

(87) PCT Pub. No.: WO2022/099663
PCT Pub. Date: May 19, 2022

(65) Prior Publication Data
US 2023/0417864 A1  Dec. 28, 2023

(51) Int. Cl.
*G01S 5/04* (2006.01)
(52) U.S. Cl.
CPC ..................... *G01S 5/04* (2013.01)
(58) Field of Classification Search
CPC ....... H04W 4/38; H04W 72/04; H04W 64/00; H04W 68/00; H04W 88/08; H04W 24/10; H04W 4/02; H04W 4/025; H04W 8/22; G01S 7/006; G01S 13/865; G01S 13/867; G01S 13/91; G01S 13/931
See application file for complete search history.

(56) References Cited

U.S. PATENT DOCUMENTS

| | | | | |
|---|---|---|---|---|
| 11,619,702 | B2* | 4/2023 | Gummadi | G01S 5/10 342/378 |
| 11,630,181 | B2* | 4/2023 | Edge | H04W 8/22 455/456.1 |
| 2014/0128087 | A1* | 5/2014 | Zhang | G01S 5/0236 455/450 |
| 2015/0133157 | A1* | 5/2015 | Xiao | G01S 5/06 455/456.1 |
| 2016/0007222 | A1* | 1/2016 | Siomina | H04W 24/02 370/252 |
| 2016/0227373 | A1* | 8/2016 | Tsai | G01S 5/0072 |

(Continued)

FOREIGN PATENT DOCUMENTS

| | | |
|---|---|---|
| CN | 101232414 A | 7/2008 |
| CN | 101998626 A | 3/2011 |

(Continued)

OTHER PUBLICATIONS

"NR positioning measurements," Proceedings of the 3GPP TSG RAN WG1 Meeting #98bis, Huawei, HiSilicon, R1-1910035, Oct. 14, 2019, Chongqing, China, 19 pages.

*Primary Examiner* — Peter M Bythrow
(74) *Attorney, Agent, or Firm* — McCoy Russell LLP

(57) ABSTRACT

An angle processing method includes: sending an angle measurement capability request message to a second terminal; receiving a response message carrying angle measurement capability information of the second terminal fed back by the second terminal.

18 Claims, 6 Drawing Sheets

(56) References Cited

U.S. PATENT DOCUMENTS

| | | | | |
|---|---|---|---|---|
| 2016/0309472 A1* | 10/2016 | Yong | .................... | H04W 76/14 |
| 2018/0048742 A1* | 2/2018 | Venkatesan | ............. | H04W 4/02 |
| 2018/0218607 A1* | 8/2018 | Baghel | .................... | G08G 1/162 |
| 2019/0373572 A1* | 12/2019 | Cui | ........................ | G01S 5/0236 |
| 2020/0084278 A1* | 3/2020 | Cheng | ..................... | H04W 4/44 |
| 2020/0333424 A1* | 10/2020 | Shi | ........................... | H04W 4/02 |
| 2021/0048502 A1* | 2/2021 | Gummadi | .............. | G01S 5/0226 |
| 2021/0258920 A1* | 8/2021 | Baghel | .............. | H04W 74/0808 |
| 2022/0155435 A1* | 5/2022 | Bayesteh | ................. | G01S 13/88 |
| 2022/0291324 A1* | 9/2022 | Chen | ..................... | H04W 4/029 |
| 2022/0390546 A1* | 12/2022 | Cha | ....................... | H04W 64/00 |
| 2023/0086144 A1* | 3/2023 | Roy | ................. | H04W 74/0808 370/329 |
| 2023/0146061 A1* | 5/2023 | Kassir | ................... | H04W 24/10 342/59 |
| 2023/0324541 A1* | 10/2023 | Zorgui | .................... | H04W 4/38 455/456.1 |
| 2023/0366976 A1* | 11/2023 | Manolakos | ........... | G01S 5/0236 |

FOREIGN PATENT DOCUMENTS

| | | | |
|---|---|---|---|
| CN | 102215450 A | 10/2011 | |
| CN | 110022523 A | 7/2019 | |
| WO | 2018080597 A1 | 5/2018 | |

* cited by examiner

ANGLE PROCESSING METHOD AND APPARATUS, AND COMMUNICATION DEVICE

CROSS REFERENCE TO RELATED APPLICATION

The present application is a U.S. National Phase of International Application No. PCT/CN2020/128865 entitled "ANGLE MEASUREMENT PROCESSING METHOD AND APPARATUS, AND COMMUNICATION DEVICE," and filed on Nov. 13, 2020. The entire contents of the above-listed application are hereby incorporated by reference for all purposes.

BACKGROUND

During positioning for communication devices, distance measurement between the devices is of great significance for the positioning, where distance measurement service between the communication devices is usually realized on the basis of relative angles and a relative distance between the devices; referring to FIG. 1, when the communication devices are a transmitter and a receiver, the relative angles include an angle of arrival (AOA) and an angle of departure (AOD); and continuing to refer to FIG. 1, the AOA represents an included angle between a receiving signal and a receiver antenna, and the AOD represents an included angle between a transmitting signal and a transmitter antenna.

SUMMARY

The present disclosure relates to the technical field of mobile communications, and in particular to an angle measuring processing method and apparatus, and a communication device.

An example in a first aspect of the present disclosure provides an angle measuring processing method, where the method is performed by a first terminal, and includes: transmitting an angle measuring capability request message to a second terminal; and receiving a response message carrying angle measuring capability information of the second terminal and fed back by the second terminal.

An example in a second aspect of the present disclosure provides an angle measuring processing method, where the method is performed by a second terminal, and includes: receiving an angle measuring capability request message transmitted by a first terminal; and feeding back a response message carrying angle measuring capability information of the second terminal to the first terminal.

An example in a third aspect of the present disclosure provides a communication device, where the communication device includes a processor, a transceiver, a memory, and a computer program stored in the memory, and the processor runs the computer program to realize the angle measuring processing method provided by the example in the first aspect.

An example in a fourth aspect of the present disclosure provides a communication device, where the communication device includes a processor, a transceiver, a memory, and a computer program stored in the memory, and the processor runs the computer program to realize the angle measuring processing method provided by the example in the second aspect.

An example in a fifth aspect of the present disclosure provides a non-transitory processor-readable storage medium, where a computer program is stored in the processor-readable storage medium, and used for enabling the processor to execute the angle measuring processing method provided by the example in the first aspect, or the angle measuring processing method provided by the example in the second aspect.

Additional aspects and advantages of the present disclosure will be partially given in the following description, and will partially become apparent from the following description or be learned from the practice of the present disclosure.

BRIEF DESCRIPTION OF THE DRAWINGS

The above and/or additional aspects and advantages of the present disclosure will become apparent and understandable from the description for the examples in conjunction with the drawings, where.

DETAILED DESCRIPTION

Figure 1:
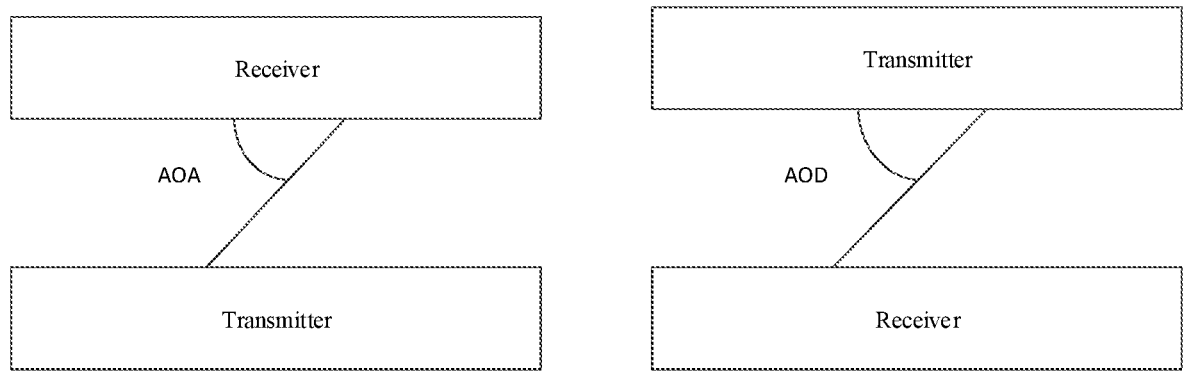
FIG. 1 is a schematic diagram of a relative angle of communication between devices according to an example of the present disclosure.

The examples of the present disclosure are described in detail below, samples of the examples are shown in the drawings, where the same or similar labels throughout represent the same or similar elements or elements with the same or similar functions. The examples described below with reference to the drawings are exemplary, are intended to explain the present disclosure, and cannot be understood as limitations to the present disclosure.

Figure 2:
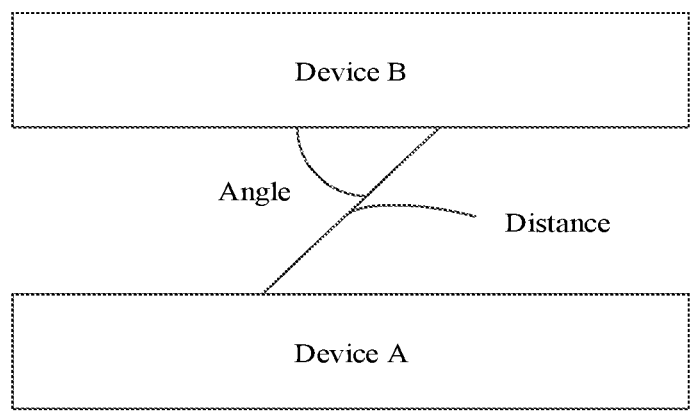
FIG. 2 is a schematic diagram of a relative angle of communication between devices according to another example of the present disclosure.

In the related art, a relative position between the two communication devices may be determined through a combination of the relative distance and the relative angles. As shown in FIG. 2, a communication device A may determine a relative position of a communication device B relative to the device A by obtaining a relative distance between the communication device A and the communication device B, and an angle of arrival (AOA) of a signal arrived at the communication device A, of the communication device B (or an angle of departure (AOD) of a signal transmitted by the communication device A).

Figure 3:
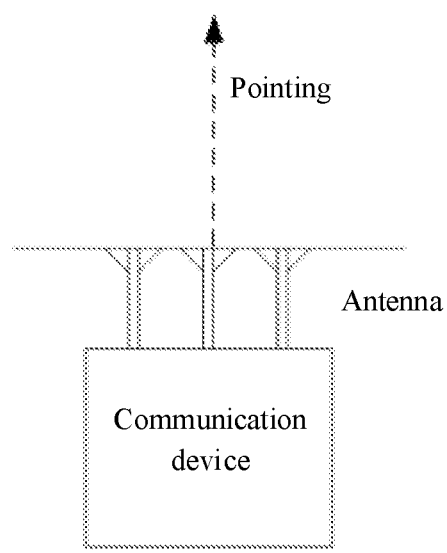
FIG. 3 is a schematic diagram of a normal vector direction of a communication device according to an example of the present disclosure.

In the related art, during distance measurement between communication devices, angle measuring processing needs to be carried out on the communication devices to obtain a relative angle between the communication devices, where the relative angle is determined according to a pointing direction of each communication device, and as shown in FIG. 3, the pointing direction may be understood as the normal vector direction of the communication device. The angle measuring processing is of great significance for distance measurement and positioning in the field of mobile communications.

Figure 4:
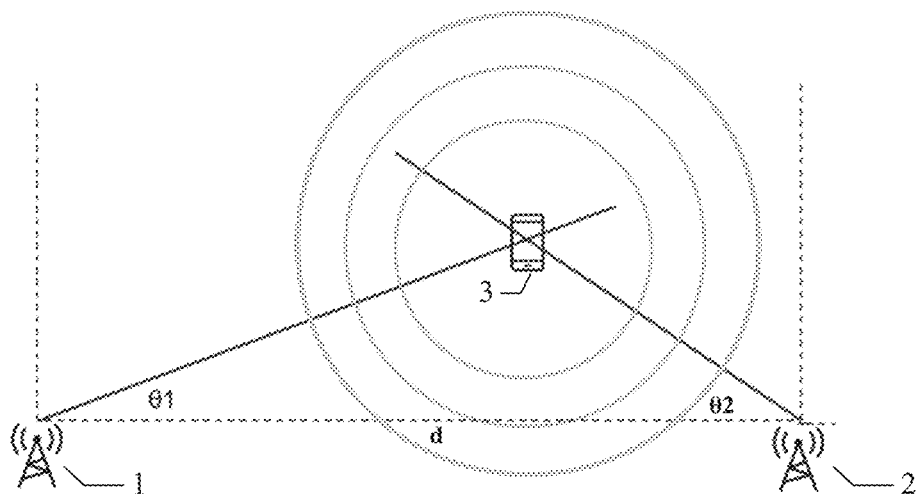
FIG. 4 is a schematic diagram of a positioning scene based on angle measuring according to an example of the present disclosure.

In order to enable those skilled in the art to have a clearer understanding of how to position on the basis of the angle measuring processing, it is described below by taking a positioning scene according to an AOA angle as an example, referring to FIG. 4, in the positioning scene, a transmitter is a mobile phone 3, receivers are a base station 1 and a base station 2, then an included angle between the base station 1 and the mobile phone 3, and an included angle between the base station 2 and the mobile phone 3 are θ1 and θ2, respectively, and a relative distance between the base station 1 and the base station 2 is d, then a position of the mobile phone 3 may be positioned on the basis of a trigonometric distance measurement method.

On the basis of the above description, the angle measuring processing is of great significance for the distance measurement and positioning scene, in the related art, for the angle measuring processing between two terminal devices, an angle measuring manner for each terminal device is usually directly specified, such as AOD or AOA, and displaying for angle measuring capability is ignored, so that angle measuring failure is directly caused when the angle measuring capability and the angle measuring manner of the terminal device are not matched, and then the scene need for distance measurement and positioning is influenced.

With regard to the problem, the examples of the present disclosure provide an angle measuring processing method and apparatus, and a communication device, where the communication devices may be understood as a first terminal and a second terminal in the examples of the present disclosure, the first terminal and the second terminal may be one and the other of a transmitter and a receiver in a communication scene, respectively, where the transmitter may be understood as a signal transmitting side, the receiver may be understood as a signal receiving side, and whether the transmitter or the receiver may be one of terminal devices such as a mobile phone, and base stations.

For convenience of the description, the following focuses on a first terminal side to describe the angle measuring processing method in the examples of the present disclosure.

Figure 5:
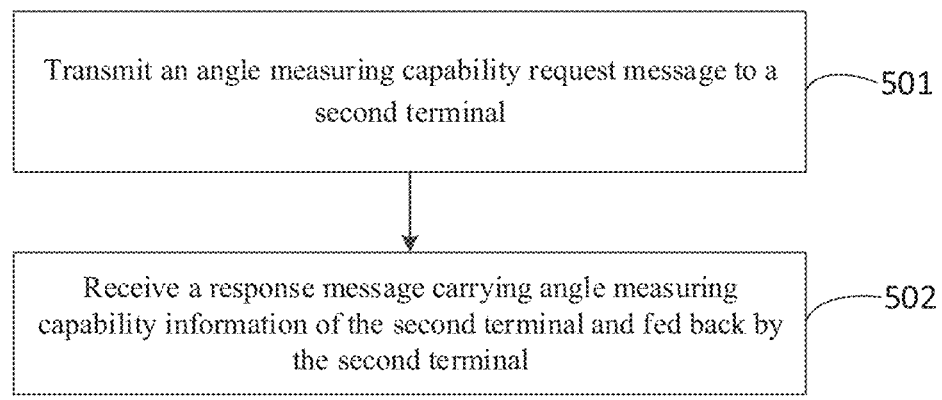
FIG. 5 is a flow diagram of an angle measuring processing method according to an example of the present disclosure.

FIG. 5 is a flow diagram of an angle measuring processing method according to an example of the present disclosure, where the method is performed by a first terminal, and includes:

step 501, transmitting an angle measuring capability request message to a second terminal.

Figure 6A:
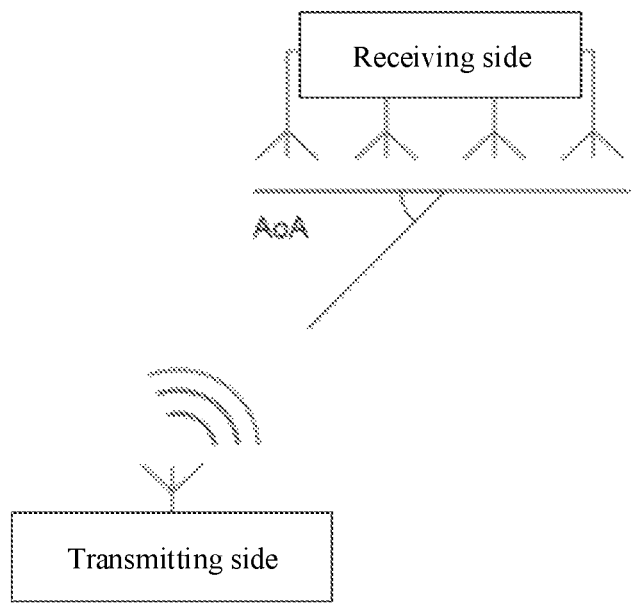
FIG. 6(a) is a schematic diagram of an angle measuring calculation scene according to an example of the present disclosure.
Figure 6B:
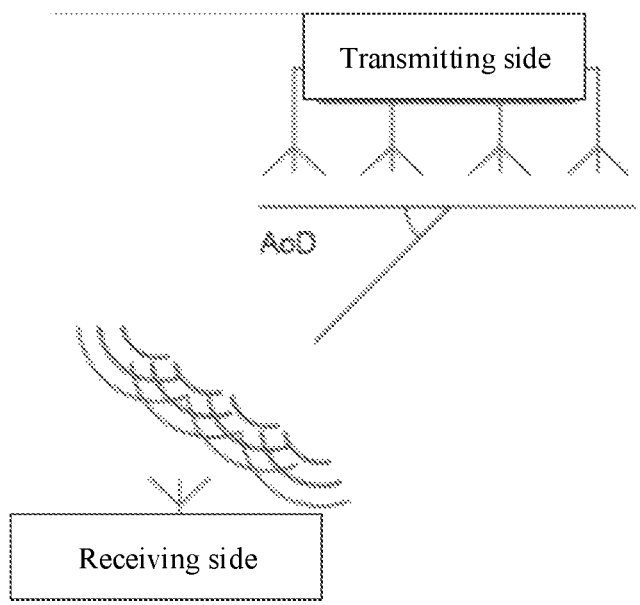
FIG. 6(b) is a schematic diagram of an angle measuring calculation scene according to another example of the present disclosure.

In consideration of that in an actual execution process, in order to realize measurement for an angle of arrival, a receiving side for signals needs to have at least two antennas, while a transmitting side may only have one antenna. In an angle measuring manner for the angle of arrival, referring to FIG. 6 (a), the receiving side uses a plurality of signals received for calculating an angle of a signal source. Similarly, referring to FIG. 6 (b), in an angle measuring manner for an angle of departure, the transmitting side is required to have at least two antennas. The receiving side may only have one antenna, receive a plurality of signals, and calculate an angle of a signal source.

In specific angle measuring calculation, in the angle measuring manner for the angle of arrival, for example, a device with a multi-antenna linear array is taken as the receiving side, and another device with a single antenna is taken as the transmitting side, and it is assumed that a radio wave is a planar wave surface rather than a spherical surface. If the transmitting side transmitting a sine wave in the air is located on a normal perpendicular to an array line, each antenna in the array receives an input signal with the same phase. If the transmitter is not located on the normal, the receiving antennas measure a phase difference between channels, and use phase difference information for estimating the angle of arrival.

In the angle measuring manner for the angle of departure, a basic principle for measuring a phase difference is the same. In the angle measuring manner for the angle of departure, the tracked receiving side only uses a single antenna, while the transmitting side uses a plurality of antennas. In the angle measuring manner for the angle of departure, for example, the transmitting side such as a Bluetooth positioning beacon transmits a signal through an antenna array, while the receiving side such as a smart phone uses a single antenna for receiving the signal, and decodes the signal to calculate a relative signal direction.

Therefore, when the first terminal and the second terminal negotiates the angle measuring, the basis of the negotiation is the angle measuring capabilities of the first terminal and the second terminal, and the purpose of the negotiation is to determine a respective subject type (the receiving side or the transmitting side) of the first terminal and the second terminal in the angle measuring manner, etc, therefore, the first terminal transmits an angle measuring capability request message to the second terminal, the angle measuring capability request message may be any predetermined information that may indicate the angle measuring negotiation, and the following provides examples for describing a specific content of the angle measuring capability request message:

Example 1

In the example, the angle measuring capability request message includes angle measuring capability information of the first terminal, that is, the first terminal first transmits the own angle measuring capability information to the second terminal, so that the second terminal negotiates an angle measuring manner with the first terminal according to the angle measuring capability information.

The angle measuring capability information of the first terminal may include but is not limited to the following manners:

1) the angle measuring capability information includes whether serving as the transmitting side for the angle of arrival (AOA) measurement is supported or not, that is, whether serving as a single antenna of the transmitting side for the angle of arrival (AOA) measurement is supported or not, etc.

In an example, in the angle measuring capability information, pre-set codes may be adopted for indicating whether serving as the transmitting side for the angle of arrival (AOA) measurement is supported or not, for example, a code 'XXX1' indicates that serving as the transmitting side for the angle of arrival (AOA) measurement is supported, and a code 'XXX0' indicates that serving as the transmitting side for the angle of arrival (AOA) measurement is not supported; and certainly, in the angle measuring capability information, pre-set character keywords may be adopted for indicating whether serving as the transmitting side for the angle of arrival (AOA) measurement is supported or not, such as 'supporting AOA transmitting', and 'not supporting AOA transmitting', etc.

2) The angle measuring capability information includes whether serving as the receiving side for the angle of arrival (AOA) measurement is supported or not, that is, whether serving as a plurality of antennas of the receiving side for the angle of arrival (AOA) measurement is supported or not, etc.

In an example, in the angle measuring capability information, pre-set codes may be adopted for indicating whether serving as the receiving side for the angle of arrival (AOA) measurement is supported or not, for example, a code 'XX1X' indicates that serving as the receiving side for the angle of arrival (AOA) measurement is supported, and a code 'XX0X' indicates that serving as the receiving side for the angle of arrival (AOA) measurement is not supported; and certainly, in the angle measuring capability information, pre-set character keywords may be adopted for indicating whether serving as the receiving side for the angle of arrival (AOA) measurement is supported or not, such as 'supporting AOA receiving', and 'not supporting AOA receiving', etc.

3) The angle measuring capability information includes whether serving as the transmitting side for the angle of departure (AOD) measurement is supported or not, that is, whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of departure (AOD) measurement is supported or not, for example, a code 'X1XX' indicates that serving as the transmitting side for the angle of departure (AOD) measurement is supported, and a code 'X0XX' indicates that serving as the transmitting side for the angle of departure (AOD) measurement is not supported; and certainly, in the angle measuring capability information, pre-set character keywords may be adopted for indicating whether serving as the transmitting side for the angle of departure (AOD) measurement is supported or not, such as 'supporting AOD transmitting', and 'not supporting AOD transmitting', etc.

4) The angle measuring capability information includes whether serving as the receiving side for the angle of departure (AOD) measurement is supported or not, that is, whether serving as a single antenna of the receiving side for the angle of departure (AOD) measurement is supported or not, etc.

In an example, in the angle measuring capability information, pre-set codes may be adopted for indicating whether serving as the receiving side for the angle of departure (AOD) measurement is supported or not, for example, a code '1XXX' indicates that serving as the receiving side for the angle of departure (AOD) measurement is supported, and a code '0XXX' indicates that serving as the receiving side for the angle of departure (AOD) measurement is not supported; and certainly, in the angle measuring capability information, pre-set character keywords may be adopted for indicating whether serving as the receiving side for the angle of departure (AOD) measurement is supported or not, such as 'supporting AOD receiving', and 'not supporting AOD receiving', etc.

5) The angle measuring capability information includes whether serving as the transmitting side for the angle of arrival (AOA) measurement is supported or not, and whether serving as the receiving side for the angle of arrival (AOA) measurement is supported or not, that is, whether serving as a single antenna of the transmitting side for the angle of arrival (AOA) measurement is supported or not, and whether serving as a plurality of antennas of the receiving side for the angle of arrival (AOA) measurement is supported or not, etc.

In an example, in the angle measuring capability information, pre-set codes may be adopted for indicating whether serving as the transmitting side for the angle of arrival (AOA) measurement and serving as the receiving side for the angle of arrival (AOA) measurement are supported or not, for example, a code 'XX01' indicates that serving as the transmitting side for the angle of arrival (AOA) measurement is supported and serving as the receiving side for the angle of arrival (AOA) measurement is not supported, a code 'XX11' indicates that serving as the transmitting side for the angle of arrival (AOA) measurement is supported and serving as the receiving side for the angle of arrival (AOA) measurement is supported, a code 'XX10' indicates that serving as the transmitting side for the angle of arrival (AOA) measurement is not supported and serving as the receiving side for the angle of arrival (AOA) measurement is supported, and a code 'XX00' indicates that serving as the transmitting side for the angle of arrival (AOA) measurement is not supported and serving as the receiving side for the angle of arrival (AOA) measurement is not supported; and certainly, in the angle measuring capability information, pre-set character keywords may be adopted for indicating whether serving as the transmitting side for the angle of arrival (AOA) measurement and serving as the receiving side for the angle of arrival (AOA) measurement are supported or not, such as 'supporting AOA transmitting and receiving', and 'not supporting AOA transmitting and supporting AOA receiving', etc.

6) The angle measuring capability information includes whether serving as the transmitting side for the angle of arrival (AOA) measurement is supported or not, and whether serving as the transmitting side for the angle of departure (AOD) measurement is supported or not, that is, whether serving as a single antenna of the transmitting side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of arrival (AOA) measurement and serving as the transmitting side for the angle of departure (AOD) measurement are supported or not, for example, a code 'X0X1' indicates that serving as the transmitting side for the angle of arrival (AOA) measurement is supported and serving as the transmitting side for the angle of departure (AOD) measurement is not supported, a code 'X1X1' indicates that serving as the transmitting side for the angle of arrival (AOA) measurement is supported and serving as the transmitting side for the angle of departure (AOD) measurement is supported, a code 'X1X0' indicates that serving as the transmitting side for the angle of arrival (AOA) measurement is not supported and serving as the transmitting side for the angle of departure (AOD) measurement is supported, and a code 'X0X0' indicates that serving as the transmitting side for the angle of arrival (AOA) measurement is not supported and serving as the transmitting side for the angle of departure (AOD) measurement is not supported; and certainly, in the angle measuring capability information, pre-set character keywords may be adopted for indicating whether serving as the transmitting side for the angle of arrival (AOA) measurement and serving as the transmitting side for the angle of departure (AOD) measurement are supported or not, such as 'supporting AOA transmitting and AOD transmitting', and 'not supporting AOA transmitting and AOD transmitting', etc.

7) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of arrival (AOA) measurement and serving as the receiving side for the angle of departure (AOD) measurement are supported or not, for example, a code '0XX1' indicates that serving as the transmitting side for the angle of arrival (AOA) measurement is supported and serving as the receiving side for the angle of departure (AOD) measurement is not supported, a code '1XX1' indicates that serving as the transmitting side for the angle of arrival (AOA) measurement is supported and serving as the receiving side for the angle of departure (AOD) measurement is supported, a code '1XX0' indicates that serving as the transmitting side for the angle of arrival (AOA) measurement is not supported and serving as the receiving side for the angle of departure (AOD) measurement is supported, and a code '0XX0' indicates that serving as the transmitting side for the angle of arrival (AOA) measurement is not supported and serving as the receiving side for the angle of departure (AOD) measurement is not supported; and certainly, in the angle measuring capability information, pre-set character keywords may be adopted for indicating whether serving as the transmitting side for the angle of arrival (AOA) measurement and serving as the receiving side for the angle of departure (AOD) measurement are supported or not, such as 'supporting AOA transmitting and AOD receiving', and 'not supporting AOA transmitting and AOD receiving', etc.

8) The angle measuring capability information includes whether serving as the transmitting side and the receiving side for the angle of arrival (AOA) measurement is supported or not, and whether serving as the transmitting side and the receiving side for the angle of departure (AOD) measurement is supported or not, that is, whether serving as a single antenna of the transmitting side for the angle of arrival (AOA) measurement and serving as a plurality of antennas of the receiving side are supported or not, and whether serving as a single antenna of the receiving side for the angle of departure (AOD) measurement and serving as a plurality of antennas of the transmitting side are supported or not, etc.

In an example, in the angle measuring capability information, pre-set codes may be adopted for indicating whether serving as the transmitting side and the receiving side for the angle of arrival (AOA) measurement and serving as the transmitting side and the receiving side for the angle of departure (AOD) measurement are supported or not, for example, a code '0001' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is not supported, a code '0011' indicates that serving as the transmitting side and the receiving side for the angle of arrival (AOA) measurement is supported, serving as the receiving side for the angle of departure (AOD) measurement is not supported, and serving as the transmitting side for the angle of departure (AOD) measurement is not supported, a code '1001' indicates that serving as the transmitting side for the angle of arrival (AOA) measurement is supported, serving as the receiving side for the angle of arrival (AOA) measurement is not supported, serving as the receiving side for the angle of departure (AOD) measurement is supported, and serving as the transmitting side for the angle of departure (AOD) measurement is not supported, and a code '0101' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement is supported or not, and whether serving as the transmitting side and the receiving side for the angle of departure (AOD) measurement is supported or not, such as 'supporting AOA transmitting and receiving, and not supporting AOD transmitting and AOD receiving', and 'not supporting AOA transmitting and receiving, and not supporting AOD transmitting and AOD receiving', etc.

9) The angle measuring capability information includes whether serving as the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the receiving side for the angle of arrival (AOA) measurement and serving as the transmitting side for the angle of departure (AOD) measurement are supported or not, for example, a code 'X01X' indicates that serving as the receiving side for the angle of arrival (AOA) measurement is supported and serving as the transmitting side for the angle of departure (AOD) measurement is not supported, a code 'X11X' indicates that serving as the receiving side for the angle of arrival (AOA) measurement is supported and serving as the transmitting side for the angle of departure (AOD) measurement is supported, a code 'X00X' indicates that serving as the receiving side for the angle of arrival (AOA) measurement is not supported and serving as the transmitting side for the angle of departure (AOD) measurement is not supported, and a code 'X10X' indicates that serving as the receiving side for the angle of arrival (AOA) measurement is not supported and serving as the transmitting side for the angle of departure (AOD) measurement is supported; and certainly, in the angle measuring capability information, pre-set character keywords may be adopted for indicating whether serving as the receiving side for the angle of arrival (AOA) measurement and serving as the transmitting side for the angle of departure (AOD) measurement are supported or not, such as 'supporting AOA receiving and AOD transmitting', and 'not supporting AOA receiving and AOD transmitting', etc.

10) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the receiving side for the angle of arrival (AOA) measurement and serving as the receiving side for the angle of departure (AOD) measurement are supported or not, for example, a code '0X1X' indicates that serving as the receiving side for the angle of arrival (AOA) measurement is supported and serving as the receiving side for the angle of departure (AOD) measurement is not supported, a code '0X0X' indicates that serving as the receiving side for the angle of arrival (AOA) measurement is not supported and serving as the receiving side for the angle of departure (AOD) measurement is not supported, a code '1X1X' indicates that serving as the receiving side for the angle of arrival (AOA) measurement is supported and serving as the receiving side for the angle of departure (AOD) measurement is supported, and a code '1X0X' indicates that serving as the receiving side for the angle of arrival (AOA) measurement is not supported and serving as the receiving side for the angle of departure (AOD) measurement is supported; and certainly, in the angle measuring capability information, pre-set character keywords may be adopted for indicating whether serving as the receiving side for the angle of arrival (AOA) measurement and serving as the receiving side for the angle of departure (AOD) measurement are supported or not, such as 'supporting AOA receiving and AOD receiving', and 'not supporting AOA receiving and AOD receiving', etc.

11) The angle measuring capability information includes whether serving as the transmitting side and the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement and serving as a single antenna of the transmitting side are supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the transmitting side for the angle of departure (AOD) measurement are supported or not, for example, a code 'X111' indicates that serving as the receiving side for the angle of arrival (AOA) measurement is supported, serving as the transmitting side for the angle of arrival (AOA) measurement is supported, and serving as the transmitting side for the angle of departure (AOD) measurement is supported, a code 'X011' indicates that serving as the receiving side for the angle of arrival (AOA) measurement is supported, serving as the transmitting side for the angle of arrival (AOA) measurement is supported, and serving as the transmitting side for the angle of departure (AOD) measurement is not supported, a code 'X010' indicates that serving as the receiving side for the angle of arrival (AOA) measurement is supported, serving as the transmitting side for the angle of arrival (AOA) measurement is not supported, and serving as the transmitting side for the angle of departure (AOD) measurement is not supported, and a code 'X101' indicates that serving as the receiving side for the angle of arrival (AOA) measurement is not supported, serving as the transmitting side for the angle of arrival (AOA) measurement is supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the transmitting side for the angle of departure (AOD) measurement are supported or not, such as 'supporting AOA receiving and transmitting, and supporting AOD transmitting', and 'not supporting AOA receiving, and supporting AOA transmitting and AOD transmitting', etc.

12) The angle measuring capability information includes whether serving as the transmitting side and the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement and serving as a single antenna of the transmitting side are supported or not, and whether serving as a single antenna of the receiving side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the receiving side for the angle of departure (AOD) measurement are supported or not, for example, a code '1X11' indicates that serving as the receiving side for the angle of arrival (AOA) measurement is supported, serving as the transmitting side for the angle of arrival (AOA) measurement is supported, and serving as the receiving side for the angle of departure (AOD) measurement is supported, a code '0X11' indicates that serving as the receiving side for the angle of arrival (AOA) measurement is supported, serving as the transmitting side for the angle of arrival (AOA) measurement is supported, and serving as the receiving side for the angle of departure (AOD) measurement is not supported, '1X01' indicates that serving as the receiving side for the angle of arrival (AOA) measurement is not supported, serving as the transmitting side for the angle of arrival (AOA) measurement is supported, and serving as the receiving side for the angle of departure (AOD) measurement is supported, and '1X00' indicates that serving as the receiving side for the angle of arrival (AOA) measurement is not supported, serving as the transmitting side for the angle of arrival (AOA) measurement is not supported, and serving as the receiving side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the receiving side for the angle of departure (AOD) measurement are supported or not, such as 'supporting AOA receiving and transmitting, and supporting AOD receiving', and 'not supporting AOA receiving, and supporting AOA transmitting and AOD receiving', etc.

13) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the receiving side for the angle of arrival (AOA) measurement and serving as the transmitting side and the receiving side for the angle of departure (AOD) measurement are supported or not, for example, a code '111X' indicates that serving as the receiving side for the angle of arrival (AOA) measurement is supported, serving as the transmitting side for the angle of departure (AOD) measurement is supported, and serving as the receiving side for the angle of departure (AOD) measurement is supported, a code '011X' indicates that serving as the receiving side for the angle of arrival (AOA) measurement is supported, serving as the transmitting side for the angle of departure (AOD) measurement is supported, and serving as the receiving side for the angle of departure (AOD) measurement is not supported, a code '100X' indicates that serving as the receiving side for the angle of arrival (AOA) measurement is not supported, serving as the transmitting side for the angle of departure (AOD) measurement is not supported, and serving as the receiving side for the angle of departure (AOD) measurement is supported, and a code '000X' indicates that serving as the receiving side for the angle of arrival (AOA) measurement is not supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the receiving side for the angle of arrival (AOA) measurement is supported or not, and whether serving as the transmitting side and the receiving side for the angle of departure (AOD) measurement is supported or not, such as 'supporting AOA receiving, and supporting AOD transmitting and receiving', and 'supporting AOA receiving, and not supporting AOD transmitting and AOD receiving', etc.

14) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the transmitting side for the angle of arrival (AOA) measurement and serving as the transmitting side and the receiving side for the angle of departure (AOD) measurement are supported or not, for example, a code '11X1' indicates that serving as the transmitting side for the angle of arrival (AOA) measurement is supported, serving as the transmitting side for the angle of departure (AOD) measurement is supported, and serving as the receiving side for the angle of departure (AOD) measurement is supported, a code '10X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is supported, a code '01X1' indicates that serving as the transmitting side for the angle of arrival (AOA) measurement is supported, serving as the transmitting side for the angle of departure (AOD) measurement is supported, and serving as the receiving side for the angle of departure (AOD) measurement is not supported, and a code '00X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the transmitting side for the angle of arrival (AOA) measurement is supported or not, and whether serving as the transmitting side and the receiving side for the angle of departure (AOD) measurement is supported or not, such as 'supporting AOA transmitting, and supporting AOD transmitting and receiving', and 'supporting AOA transmitting, and not supporting AOD transmitting and AOD receiving', etc.

15) The angle measuring capability information includes whether serving as the transmitting side for the angle of departure (AOD) measurement is supported or not, and whether serving as the receiving side for the angle of departure (AOD) measurement is supported or not, that is, whether a plurality of antennas of the transmitting side for the angle of departure (AOD) measurement are provided or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of departure (AOD) measurement and serving as the receiving side for the angle of departure (AOD) measurement are supported or not, for example, a code '01XX' indicates that serving as the transmitting side for the angle of departure (AOD) measurement is supported and serving as the receiving side for the angle of departure (AOD) measurement is not supported, a code '11XX' indicates that serving as the transmitting side for the angle of departure (AOD) measurement is supported and serving as the receiving side for the angle of departure (AOD) measurement is supported, a code '10XX' indicates that serving as the transmitting side for the angle of departure (AOD) measurement is not supported and serving as the receiving side for the angle of departure (AOD) measurement is supported, and a code '00XX' indicates that serving as the transmitting side for the angle of departure (AOD) measurement is not supported and serving as the receiving side for the angle of departure (AOD) measurement is not supported; and certainly, in the angle measuring capability information, pre-set character keywords may be adopted for indicating whether serving as the transmitting side for the angle of departure (AOD) measurement is supported or not, and whether serving as the receiving side for the angle of departure (AOD) measurement is supported or not, such as 'supporting AOD transmitting and receiving', and 'not supporting AOD transmitting, and supporting AOD receiving', etc.

Example 2

In the example, the angle measuring capability request message includes a request indication field used for indicating the second terminal to transmit angle measuring capability information, that is, in the example, capability of the second terminal in angle measuring is directly specified according to angle measuring capability of the first terminal, a content indicated by the request indication field may be determined according to a scene, such as an indication field used for specifying the second terminal to serve as a transmitting side in an angle measuring manner for an angle of arrival (AOA), an indication field used for specifying the second terminal to serve as a receiving side in an angle measuring manner for an angle of departure (AOD), and an indication field used for specifying the second terminal to serve as a transmitting side in the angle measuring manner for the angle of departure (AOD).

Step 502, receiving a response message carrying angle measuring capability information of the second terminal and fed back by the second terminal.

In an example, the response message carrying angle measuring capability information of the second terminal and fed back by the second terminal is received, and therefore, an angle measuring manner may be negotiated according to the angle measuring capability of the first terminal and the angle measuring capability message of the second terminal.

It needs to be noted that, the angle measuring capability information of the second terminal may include, but is not limited to, the following manners in different application scenes:

1) the angle measuring capability information includes whether serving as the transmitting side for the angle of arrival (AOA) measurement is supported or not, that is, whether serving as a single antenna of the transmitting side for the angle of arrival (AOA) measurement is supported or not, etc.

In an example, in the angle measuring capability information, pre-set codes may be adopted for indicating whether serving as the transmitting side for the angle of arrival (AOA) measurement is supported or not, for example, a code 'XXX1' indicates that serving as the transmitting side for the angle of arrival (AOA) measurement is supported, and a code 'XXX0' indicates that serving as the transmitting side for the angle of arrival (AOA) measurement is not supported; and certainly, in the angle measuring capability information, pre-set character keywords may be adopted for indicating whether serving as the transmitting side for the angle of arrival (AOA) measurement is supported or not, such as 'supporting AOA transmitting', and 'not supporting AOA transmitting', etc.

2) The angle measuring capability information includes whether serving as the receiving side for the angle of arrival (AOA) measurement is supported or not, that is, whether serving as a plurality of antennas of the receiving side for the angle of arrival (AOA) measurement is supported or not, etc.

In an example, in the angle measuring capability information, pre-set codes may be adopted for indicating whether serving as the receiving side for the angle of arrival (AOA) measurement is supported or not, for example, a code 'XX1X' indicates that serving as the receiving side for the angle of arrival (AOA) measurement is supported, and a code 'XX0X' indicates that serving as the receiving side for the angle of arrival (AOA) measurement is not supported; and certainly, in the angle measuring capability information, pre-set character keywords may be adopted for indicating whether serving as the receiving side for the angle of arrival (AOA) measurement is supported or not, such as 'supporting AOA receiving', and 'not supporting AOA receiving', etc.

3) The angle measuring capability information includes whether serving as the transmitting side for the angle of departure (AOD) measurement is supported or not, that is, whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of departure (AOD) measurement is supported or not, for example, a code 'X1XX' indicates that serving as the transmitting side for the angle of departure (AOD) measurement is supported, and a code 'X0XX' indicates that serving as the transmitting side for the angle of departure (AOD) measurement is not supported; and certainly, in the angle measuring capability information, pre-set character keywords may be adopted for indicating whether serving as the transmitting side for the angle of departure (AOD) measurement is supported or not, such as 'supporting AOD transmitting', and 'not supporting AOD transmitting', etc.

4) The angle measuring capability information includes whether serving as the receiving side for the angle of departure (AOD) measurement is supported or not, that is, whether serving as a single antenna of the receiving side for the angle of departure (AOD) measurement is supported or not, etc.

In an example, in the angle measuring capability information, pre-set codes may be adopted for indicating whether serving as the receiving side for the angle of departure (AOD) measurement is supported or not, for example, a code '1XXX' indicates that serving as the receiving side for the angle of departure (AOD) measurement is supported, and a code '0XXX' indicates that serving as the receiving side for the angle of departure (AOD) measurement is not supported; and certainly, in the angle measuring capability information, pre-set character keywords may be adopted for indicating whether serving as the receiving side for the angle of departure (AOD) measurement is supported or not, such as 'supporting AOD receiving', and 'not supporting AOD receiving', etc.

5) The angle measuring capability information includes whether serving as the transmitting side for the angle of arrival (AOA) measurement is supported or not, and whether serving as the receiving side for the angle of arrival (AOA) measurement is supported or not, that is, whether serving as a single antenna of the transmitting side for the angle of arrival (AOA) measurement is supported or not, and whether serving as a plurality of antennas of the receiving side for the angle of arrival (AOA) measurement is supported or not, etc.

In an example, in the angle measuring capability information, pre-set codes may be adopted for indicating whether serving as the transmitting side for the angle of arrival (AOA) measurement and serving as the receiving side for the angle of arrival (AOA) measurement are supported or not, for example, a code 'XX01' indicates that serving as the transmitting side for the angle of arrival (AOA) measurement is supported and serving as the receiving side for the angle of arrival (AOA) measurement is not supported, a code 'XX11' indicates that serving as the transmitting side for the angle of arrival (AOA) measurement is supported and serving as the receiving side for the angle of arrival (AOA) measurement is supported, a code 'XX10' indicates that serving as the transmitting side for the angle of arrival (AOA) measurement is not supported and serving as the receiving side for the angle of arrival (AOA) measurement is supported, and a code 'XX00' indicates that serving as the transmitting side for the angle of arrival (AOA) measurement is not supported and serving as the receiving side for the angle of arrival (AOA) measurement is not supported; and certainly, in the angle measuring capability information, pre-set character keywords may be adopted for indicating whether serving as the transmitting side for the angle of arrival (AOA) measurement and serving as the receiving side for the angle of arrival (AOA) measurement are supported or not, such as 'supporting AOA transmitting and receiving', and 'not supporting AOA transmitting and supporting AOA receiving', etc.

6) The angle measuring capability information includes whether serving as the transmitting side for the angle of arrival (AOA) measurement is supported or not, and whether serving as the transmitting side for the angle of departure (AOD) measurement is supported or not, that is, whether serving as a single antenna of the transmitting side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of arrival (AOA) measurement and serving as the transmitting side for the angle of departure (AOD) measurement are supported or not, for example, a code 'X0X1' indicates that serving as the transmitting side for the angle of arrival (AOA) measurement is supported and serving as the transmitting side for the angle of departure (AOD) measurement is not supported, a code 'X1X1' indicates that serving as the transmitting side for the angle of arrival (AOA) measurement is supported and serving as the transmitting side for the angle of departure (AOD) measurement is supported, a code 'X1X0' indicates that serving as the transmitting side for the angle of arrival (AOA) measurement is not supported and serving as the transmitting side for the angle of departure (AOD) measurement is supported, and a code 'X0X0' indicates that serving as the transmitting side for the angle of arrival (AOA) measurement is not supported and serving as the transmitting side for the angle of departure (AOD) measurement is not supported; and certainly, in the angle measuring capability information, pre-set character keywords may be adopted for indicating whether serving as the transmitting side for the angle of arrival (AOA) measurement and serving as the transmitting side for the angle of departure (AOD) measurement are supported or not, such as 'supporting AOA transmitting and AOD transmitting', and 'not supporting AOA transmitting and AOD transmitting', etc.

7) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of arrival (AOA) measurement and serving as the receiving side for the angle of departure (AOD) measurement are supported or not, for example, a code '0XX1' indicates that serving as the transmitting side for the angle of arrival (AOA) measurement is supported and serving as the receiving side for the angle of departure (AOD) measurement is not supported, a code '1XX1' indicates that serving as the transmitting side for the angle of arrival (AOA) measurement is supported and serving as the receiving side for the angle of departure (AOD) measurement is supported, a code '1XX0' indicates that serving as the transmitting side for the angle of arrival (AOA) measurement is not supported and serving as the receiving side for the angle of departure (AOD) measurement is supported, and a code '0XX0' indicates that serving as the transmitting side for the angle of arrival (AOA) measurement is not supported and serving as the receiving side for the angle of departure (AOD) measurement is not supported; and certainly, in the angle measuring capability information, pre-set character keywords may be adopted for indicating whether serving as the transmitting side for the angle of arrival (AOA) measurement and serving as the receiving side for the angle of departure (AOD) measurement are supported or not, such as 'supporting AOA transmitting and AOD receiving', and 'not supporting AOA transmitting and AOD receiving', etc.

8) The angle measuring capability information includes whether serving as the transmitting side and the receiving side for the angle of arrival (AOA) measurement is supported or not, and whether serving as the transmitting side and the receiving side for the angle of departure (AOD) measurement is supported or not, that is, whether serving as a single antenna of the transmitting side for the angle of arrival (AOA) measurement and serving as a plurality of antennas of the receiving side are supported or not, and whether serving as a single antenna of the receiving side for the angle of departure (AOD) measurement and serving as a plurality of antennas of the transmitting side are supported or not, etc.

In an example, in the angle measuring capability information, pre-set codes may be adopted for indicating whether serving as the transmitting side and the receiving side for the angle of arrival (AOA) measurement and serving as the transmitting side and the receiving side for the angle of departure (AOD) measurement are supported or not, for example, a code '0001' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is not supported, a code '0011' indicates that serving as the transmitting side and the receiving side for the angle of arrival (AOA) measurement is supported, serving as the receiving side for the angle of departure (AOD) measurement is not supported, and serving as the transmitting side for the angle of departure (AOD) measurement is not supported, a code '1001' indicates that serving as the transmitting side for the angle of arrival (AOA) measurement is supported, serving as the receiving side for the angle of arrival (AOA) measurement is not supported, serving as the receiving side for the angle of departure (AOD) measurement is supported, and serving as the transmitting side for the angle of departure (AOD) measurement is not supported, and a code '0101' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement is supported or not, and whether serving as the transmitting side and the receiving side for the angle of departure (AOD) measurement is supported or not, such as 'supporting AOA transmitting and receiving, and not supporting AOD transmitting and AOD receiving', and 'not supporting AOA transmitting and receiving, and not supporting AOD transmitting and AOD receiving', etc.

9) The angle measuring capability information includes whether serving as the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the receiving side for the angle of arrival (AOA) measurement and serving as the transmitting side for the angle of departure (AOD) measurement are supported or not, for example, a code 'X01X' indicates that serving as the receiving side for the angle of arrival (AOA) measurement is supported and serving as the transmitting side for the angle of departure (AOD) measurement is not supported, a code 'X11X' indicates that serving as the receiving side for the angle of arrival (AOA) measurement is supported and serving as the transmitting side for the angle of departure (AOD) measurement is supported, a code 'X00X' indicates that serving as the receiving side for the angle of arrival (AOA) measurement is not supported and serving as the transmitting side for the angle of departure (AOD) measurement is not supported, and a code 'X10X' indicates that serving as the receiving side for the angle of arrival (AOA) measurement is not supported and serving as the transmitting side for the angle of departure (AOD) measurement is supported; and certainly, in the angle measuring capability information, pre-set character keywords may be adopted for indicating whether serving as the receiving side for the angle of arrival (AOA) measurement and serving as the transmitting side for the angle of departure (AOD) measurement are supported or not, such as 'supporting AOA receiving and AOD transmitting', and 'not supporting AOA receiving and AOD transmitting', etc.

10) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the receiving side for the angle of arrival (AOA) measurement and serving as the receiving side for the angle of departure (AOD) measurement are supported or not, for example, a code '0X1X' indicates that serving as the receiving side for the angle of arrival (AOA) measurement is supported and serving as the receiving side for the angle of departure (AOD) measurement is not supported, a code '0X0X' indicates that serving as the receiving side for the angle of arrival (AOA) measurement is not supported and serving as the receiving side for the angle of departure (AOD) measurement is not supported, a code '1X1X' indicates that serving as the receiving side for the angle of arrival (AOA) measurement is supported and serving as the receiving side for the angle of departure (AOD) measurement is supported, and a code '1X0X' indicates that serving as the receiving side for the angle of arrival (AOA) measurement is not supported and serving as the receiving side for the angle of departure (AOD) measurement is supported; and certainly, in the angle measuring capability information, pre-set character keywords may be adopted for indicating whether serving as the receiving side for the angle of arrival (AOA) measurement and serving as the receiving side for the angle of departure (AOD) measurement are supported or not, such as 'supporting AOA receiving and AOD receiving', and 'not supporting AOA receiving and AOD receiving', etc.

11) The angle measuring capability information includes whether serving as the transmitting side and the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement and serving as a single antenna of the transmitting side are supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the transmitting side for the angle of departure (AOD) measurement are supported or not, for example, a code 'X111' indicates that serving as the receiving side for the angle of arrival (AOA) measurement is supported, serving as the transmitting side for the angle of arrival (AOA) measurement is supported, and serving as the transmitting side for the angle of departure (AOD) measurement is supported, a code 'X011' indicates that serving as the receiving side for the angle of arrival (AOA) measurement is supported, serving as the transmitting side for the angle of arrival (AOA) measurement is supported, and serving as the transmitting side for the angle of departure (AOD) measurement is not supported, a code 'X010' indicates that serving as the receiving side for the angle of arrival (AOA) measurement is supported, serving as the transmitting side for the angle of arrival (AOA) measurement is not supported, and serving as the transmitting side for the angle of departure (AOD) measurement is not supported, and a code 'X101' indicates that serving as the receiving side for the angle of arrival (AOA) measurement is not supported, serving as the transmitting side for the angle of arrival (AOA) measurement is supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the transmitting side for the angle of departure (AOD) measurement are supported or not, such as 'supporting AOA receiving and transmitting, and supporting AOD transmitting', and 'not supporting AOA receiving, and supporting AOA transmitting and AOD transmitting', etc.

12) The angle measuring capability information includes whether serving as the transmitting side and the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement and serving as a single antenna of the transmitting side are supported or not, and whether serving as a single antenna of the receiving side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the receiving side for the angle of departure (AOD) measurement are supported or not, for example, a code '1X11' indicates that serving as the receiving side for the angle of arrival (AOA) measurement is supported, serving as the transmitting side for the angle of arrival (AOA) measurement is supported, and serving as the receiving side for the angle of departure (AOD) measurement is supported, a code '0X11' indicates that serving as the receiving side for the angle of arrival (AOA) measurement is supported, serving as the transmitting side for the angle of arrival (AOA) measurement is supported, and serving as the receiving side for the angle of departure (AOD) measurement is not supported, '1X01' indicates that serving as the receiving side for the angle of arrival (AOA) measurement is not supported, serving as the transmitting side for the angle of arrival (AOA) measurement is supported, and serving as the receiving side for the angle of departure (AOD) measurement is supported, and '1X00' indicates that serving as the receiving side for the angle of arrival (AOA) measurement is not supported, serving as the transmitting side for the angle of arrival (AOA) measurement is not supported, and serving as the receiving side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the receiving side for the angle of departure (AOD) measurement are supported or not, such as 'supporting AOA receiving and transmitting, and supporting AOD receiving', and 'not supporting AOA receiving, and supporting AOA transmitting and AOD receiving', etc.

13) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the receiving side for the angle of arrival (AOA) measurement and serving as the transmitting side and the receiving side for the angle of departure (AOD) measurement are supported or not, for example, a code '111X' indicates that serving as the receiving side for the angle of arrival (AOA) measurement is supported, serving as the transmitting side for the angle of departure (AOD) measurement is supported, and serving as the receiving side for the angle of departure (AOD) measurement is supported, a code '011X' indicates that serving as the receiving side for the angle of arrival (AOA) measurement is supported, serving as the transmitting side for the angle of departure (AOD) measurement is supported, and serving as the receiving side for the angle of departure (AOD) measurement is not supported, a code '100X' indicates that serving as the receiving side for the angle of arrival (AOA) measurement is not supported, serving as the transmitting side for the angle of departure (AOD) measurement is not supported, and serving as the receiving side for the angle of departure (AOD) measurement is supported, and a code '000X' indicates that serving as the receiving side for the angle of arrival (AOA) measurement is not supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the receiving side for the angle of arrival (AOA) measurement is supported or not, and whether serving as the transmitting side and the receiving side for the angle of departure (AOD) measurement is supported or not, such as 'supporting AOA receiving, and supporting AOD transmitting and receiving', and 'supporting AOA receiving, and not supporting AOD transmitting and AOD receiving', etc.

14) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the transmitting side for the angle of arrival (AOA) measurement and serving as the transmitting side and the receiving side for the angle of departure (AOD) measurement are supported or not, for example, a code '11X1' indicates that serving as the transmitting side for the angle of arrival (AOA) measurement is supported, serving as the transmitting side for the angle of departure (AOD) measurement is supported, and serving as the receiving side for the angle of departure (AOD) measurement is supported, a code '10X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is supported, a code '01X1' indicates that serving as the transmitting side for the angle of arrival (AOA) measurement is supported, serving as the transmitting side for the angle of departure (AOD) measurement is supported, and serving as the receiving side for the angle of departure (AOD) measurement is not supported, and a code '00X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the transmitting side for the angle of arrival (AOA) measurement is supported or not, and whether serving as the transmitting side and the receiving side for the angle of departure (AOD) measurement is supported or not, such as 'supporting AOA transmitting, and supporting AOD transmitting and receiving', and 'supporting AOA transmitting, and not supporting AOD transmitting and AOD receiving', etc.

15) The angle measuring capability information includes whether serving as the transmitting side for the angle of departure (AOD) measurement is supported or not, and whether serving as the receiving side for the angle of departure (AOD) measurement is supported or not, that is, whether serving as a plurality of antennas of the transmitting side for the angle of departure (AOD) measurement are supported or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of departure (AOD) measurement and serving as the receiving side for the angle of departure (AOD) measurement are supported or not, for example, a code '01XX' indicates that serving as the transmitting side for the angle of departure (AOD) measurement is supported and serving as the receiving side for the angle of departure (AOD) measurement is not supported, a code '11XX' indicates that serving as the transmitting side for the angle of departure (AOD) measurement is supported and serving as the receiving side for the angle of departure (AOD) measurement is supported, a code '10XX' indicates that serving as the transmitting side for the angle of departure (AOD) measurement is not supported and serving as the receiving side for the angle of departure (AOD) measurement is supported, and a code '00XX' indicates that serving as the transmitting side for the angle of departure (AOD) measurement is not supported and serving as the receiving side for the angle of departure (AOD) measurement is not supported; and certainly, in the angle measuring capability information, pre-set character keywords may be adopted for indicating whether serving as the transmitting side for the angle of departure (AOD) measurement is supported or not, and whether serving as the receiving side for the angle of departure (AOD) measurement is supported or not, such as 'supporting AOD transmitting and receiving', and 'not supporting AOD transmitting, and supporting AOD receiving', etc.

Further, in an example, the specific angle measuring processing manner is negotiated and determined according to the angle measuring capability information of the first terminal and the second terminal, and results of the negotiation and determination may include, but is not limited to, the following:

1) the angle measuring capability information of the first terminal is supporting serving as the receiving side for the angle of arrival (AOA) measurement, not supporting serving as the transmitting side for the angle of arrival (AOA) measurement, and not supporting serving as the transmitting side and the receiving side for the angle of departure (AOD) measurement, and the angle measuring capability information of the second terminal is supporting serving as the transmitting side for the angle of arrival (AOA) measurement.

Then the angle measuring processing manner in the example is that the first terminal serves as the receiving side for the angle of arrival (AOA) measurement, and the second terminal serves as the transmitting side for the angle of arrival (AOA) measurement.

2) The angle measuring capability information of the first terminal is supporting serving as the receiving side for the angle of arrival (AOA) measurement, supporting serving as the transmitting side for the angle of arrival (AOA) measurement, and not supporting serving as the transmitting side and the receiving side for the angle of departure (AOD) measurement, and the angle measuring capability information of the second terminal is supporting serving as the transmitting side for the angle of arrival (AOA) measurement, and not supporting serving as the receiving side for the angle of arrival (AOA) measurement.

Then the angle measuring processing manner in the example is that the first terminal serves as the receiving side for the angle of arrival (AOA) measurement, and the second terminal serves as the transmitting side for the angle of arrival (AOA) measurement.

3) The angle measuring capability information of the first terminal is supporting serving as the receiving side for the angle of arrival (AOA) measurement, supporting serving as the transmitting side for the angle of arrival (AOA) measurement, and supporting serving as the transmitting side and the receiving side for the angle of departure (AOD) measurement, and the angle measuring capability information of the second terminal is supporting serving as the transmitting side for the angle of arrival (AOA) measurement, supporting serving as the receiving side for the angle of arrival (AOA) measurement, and not supporting serving as the transmitting side and the receiving side for the angle of departure (AOD) measurement.

Then the angle measuring processing manner in the example is that the first terminal serves as the receiving side for the angle of arrival (AOA) measurement, and the second terminal serves as the transmitting side for the angle of arrival (AOA) measurement.

Or, the angle measuring processing manner in the example is that the first terminal serves as the transmitting side for the angle of arrival (AOA) measurement, and the second terminal serves as the receiving side for the angle of arrival (AOA) measurement.

4) The angle measuring capability information of the first terminal is not supporting serving as the receiving side for the angle of arrival (AOA) measurement, not supporting serving as the transmitting side for the angle of arrival (AOA) measurement, and supporting serving as the transmitting side and the receiving side for the angle of departure (AOD) measurement, and the angle measuring capability information of the second terminal is supporting serving as the receiving side for the angle of arrival (AOA) measurement, and supporting serving as the transmitting side for the angle of departure (AOD) measurement.

Then the angle measuring processing manner in the example is that the first terminal serves as the receiving side for the angle of departure (AOD) measurement, and the second terminal serves as the transmitting side for the angle of departure (AOD) measurement.

Or, the angle measuring processing manner in the example is that the first terminal serves as the transmitting side for the angle of departure (AOD) measurement, and the second terminal serves as the receiving side for the angle of departure (AOD) measurement.

5) The angle measuring capability information of the first terminal is not supporting serving as the receiving side for the angle of arrival (AOA) measurement, not supporting serving as the transmitting side for the angle of arrival (AOA) measurement, and supporting serving as the transmitting side and the receiving side for the angle of departure (AOD) measurement, and the angle measuring capability information of the second terminal is not supporting serving as the receiving side for the angle of departure (AOA) measurement, and supporting serving as the transmitting side for the angle of departure (AOD) measurement.

Then the angle measuring processing manner in the example is that the first terminal serves as the receiving side for the angle of departure (AOD) measurement, and the second terminal serves as the transmitting side for the angle of departure (AOD) measurement.

6) The angle measuring capability information of the first terminal is supporting serving as the receiving side for the angle of arrival (AOA) measurement, supporting serving as the transmitting side for the angle of arrival (AOA) measurement, and supporting serving as the transmitting side and the receiving side for the angle of departure (AOD) measurement, and the angle measuring capability information of the second terminal is supporting serving as the receiving side for the angle of departure (AOD) measurement, supporting serving as the transmitting side for the angle of departure (AOD) measurement, and supporting serving as the transmitting side and the receiving side for the angle of arrival (AOA) measurement.

Then the angle measuring processing manner in the example is that the first terminal serves as the receiving side for the angle of departure (AOD) measurement, and the second terminal serves as the transmitting side for the angle of departure (AOD) measurement.

Or, the angle measuring processing manner in the example is that the first terminal serves as the transmitting side for the angle of departure (AOD) measurement, and the second terminal serves as the receiving side for the angle of departure (AOD) measurement.

Or, the angle measuring processing manner in the example is that the first terminal serves as the transmitting side for the angle of arrival (AOA) measurement, and the second terminal serves as the receiving side for the angle of arrival (AOA) measurement.

Or, the angle measuring processing manner in the example is that the first terminal serves as the receiving side for the angle of arrival (AOA) measurement, and the second terminal serves as the transmitting side for the angle of arrival (AOA) measurement.

In conclusion, according to the angle measuring processing method in the examples of the present disclosure, the first terminal transmits the angle measuring capability request message to the second terminal, and feeds back the response message carrying angle measuring capability information of the second terminal to the first terminal, the first terminal receives the response message carrying angle measuring capability information of the second terminal and fed back by the second terminal, and therefore, angle measuring processing between the first terminal and the second terminal on the basis of a manner of interactive handshake is realized, the manner of the angle measuring processing is expanded, and the flexibility of the angle measuring processing is improved.

In order to realize the negotiation for the angle measuring manner between the first terminal and the second terminal, a communication connection between the first terminal and the second terminal needs to be built in advance.

Figure 7:
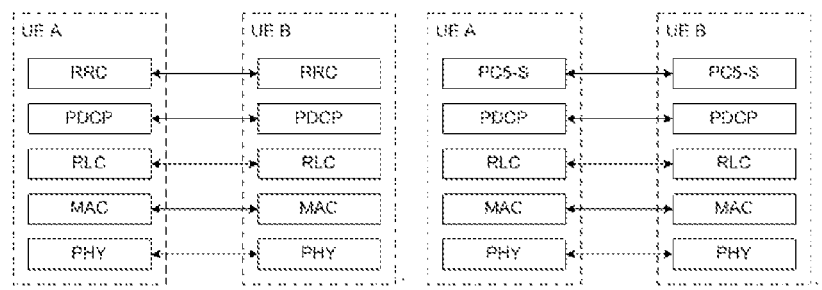
FIG. 7 is a schematic diagram of protocol stacks of a PC5-S protocol and an RRC protocol according to an example of the present disclosure.

In an example of the present disclosure, the first terminal transmits an angle measuring capability request message to the second terminal, and the second terminal feeds back a response message carrying angle measuring capability information of the second terminal to the first terminal, where PC5-radio resource control (PC5-RRC) messages, or PC5-signalling protocol (PC5-S) messages are adopted as the angle measuring capability request message and the response message. An interface used for communication between the first terminal and the second terminal by adopting a Sidelink technology is a PC5 interface, where the above two protocols, that is, a PC5-S protocol and an RRC protocol, are supported in a control surface of the Sidelink technology, protocol stacks of the PC5-S protocol and the RRC protocol may be seen by referring to FIG. 7, the protocol stack of the PC5 RRC protocol is located at the left side in FIG. 7, the protocol stack of the PC5-S protocol is located at the right side in FIG. 7, and in FIG. 7, the first terminal and the second terminal are represented by UEA and UEB, respectively.

Figure 8:
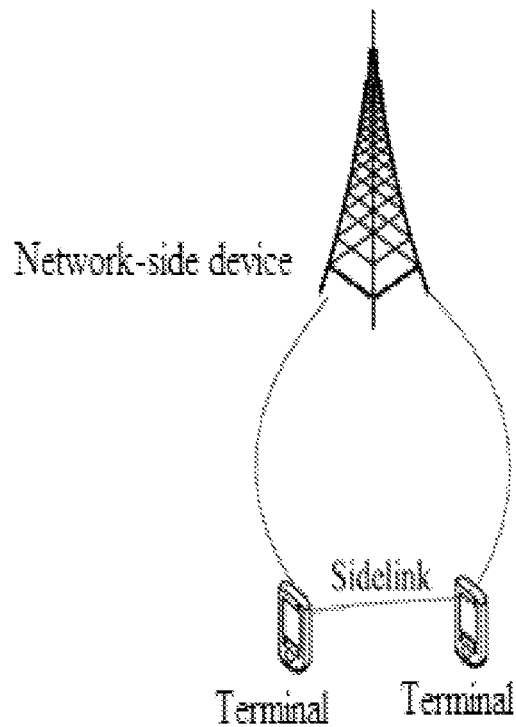
FIG. 8 is a schematic diagram of a Sidelink scene between devices according to an example of the present disclosure.

The above PC5 interface supports broadcasting, multicasting, and unicasting. In a unicasting mode, a PC5 unicasting connection needs to be established, a PC5 unicasting establishment process is shown in FIG. 8, in FIG. 8, the first terminal and the second terminal are represented by UE1 and UE2, respectively, and the UE1 and the UE2 directly communicate by using the Sidelink technology.

In an example of the present disclosure, the first terminal actively reports own network capability while making an Attach Request, a network side issues Enquiry Capability to request UE angle measuring capability, and the second terminal replies with capability information, therefore, on the basis of the above communication protocol, the angle measuring capability request message is transmitted by adopting UE Capability Enquiry Sidelink, and the response message is transmitted by adopting UE Capability Information Sidelink.

In conclusion, according to the angle measuring processing manner in the examples of the present disclosure, the first terminal and the second terminal directly realize transmission for the angle measuring capability request message and the response message on the basis of the Sidelink technology, so that realization for the communication connection for the angle measuring negotiation between the first terminal and the second terminal may be ensured.

In an actual execution process, in order to increase efficiency of the angle measuring negotiation, in some possible examples, the angle measuring manner of the second terminal and the corresponding subject type are directly specified, where the angle measuring manner may be AOA or AOD, and the subject type may be the receiving side or the transmitting side in the corresponding angle measuring manner, therefore, if the second terminal supports the corresponding specified angle measuring manner and the corresponding subject type, the corresponding angle measuring negotiation is directly completed, so that the efficiency of the angle measuring is greatly increased.

Figure 9:
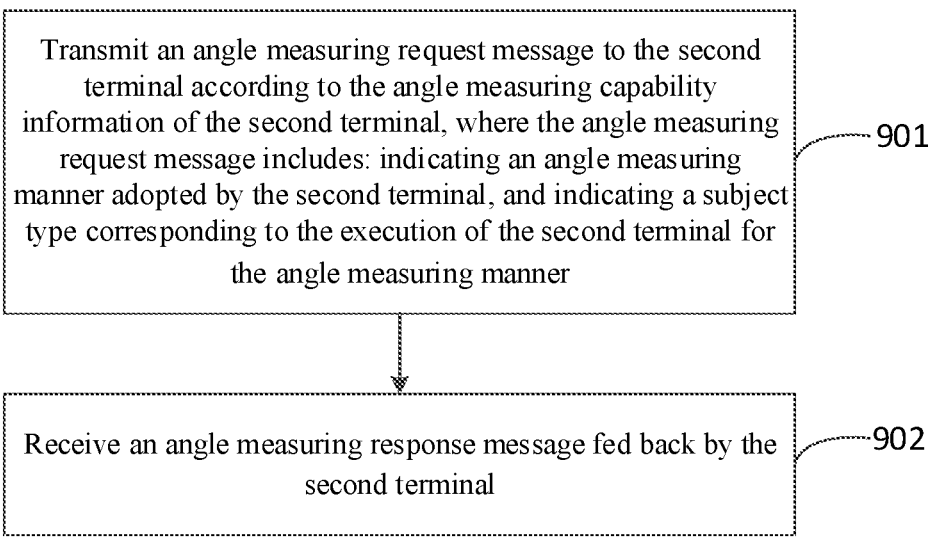
FIG. 9 is a flow diagram of an angle measuring processing method according to another example of the present disclosure.

FIG. 9 is a flow diagram of an angle measuring processing method according to another example of the present disclosure, and as shown in FIG. 9, the method includes:

step 901, transmitting an angle measuring request message to the second terminal according to the angle measuring capability information of the second terminal, where the angle measuring request message includes: indicating an angle measuring manner adopted by the second terminal, and indicating a subject type corresponding to the execution of the second terminal for the angle measuring manner.

The angle measuring capability information in the example may include but is not limited to the following manners:

1) the angle measuring capability information includes whether serving as the transmitting side for the angle of arrival (AOA) measurement is supported or not, that is, whether serving as a single antenna of the transmitting side for the angle of arrival (AOA) measurement is supported or not, etc.

In an example, in the angle measuring capability information, pre-set codes may be adopted for indicating whether serving as the transmitting side for the angle of arrival (AOA) measurement is supported or not, for example, a code 'XXX1' indicates that serving as the transmitting side for the angle of arrival (AOA) measurement is supported, and a code 'XXX0' indicates that serving as the transmitting side for the angle of arrival (AOA) measurement is not supported; and certainly, in the angle measuring capability information, pre-set character keywords may be adopted for indicating whether serving as the transmitting side for the angle of arrival (AOA) measurement is supported or not, such as 'supporting AOA transmitting', and 'not supporting AOA transmitting', etc.

2) The angle measuring capability information includes whether serving as the receiving side for the angle of arrival (AOA) measurement is supported or not, that is, whether serving as a plurality of antennas of the receiving side for the angle of arrival (AOA) measurement is supported or not, etc.

In an example, in the angle measuring capability information, pre-set codes may be adopted for indicating whether serving as the receiving side for the angle of arrival (AOA) measurement is supported or not, for example, a code 'XX1X' indicates that serving as the receiving side for the angle of arrival (AOA) measurement is supported, and a code 'XX0X' indicates that serving as the receiving side for the angle of arrival (AOA) measurement is not supported; and certainly, in the angle measuring capability information, pre-set character keywords may be adopted for indicating whether serving as the receiving side for the angle of arrival (AOA) measurement is supported or not, such as 'supporting AOA receiving', and 'not supporting AOA receiving', etc.

3) The angle measuring capability information includes whether serving as the transmitting side for the angle of departure (AOD) measurement is supported or not, that is, whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of departure (AOD) measurement is supported or not, for example, a code 'X1XX' indicates that serving as the transmitting side for the angle of departure (AOD) measurement is supported, and a code 'X0XX' indicates that serving as the transmitting side for the angle of departure (AOD) measurement is not supported; and certainly, in the angle measuring capability information, pre-set character keywords may be adopted for indicating whether serving as the transmitting side for the angle of departure (AOD) measurement is supported or not, such as 'supporting AOD transmitting', and 'not supporting AOD transmitting', etc.

4) The angle measuring capability information includes whether serving as the receiving side for the angle of departure (AOD) measurement is supported or not, that is, whether serving as a single antenna of the receiving side for the angle of departure (AOD) measurement is supported or not, etc.

In an example, in the angle measuring capability information, pre-set codes may be adopted for indicating whether serving as the receiving side for the angle of departure (AOD) measurement is supported or not, for example, a code '1XXX' indicates that serving as the receiving side for the angle of departure (AOD) measurement is supported, and a code '0XXX' indicates that serving as the receiving side for the angle of departure (AOD) measurement is not supported; and certainly, in the angle measuring capability information, pre-set character keywords may be adopted for indicating whether serving as the receiving side for the angle of departure (AOD) measurement is supported or not, such as 'supporting AOD receiving', and 'not supporting AOD receiving', etc.

5) The angle measuring capability information includes whether serving as the transmitting side for the angle of arrival (AOA) measurement is supported or not, and whether serving as the receiving side for the angle of arrival (AOA) measurement is supported or not, that is, whether serving as a single antenna of the transmitting side for the angle of arrival (AOA) measurement is supported or not, and whether serving as a plurality of antennas of the receiving side for the angle of arrival (AOA) measurement is supported or not, etc.

In an example, in the angle measuring capability information, pre-set codes may be adopted for indicating whether serving as the transmitting side for the angle of arrival (AOA) measurement and serving as the receiving side for the angle of arrival (AOA) measurement are supported or not, for example, a code 'XX01' indicates that serving as the transmitting side for the angle of arrival (AOA) measurement is supported and serving as the receiving side for the angle of arrival (AOA) measurement is not supported, a code 'XX11' indicates that serving as the transmitting side for the angle of arrival (AOA) measurement is supported and serving as the receiving side for the angle of arrival (AOA) measurement is supported, a code 'XX10' indicates that serving as the transmitting side for the angle of arrival (AOA) measurement is not supported and serving as the receiving side for the angle of arrival (AOA) measurement is supported, and a code 'XX00' indicates that serving as the transmitting side for the angle of arrival (AOA) measurement is not supported and serving as the receiving side for the angle of arrival (AOA) measurement is not supported; and certainly, in the angle measuring capability information, pre-set character keywords may be adopted for indicating whether serving as the transmitting side for the angle of arrival (AOA) measurement and serving as the receiving side for the angle of arrival (AOA) measurement are supported or not, such as 'supporting AOA transmitting and receiving', and 'not supporting AOA transmitting and supporting AOA receiving', etc.

6) The angle measuring capability information includes whether serving as the transmitting side for the angle of arrival (AOA) measurement is supported or not, and whether serving as the transmitting side for the angle of departure (AOD) measurement is supported or not, that is, whether serving as a single antenna of the transmitting side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of arrival (AOA) measurement and serving as the transmitting side for the angle of departure (AOD) measurement are supported or not, for example, a code 'X0X1' indicates that serving as the transmitting side for the angle of arrival (AOA) measurement is supported and serving as the transmitting side for the angle of departure (AOD) measurement is not supported, a code 'X1X1' indicates that serving as the transmitting side for the angle of arrival (AOA) measurement is supported and serving as the transmitting side for the angle of departure (AOD) measurement is supported, a code 'X1X0' indicates that serving as the transmitting side for the angle of arrival (AOA) measurement is not supported and serving as the transmitting side for the angle of departure (AOD) measurement is supported, and a code 'X0X0' indicates that serving as the transmitting side for the angle of arrival (AOA) measurement is not supported and serving as the transmitting side for the angle of departure (AOD) measurement is not supported; and certainly, in the angle measuring capability information, pre-set character keywords may be adopted for indicating whether serving as the transmitting side for the angle of arrival (AOA) measurement and serving as the transmitting side for the angle of departure (AOD) measurement are supported or not, such as 'supporting AOA transmitting and AOD transmitting', and 'not supporting AOA transmitting and AOD transmitting', etc.

7) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of arrival (AOA) measurement and serving as the receiving side for the angle of departure (AOD) measurement are supported or not, for example, a code '0XX1' indicates that serving as the transmitting side for the angle of arrival (AOA) measurement is supported and serving as the receiving side for the angle of departure (AOD) measurement is not supported, a code '1XX1' indicates that serving as the transmitting side for the angle of arrival (AOA) measurement is supported and serving as the receiving side for the angle of departure (AOD) measurement is supported, a code '1XX0' indicates that serving as the transmitting side for the angle of arrival (AOA) measurement is not supported and serving as the receiving side for the angle of departure (AOD) measurement is supported, and a code '0XX0' indicates that serving as the transmitting side for the angle of arrival (AOA) measurement is not supported and serving as the receiving side for the angle of departure (AOD) measurement is not supported; and certainly, in the angle measuring capability information, pre-set character keywords may be adopted for indicating whether serving as the transmitting side for the angle of arrival (AOA) measurement and serving as the receiving side for the angle of departure (AOD) measurement are supported or not, such as 'supporting AOA transmitting and AOD receiving', and 'not supporting AOA transmitting and AOD receiving', etc.

8) The angle measuring capability information includes whether serving as the transmitting side and the receiving side for the angle of arrival (AOA) measurement is supported or not, and whether serving as the transmitting side and the receiving side for the angle of departure (AOD) measurement is supported or not, that is, whether serving as a single antenna of the transmitting side for the angle of arrival (AOA) measurement and serving as a plurality of antennas of the receiving side are supported or not, and whether serving as a single antenna of the receiving side for the angle of departure (AOD) measurement and serving as a plurality of antennas of the transmitting side are supported or not, etc.

In an example, in the angle measuring capability information, pre-set codes may be adopted for indicating whether serving as the transmitting side and the receiving side for the angle of arrival (AOA) measurement and serving as the transmitting side and the receiving side for the angle of departure (AOD) measurement are supported or not, for example, a code '0001' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is not supported, a code '0011' indicates that serving as the transmitting side and the receiving side for the angle of arrival (AOA) measurement is supported, serving as the receiving side for the angle of departure (AOD) measurement is not supported, and serving as the transmitting side for the angle of departure (AOD) measurement is not supported, a code '1001' indicates that serving as the transmitting side for the angle of arrival (AOA) measurement is supported, serving as the receiving side for the angle of arrival (AOA) measurement is not supported, serving as the receiving side for the angle of departure (AOD) measurement is supported, and serving as the transmitting side for the angle of departure (AOD) measurement is not supported, and a code '0101' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement is supported or not, and whether serving as the transmitting side and the receiving side for the angle of departure (AOD) measurement is supported or not, such as 'supporting AOA transmitting and receiving, and not supporting AOD transmitting and AOD receiving', and 'not supporting AOA transmitting and receiving, and not supporting AOD transmitting and AOD receiving', etc.

9) The angle measuring capability information includes whether serving as the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the receiving side for the angle of arrival (AOA) measurement and serving as the transmitting side for the angle of departure (AOD) measurement are supported or not, for example, a code 'X01X' indicates that serving as the receiving side for the angle of arrival (AOA) measurement is supported and serving as the transmitting side for the angle of departure (AOD) measurement is not supported, a code 'X11X' indicates that serving as the receiving side for the angle of arrival (AOA) measurement is supported and serving as the transmitting side for the angle of departure (AOD) measurement is supported, a code 'X00X' indicates that serving as the receiving side for the angle of arrival (AOA) measurement is not supported and serving as the transmitting side for the angle of departure (AOD) measurement is not supported, and a code 'X10X' indicates that serving as the receiving side for the angle of arrival (AOA) measurement is not supported and serving as the transmitting side for the angle of departure (AOD) measurement is supported; and certainly, in the angle measuring capability information, pre-set character keywords may be adopted for indicating whether serving as the receiving side for the angle of arrival (AOA) measurement and serving as the transmitting side for the angle of departure (AOD) measurement are supported or not, such as 'supporting AOA receiving and AOD transmitting', and 'not supporting AOA receiving and AOD transmitting', etc.

10) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the receiving side for the angle of arrival (AOA) measurement and serving as the receiving side for the angle of departure (AOD) measurement are supported or not, for example, a code '0X1X' indicates that serving as the receiving side for the angle of arrival (AOA) measurement is supported and serving as the receiving side for the angle of departure (AOD) measurement is not supported, a code '0X0X' indicates that serving as the receiving side for the angle of arrival (AOA) measurement is not supported and serving as the receiving side for the angle of departure (AOD) measurement is not supported, a code '1X1X' indicates that serving as the receiving side for the angle of arrival (AOA) measurement is supported and serving as the receiving side for the angle of departure (AOD) measurement is supported, and a code '1X0X' indicates that serving as the receiving side for the angle of arrival (AOA) measurement is not supported and serving as the receiving side for the angle of departure (AOD) measurement is supported; and certainly, in the angle measuring capability information, pre-set character keywords may be adopted for indicating whether serving as the receiving side for the angle of arrival (AOA) measurement and serving as the receiving side for the angle of departure (AOD) measurement are supported or not, such as 'supporting AOA receiving and AOD receiving', and 'not supporting AOA receiving and AOD receiving', etc.

11) The angle measuring capability information includes whether serving as the transmitting side and the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement and serving as a single antenna of the transmitting side are supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the transmitting side for the angle of departure (AOD) measurement are supported or not, for example, a code 'X111' indicates that serving as the receiving side for the angle of arrival (AOA) measurement is supported, serving as the transmitting side for the angle of arrival (AOA) measurement is supported, and serving as the transmitting side for the angle of departure (AOD) measurement is supported, a code 'X011' indicates that serving as the receiving side for the angle of arrival (AOA) measurement is supported, serving as the transmitting side for the angle of arrival (AOA) measurement is supported, and serving as the transmitting side for the angle of departure (AOD) measurement is not supported, a code 'X010' indicates that serving as the receiving side for the angle of arrival (AOA) measurement is supported, serving as the transmitting side for the angle of arrival (AOA) measurement is not supported, and serving as the transmitting side for the angle of departure (AOD) measurement is not supported, and a code 'X101' indicates that serving as the receiving side for the angle of arrival (AOA) measurement is not supported, serving as the transmitting side for the angle of arrival (AOA) measurement is supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the transmitting side for the angle of departure (AOD) measurement are supported or not, such as 'supporting AOA receiving and transmitting, and supporting AOD transmitting', and 'not supporting AOA receiving, and supporting AOA transmitting and AOD transmitting', etc.

12) The angle measuring capability information includes whether serving as the transmitting side and the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement and serving as a single antenna of the transmitting side are supported or not, and whether serving as a single antenna of the receiving side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the receiving side for the angle of departure (AOD) measurement are supported or not, for example, a code '1X11' indicates that serving as the receiving side for the angle of arrival (AOA) measurement is supported, serving as the transmitting side for the angle of arrival (AOA) measurement is supported, and serving as the receiving side for the angle of departure (AOD) measurement is supported, a code '0X11' indicates that serving as the receiving side for the angle of arrival (AOA) measurement is supported, serving as the transmitting side for the angle of arrival (AOA) measurement is supported, and serving as the receiving side for the angle of departure (AOD) measurement is not supported, '1X01' indicates that serving as the receiving side for the angle of arrival (AOA) measurement is not supported, serving as the transmitting side for the angle of arrival (AOA) measurement is supported, and serving as the receiving side for the angle of departure (AOD) measurement is supported, and '1X00' indicates that serving as the receiving side for the angle of arrival (AOA) measurement is not supported, serving as the transmitting side for the angle of arrival (AOA) measurement is not supported, and serving as the receiving side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the receiving side for the angle of departure (AOD) measurement are supported or not, such as 'supporting AOA receiving and transmitting, and supporting AOD receiving', and 'not supporting AOA receiving, and supporting AOA transmitting and AOD receiving', etc.

13) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the receiving side for the angle of arrival (AOA) measurement and serving as the transmitting side and the receiving side for the angle of departure (AOD) measurement are supported or not, for example, a code '111X' indicates that serving as the receiving side for the angle of arrival (AOA) measurement is supported, serving as the transmitting side for the angle of departure (AOD) measurement is supported, and serving as the receiving side for the angle of departure (AOD) measurement is supported, a code '011X' indicates that serving as the receiving side for the angle of arrival (AOA) measurement is supported, serving as the transmitting side for the angle of departure (AOD) measurement is supported, and serving as the receiving side for the angle of departure (AOD) measurement is not supported, a code '100X' indicates that serving as the receiving side for the angle of arrival (AOA) measurement is not supported, serving as the transmitting side for the angle of departure (AOD) measurement is not supported, and serving as the receiving side for the angle of departure (AOD) measurement is supported, and a code '000X' indicates that serving as the receiving side for the angle of arrival (AOA) measurement is not supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the receiving side for the angle of arrival (AOA) measurement is supported or not, and whether serving as the transmitting side and the receiving side for the angle of departure (AOD) measurement is supported or not, such as 'supporting AOA receiving, and supporting AOD transmitting and receiving', and 'supporting AOA receiving, and not supporting AOD transmitting and AOD receiving', etc.

14) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the transmitting side for the angle of arrival (AOA) measurement and serving as the transmitting side and the receiving side for the angle of departure (AOD) measurement are supported or not, for example, a code '11X1' indicates that serving as the transmitting side for the angle of arrival (AOA) measurement is supported, serving as the transmitting side for the angle of departure (AOD) measurement is supported, and serving as the receiving side for the angle of departure (AOD) measurement is supported, a code '10X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is supported, a code '01X1' indicates that serving as the transmitting side for the angle of arrival (AOA) measurement is supported, serving as the transmitting side for the angle of departure (AOD) measurement is supported, and serving as the receiving side for the angle of departure (AOD) measurement is not supported, and a code '00X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the transmitting side for the angle of arrival (AOA) measurement is supported or not, and whether serving as the transmitting side and the receiving side for the angle of departure (AOD) measurement is supported or not, such as 'supporting AOA transmitting, and supporting AOD transmitting and receiving', and 'supporting AOA transmitting, and not supporting AOD transmitting and AOD receiving', etc.

15) The angle measuring capability information includes whether serving as the transmitting side for the angle of departure (AOD) measurement is supported or not, and whether serving as the receiving side for the angle of departure (AOD) measurement is supported or not, that is, whether serving as a plurality of antennas of the transmitting side for the angle of departure (AOD) measurement are supported or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of departure (AOD) measurement and serving as the receiving side for the angle of departure (AOD) measurement are supported or not, for example, a code '01XX' indicates that serving as the transmitting side for the angle of departure (AOD) measurement is supported and serving as the receiving side for the angle of departure (AOD) measurement is not supported, a code '11XX' indicates that serving as the transmitting side for the angle of departure (AOD) measurement is supported and serving as the receiving side for the angle of departure (AOD) measurement is supported, a code '10XX' indicates that serving as the transmitting side for the angle of departure (AOD) measurement is not supported and serving as the receiving side for the angle of departure (AOD) measurement is supported, and a code '00XX' indicates that serving as the transmitting side for the angle of departure (AOD) measurement is not supported and serving as the receiving side for the angle of departure (AOD) measurement is not supported; and certainly, in the angle measuring capability information, pre-set character keywords may be adopted for indicating whether serving as the transmitting side for the angle of departure (AOD) measurement is supported or not, and whether serving as the receiving side for the angle of departure (AOD) measurement is supported or not, such as 'supporting AOD transmitting and receiving', and 'not supporting AOD transmitting, and supporting AOD receiving', etc.

In an example, the first terminal directly transmits an angle measuring request message to the second terminal according to the angle measuring capability information of the second terminal, where the angle measuring request message includes indicating an angle measuring manner adopted by the second terminal, and indicating a subject type corresponding to the execution of the second terminal for the angle measuring manner.

Alternatively, there may be the following possibilities for the first terminal directly transmitting an angle measuring request message to the second terminal according to the angle measuring capability information of the second terminal:

1) In response to indicating the angle measuring manner adopted by the second terminal to be the AOA measurement, the indicated subject type corresponding to the execution of the second terminal for the angle measuring manner includes: the transmitting side for the AOA measurement, or the receiving side for the AOA measurement.

2) In response to indicating the angle measuring manner adopted by the second terminal to be the AOD measurement, the indicated subject type corresponding to the execution of the second terminal for the angle measuring manner includes: the transmitting side for the AOD measurement, or the receiving side for the AOD measurement.

3) In response to indicating the angle measuring manner adopted by the second terminal to be the AOA measurement and the AOD measurement, the indicated subject type corresponding to the execution of the second terminal for the angle measuring manner includes: the transmitting side for the AOD measurement, or the receiving side for the AOD measurement, or the transmitting side for the AOA measurement, or the receiving side for the AOA measurement.

It needs to be noted that, in the example, the angle measuring request message transmitted to the second terminal according to the angle measuring capability information of the second terminal is certainly compatible with the angle measuring capability of the first terminal, and when the angle measuring capability of the first terminal only supports one subject type of one angle measuring manner, on the premise that the second terminal meets the corresponding angle measuring capability, the angle measuring request message transmitted to the second terminal certainly includes an opposite subject type of the angle measuring manner supported by the first terminal; when the angle measuring capability of the first terminal supports one subject type of all the angle measuring manners, on the premise that the second terminal meets the corresponding angle measuring capability, the angle measuring request message transmitted to the second terminal at least includes the subject types which cannot be supported by the first terminal in any angle measuring manner; and certainly, if the angle measuring capability of the first terminal supports all the subject types of all the angle measuring manners, on the premise that the second terminal meets the corresponding angle measuring capability, the angle measuring request message transmitted to the second terminal may include any angle measuring manner and the corresponding subject type.

For example, when the angle measuring manner corresponding to the angle measuring capability information of the first terminal is supporting serving as the transmitting side for the angle of arrival (AOA) measurement, and the angle measuring capability information of the second terminal is supporting serving as the transmitting side and the receiving side for the angle of arrival (AOA) measurement, the angle measuring request message transmitted to the second terminal includes indicating the angle measuring manner executed by the second terminal to be the angle of arrival (AOA) measurement, and the corresponding subject type is the receiving side.

Step 902, receiving the angle measuring response message fed back by the second terminal.

In an example, the angle measuring response message fed back by the second terminal is received, so that the specific angle measuring manner is specifically determined according to the angle measuring response message fed back by the second terminal, where the angle measuring response message may include applying the angle measuring manner, etc, the applying the angle measuring manner may be understood as carrying out angle measuring on the basis of the angle measuring manner, and in response to applying an angle measuring response manner, determination for the angle measuring manner of the first terminal and the second terminal is directly completed, so that the efficiency of the angle measuring negotiation is increased.

In an example of the present disclosure, the first terminal transmits an angle measuring request message to the second terminal, and the second terminal feeds back an angle measuring response message carrying the angle measuring request information of the second terminal to the first terminal, where an interface used for communication between the first terminal and the second terminal by adopting a Sidelink technology is a PC5 interface, and the above two protocols, that is, a PC5-S protocol and an RRC protocol, are supported in a control surface of the Sidelink technology. Therefore, the angle measuring request message and the response message are transmitted by adopting PC5 RRC messages, or PC5-S messages.

In conclusion, according to the angle measuring processing manner in the examples of the present disclosure, the first terminal may directly indicate the angle measuring type of the second terminal and the corresponding subject type according to the angle measuring capability information of the second terminal, and renegotiation for determining the corresponding angle measuring type and the corresponding subject type according to the angle measuring capability information fed back by the second terminal is avoided, so that the efficiency of the angle measuring negotiation is increased.

In order to improve the flexibility of the negotiation for the angle measuring processing between the first terminal and the second terminal, the first terminal transmits an angle measuring request message to the second terminal according to the angle measuring capability information of the second terminal, where the angle measuring request message includes: indicating the angle measuring manner adopted by the second terminal, and indicating the subject type corresponding to the execution of the second terminal for the angle measuring manner, and then receiving the angle measuring response message fed back by the second terminal.

The angle measuring capability information in the example may include but is not limited to the following manners:

1) the angle measuring capability information includes whether serving as the transmitting side for the angle of arrival (AOA) measurement is supported or not, that is, whether serving as a single antenna of the transmitting side for the angle of arrival (AOA) measurement is supported or not, etc.

In an example, in the angle measuring capability information, pre-set codes may be adopted for indicating whether serving as the transmitting side for the angle of arrival (AOA) measurement is supported or not, for example, a code 'XXX1' indicates that serving as the transmitting side for the angle of arrival (AOA) measurement is supported, and a code 'XXX0' indicates that serving as the transmitting side for the angle of arrival (AOA) measurement is not supported; and certainly, in the angle measuring capability information, pre-set character keywords may be adopted for indicating whether serving as the transmitting side for the angle of arrival (AOA) measurement is supported or not, such as 'supporting AOA transmitting', and 'not supporting AOA transmitting', etc.

2) The angle measuring capability information includes whether serving as the receiving side for the angle of arrival (AOA) measurement is supported or not, that is, whether serving as a plurality of antennas of the receiving side for the angle of arrival (AOA) measurement is supported or not, etc.

In an example, in the angle measuring capability information, pre-set codes may be adopted for indicating whether serving as the receiving side for the angle of arrival (AOA) measurement is supported or not, for example, a code 'XX1X' indicates that serving as the receiving side for the angle of arrival (AOA) measurement is supported, and a code 'XX0X' indicates that serving as the receiving side for the angle of arrival (AOA) measurement is not supported; and certainly, in the angle measuring capability information, pre-set character keywords may be adopted for indicating whether serving as the receiving side for the angle of arrival (AOA) measurement is supported or not, such as 'supporting AOA receiving', and 'not supporting AOA receiving', etc.

3) The angle measuring capability information includes whether serving as the transmitting side for the angle of departure (AOD) measurement is supported or not, that is, whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of departure (AOD) measurement is supported or not, for example, a code 'X1XX' indicates that serving as the transmitting side for the angle of departure (AOD) measurement is supported, and a code 'X0XX' indicates that serving as the transmitting side for the angle of departure (AOD) measurement is not supported; and certainly, in the angle measuring capability information, pre-set character keywords may be adopted for indicating whether serving as the transmitting side for the angle of departure (AOD) measurement is supported or not, such as 'supporting AOD transmitting', and 'not supporting AOD transmitting', etc.

4) The angle measuring capability information includes whether serving as the receiving side for the angle of departure (AOD) measurement is supported or not, that is, whether serving as a single antenna of the receiving side for the angle of departure (AOD) measurement is supported or not, etc.

In an example, in the angle measuring capability information, pre-set codes may be adopted for indicating whether serving as the receiving side for the angle of departure (AOD) measurement is supported or not, for example, a code '1XXX' indicates that serving as the receiving side for the angle of departure (AOD) measurement is supported, and a code '0XXX' indicates that serving as the receiving side for the angle of departure (AOD) measurement is not supported; and certainly, in the angle measuring capability information, pre-set character keywords may be adopted for indicating whether serving as the receiving side for the angle of departure (AOD) measurement is supported or not, such as 'supporting AOD receiving', and 'not supporting AOD receiving', etc.

5) The angle measuring capability information includes whether serving as the transmitting side for the angle of arrival (AOA) measurement is supported or not, and whether serving as the receiving side for the angle of arrival (AOA) measurement is supported or not, that is, whether serving as a single antenna of the transmitting side for the angle of arrival (AOA) measurement is supported or not, and whether serving as a plurality of antennas of the receiving side for the angle of arrival (AOA) measurement is supported or not, etc.

In an example, in the angle measuring capability information, pre-set codes may be adopted for indicating whether serving as the transmitting side for the angle of arrival (AOA) measurement and serving as the receiving side for the angle of arrival (AOA) measurement are supported or not, for example, a code 'XX01' indicates that serving as the transmitting side for the angle of arrival (AOA) measurement is supported and serving as the receiving side for the angle of arrival (AOA) measurement is not supported, a code 'XX11' indicates that serving as the transmitting side for the angle of arrival (AOA) measurement is supported and serving as the receiving side for the angle of arrival (AOA) measurement is supported, a code 'XX10' indicates that serving as the transmitting side for the angle of arrival (AOA) measurement is not supported and serving as the receiving side for the angle of arrival (AOA) measurement is supported, and a code 'XX00' indicates that serving as the transmitting side for the angle of arrival (AOA) measurement is not supported and serving as the receiving side for the angle of arrival (AOA) measurement is not supported; and certainly, in the angle measuring capability information, pre-set character keywords may be adopted for indicating whether serving as the transmitting side for the angle of arrival (AOA) measurement and serving as the receiving side for the angle of arrival (AOA) measurement are supported or not, such as 'supporting AOA transmitting and receiving', and 'not supporting AOA transmitting and supporting AOA receiving', etc.

6) The angle measuring capability information includes whether serving as the transmitting side for the angle of arrival (AOA) measurement is supported or not, and whether serving as the transmitting side for the angle of departure (AOD) measurement is supported or not, that is, whether serving as a single antenna of the transmitting side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of arrival (AOA) measurement and serving as the transmitting side for the angle of departure (AOD) measurement are supported or not, for example, a code 'X0X1' indicates that serving as the transmitting side for the angle of arrival (AOA) measurement is supported and serving as the transmitting side for the angle of departure (AOD) measurement is not supported, a code 'X1X1' indicates that serving as the transmitting side for the angle of arrival (AOA) measurement is supported and serving as the transmitting side for the angle of departure (AOD) measurement is supported, a code 'X1X0' indicates that serving as the transmitting side for the angle of arrival (AOA) measurement is not supported and serving as the transmitting side for the angle of departure (AOD) measurement is supported, and a code 'X0X0' indicates that serving as the transmitting side for the angle of arrival (AOA) measurement is not supported and serving as the transmitting side for the angle of departure (AOD) measurement is not supported; and certainly, in the angle measuring capability information, pre-set character keywords may be adopted for indicating whether serving as the transmitting side for the angle of arrival (AOA) measurement and serving as the transmitting side for the angle of departure (AOD) measurement are supported or not, such as 'supporting AOA transmitting and AOD transmitting', and 'not supporting AOA transmitting and AOD transmitting', etc.

7) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of arrival (AOA) measurement and serving as the receiving side for the angle of departure (AOD) measurement are supported or not, for example, a code '0XX1' indicates that serving as the transmitting side for the angle of arrival (AOA) measurement is supported and serving as the receiving side for the angle of departure (AOD) measurement is not supported, a code '1XX1' indicates that serving as the transmitting side for the angle of arrival (AOA) measurement is supported and serving as the receiving side for the angle of departure (AOD) measurement is supported, a code '1XX0' indicates that serving as the transmitting side for the angle of arrival (AOA) measurement is not supported and serving as the receiving side for the angle of departure (AOD) measurement is supported, and a code '0XX0' indicates that serving as the transmitting side for the angle of arrival (AOA) measurement is not supported and serving as the receiving side for the angle of departure (AOD) measurement is not supported; and certainly, in the angle measuring capability information, pre-set character keywords may be adopted for indicating whether serving as the transmitting side for the angle of arrival (AOA) measurement and serving as the receiving side for the angle of departure (AOD) measurement are supported or not, such as 'supporting AOA transmitting and AOD receiving', and 'not supporting AOA transmitting and AOD receiving', etc.

8) The angle measuring capability information includes whether serving as the transmitting side and the receiving side for the angle of arrival (AOA) measurement is supported or not, and whether serving as the transmitting side and the receiving side for the angle of departure (AOD) measurement is supported or not, that is, whether serving as a single antenna of the transmitting side for the angle of arrival (AOA) measurement and serving as a plurality of antennas of the receiving side are supported or not, and whether serving as a single antenna of the receiving side for the angle of departure (AOD) measurement and serving as a plurality of antennas of the transmitting side are supported or not, etc.

In an example, in the angle measuring capability information, pre-set codes may be adopted for indicating whether serving as the transmitting side and the receiving side for the angle of arrival (AOA) measurement and serving as the transmitting side and the receiving side for the angle of departure (AOD) measurement are supported or not, for example, a code '0001' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is not supported, a code '0011' indicates that serving as the transmitting side and the receiving side for the angle of arrival (AOA) measurement is supported, serving as the receiving side for the angle of departure (AOD) measurement is not supported, and serving as the transmitting side for the angle of departure (AOD) measurement is not supported, a code '1001' indicates that serving as the transmitting side for the angle of arrival (AOA) measurement is supported, serving as the receiving side for the angle of arrival (AOA) measurement is not supported, serving as the receiving side for the angle of departure (AOD) measurement is supported, and serving as the transmitting side for the angle of departure (AOD) measurement is not supported, and a code '0101' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement is supported or not, and whether serving as the transmitting side and the receiving side for the angle of departure (AOD) measurement is supported or not, such as 'supporting AOA transmitting and receiving, and not supporting AOD transmitting and AOD receiving', and 'not supporting AOA transmitting and receiving, and not supporting AOD transmitting and AOD receiving', etc.

9) The angle measuring capability information includes whether serving as the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the receiving side for the angle of arrival (AOA) measurement and serving as the transmitting side for the angle of departure (AOD) measurement are supported or not, for example, a code 'X01X' indicates that serving as the receiving side for the angle of arrival (AOA) measurement is supported and serving as the transmitting side for the angle of departure (AOD) measurement is not supported, a code 'X11X' indicates that serving as the receiving side for the angle of arrival (AOA) measurement is supported and serving as the transmitting side for the angle of departure (AOD) measurement is supported, a code 'X00X' indicates that serving as the receiving side for the angle of arrival (AOA) measurement is not supported and serving as the transmitting side for the angle of departure (AOD) measurement is not supported, and a code 'X10X' indicates that serving as the receiving side for the angle of arrival (AOA) measurement is not supported and serving as the transmitting side for the angle of departure (AOD) measurement is supported; and certainly, in the angle measuring capability information, pre-set character keywords may be adopted for indicating whether serving as the receiving side for the angle of arrival (AOA) measurement and serving as the transmitting side for the angle of departure (AOD) measurement are supported or not, such as 'supporting AOA receiving and AOD transmitting', and 'not supporting AOA receiving and AOD transmitting', etc.

10) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the receiving side for the angle of arrival (AOA) measurement and serving as the receiving side for the angle of departure (AOD) measurement are supported or not, for example, a code '0X1X' indicates that serving as the receiving side for the angle of arrival (AOA) measurement is supported and serving as the receiving side for the angle of departure (AOD) measurement is not supported, a code '0X0X' indicates that serving as the receiving side for the angle of arrival (AOA) measurement is not supported and serving as the receiving side for the angle of departure (AOD) measurement is not supported, a code '1X1X' indicates that serving as the receiving side for the angle of arrival (AOA) measurement is supported and serving as the receiving side for the angle of departure (AOD) measurement is supported, and a code '1X0X' indicates that serving as the receiving side for the angle of arrival (AOA) measurement is not supported and serving as the receiving side for the angle of departure (AOD) measurement is supported; and certainly, in the angle measuring capability information, pre-set character keywords may be adopted for indicating whether serving as the receiving side for the angle of arrival (AOA) measurement and serving as the receiving side for the angle of departure (AOD) measurement are supported or not, such as 'supporting AOA receiving and AOD receiving', and 'not supporting AOA receiving and AOD receiving', etc.

11) The angle measuring capability information includes whether serving as the transmitting side and the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement and serving as a single antenna of the transmitting side are supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the transmitting side for the angle of departure (AOD) measurement are supported or not, for example, a code 'X111' indicates that serving as the receiving side for the angle of arrival (AOA) measurement is supported, serving as the transmitting side for the angle of arrival (AOA) measurement is supported, and serving as the transmitting side for the angle of departure (AOD) measurement is supported, a code 'X011' indicates that serving as the receiving side for the angle of arrival (AOA) measurement is supported, serving as the transmitting side for the angle of arrival (AOA) measurement is supported, and serving as the transmitting side for the angle of departure (AOD) measurement is not supported, a code 'X010' indicates that serving as the receiving side for the angle of arrival (AOA) measurement is supported, serving as the transmitting side for the angle of arrival (AOA) measurement is not supported, and serving as the transmitting side for the angle of departure (AOD) measurement is not supported, and a code 'X101' indicates that serving as the receiving side for the angle of arrival (AOA) measurement is not supported, serving as the transmitting side for the angle of arrival (AOA) measurement is supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the transmitting side for the angle of departure (AOD) measurement are supported or not, such as 'supporting AOA receiving and transmitting, and supporting AOD transmitting', and 'not supporting AOA receiving, and supporting AOA transmitting and AOD transmitting', etc.

12) The angle measuring capability information includes whether serving as the transmitting side and the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement and serving as a single antenna of the transmitting side are supported or not, and whether serving as a single antenna of the receiving side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the receiving side for the angle of departure (AOD) measurement are supported or not, for example, a code '1X11' indicates that serving as the receiving side for the angle of arrival (AOA) measurement is supported, serving as the transmitting side for the angle of arrival (AOA) measurement is supported, and serving as the receiving side for the angle of departure (AOD) measurement is supported, a code '0X11' indicates that serving as the receiving side for the angle of arrival (AOA) measurement is supported, serving as the transmitting side for the angle of arrival (AOA) measurement is supported, and serving as the receiving side for the angle of departure (AOD) measurement is not supported, '1X01' indicates that serving as the receiving side for the angle of arrival (AOA) measurement is not supported, serving as the transmitting side for the angle of arrival (AOA) measurement is supported, and serving as the receiving side for the angle of departure (AOD) measurement is supported, and '1X00' indicates that serving as the receiving side for the angle of arrival (AOA) measurement is not supported, serving as the transmitting side for the angle of arrival (AOA) measurement is not supported, and serving as the receiving side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the receiving side for the angle of departure (AOD) measurement are supported or not, such as 'supporting AOA receiving and transmitting, and supporting AOD receiving', and 'not supporting AOA receiving, and supporting AOA transmitting and AOD receiving', etc.

13) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the receiving side for the angle of arrival (AOA) measurement and serving as the transmitting side and the receiving side for the angle of departure (AOD) measurement are supported or not, for example, a code '111X' indicates that serving as the receiving side for the angle of arrival (AOA) measurement is supported, serving as the transmitting side for the angle of departure (AOD) measurement is supported, and serving as the receiving side for the angle of departure (AOD) measurement is supported, a code '011X' indicates that serving as the receiving side for the angle of arrival (AOA) measurement is supported, serving as the transmitting side for the angle of departure (AOD) measurement is supported, and serving as the receiving side for the angle of departure (AOD) measurement is not supported, a code '100X' indicates that serving as the receiving side for the angle of arrival (AOA) measurement is not supported, serving as the transmitting side for the angle of departure (AOD) measurement is not supported, and serving as the receiving side for the angle of departure (AOD) measurement is supported, and a code '000X' indicates that serving as the receiving side for the angle of arrival (AOA) measurement is not supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the receiving side for the angle of arrival (AOA) measurement is supported or not, and whether serving as the transmitting side and the receiving side for the angle of departure (AOD) measurement is supported or not, such as 'supporting AOA receiving, and supporting AOD transmitting and receiving', and 'supporting AOA receiving, and not supporting AOD transmitting and AOD receiving', etc.

14) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the transmitting side for the angle of arrival (AOA) measurement and serving as the transmitting side and the receiving side for the angle of departure (AOD) measurement are supported or not, for example, a code '11X1' indicates that serving as the transmitting side for the angle of arrival (AOA) measurement is supported, serving as the transmitting side for the angle of departure (AOD) measurement is supported, and serving as the receiving side for the angle of departure (AOD) measurement is supported, a code '10X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is supported, a code '01X1' indicates that serving as the transmitting side for the angle of arrival (AOA) measurement is supported, serving as the transmitting side for the angle of departure (AOD) measurement is supported, and serving as the receiving side for the angle of departure (AOD) measurement is not supported, and a code '00X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the transmitting side for the angle of arrival (AOA) measurement is supported or not, and whether serving as the transmitting side and the receiving side for the angle of departure (AOD) measurement is supported or not, such as 'supporting AOA transmitting, and supporting AOD transmitting and receiving', and 'supporting AOA transmitting, and not supporting AOD transmitting and AOD receiving', etc.

15) The angle measuring capability information includes whether serving as the transmitting side for the angle of departure (AOD) measurement is supported or not, and whether serving as the receiving side for the angle of departure (AOD) measurement is supported or not, that is, whether serving as a plurality of antennas of the transmitting side for the angle of departure (AOD) measurement are supported or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of departure (AOD) measurement and serving as the receiving side for the angle of departure (AOD) measurement are supported or not, for example, a code '01XX' indicates that serving as the transmitting side for the angle of departure (AOD) measurement is supported and serving as the receiving side for the angle of departure (AOD) measurement is not supported, a code '11XX' indicates that serving as the transmitting side for the angle of departure (AOD) measurement is supported and serving as the receiving side for the angle of departure (AOD) measurement is supported, a code '10XX' indicates that serving as the transmitting side for the angle of departure (AOD) measurement is not supported and serving as the receiving side for the angle of departure (AOD) measurement is supported, and a code '00XX' indicates that serving as the transmitting side for the angle of departure (AOD) measurement is not supported and serving as the receiving side for the angle of departure (AOD) measurement is not supported; and certainly, in the angle measuring capability information, pre-set character keywords may be adopted for indicating whether serving as the transmitting side for the angle of departure (AOD) measurement is supported or not, and whether serving as the receiving side for the angle of departure (AOD) measurement is supported or not, such as 'supporting AOD transmitting and receiving', and 'not supporting AOD transmitting, and supporting AOD receiving', etc.

In an example, the first terminal directly transmits an angle measuring request message to the second terminal according to the angle measuring capability information of the second terminal, where the angle measuring request message includes indicating an angle measuring manner adopted by the second terminal, and indicating a subject type corresponding to the execution of the second terminal for the angle measuring manner.

Alternatively, there may be the following possibilities for the first terminal directly transmitting an angle measuring request message to the second terminal according to the angle measuring capability information of the second terminal:

1) in response to indicating the angle measuring manner adopted by the second terminal to be the AOA measurement, the indicated subject type corresponding to the execution of the second terminal for the angle measuring manner includes: the transmitting side for the AOA measurement, or the receiving side for the AOA measurement.

2) In response to indicating the angle measuring manner adopted by the second terminal to be the AOD measurement, the indicated subject type corresponding to the execution of the second terminal for the angle measuring manner includes: the transmitting side for the AOD measurement, or the receiving side for the AOD measurement.

3) In response to indicating the angle measuring manner adopted by the second terminal to be the AOA measurement or the AOD measurement, the indicated subject type corresponding to the execution of the second terminal for the angle measuring manner includes: the transmitting side for the AOD measurement, or the receiving side for the AOD measurement, or the transmitting side for the AOA measurement, or the receiving side for the AOA measurement.

It needs to be noted that, in the example, the angle measuring request message transmitted to the second terminal according to the angle measuring capability information of the second terminal is certainly compatible with the angle measuring capability of the first terminal, and when the angle measuring capability of the first terminal only supports one subject type of one angle measuring manner, on the premise that the second terminal meets the corresponding angle measuring capability, the angle measuring request message transmitted to the second terminal certainly includes an opposite subject type of the angle measuring manner supported by the first terminal; when the angle measuring capability of the first terminal supports one subject type of all the angle measuring manners, on the premise that the second terminal meets the corresponding angle measuring capability, the angle measuring request message transmitted to the second terminal at least includes the subject types which cannot be supported by the first terminal in any angle measuring manner; and certainly, if the angle measuring capability of the first terminal supports all the subject types of all the angle measuring manners, on the premise that the second terminal meets the corresponding angle measuring capability, the angle measuring request message transmitted to the second terminal may include any angle measuring manner and the corresponding subject type.

For example, when the angle measuring manner corresponding to the angle measuring capability information of the first terminal is supporting serving as the transmitting side for the angle of arrival (AOA) measurement, and the angle measuring capability information of the second terminal is supporting serving as the transmitting side and the receiving side for the angle of arrival (AOA) measurement, the angle measuring request message transmitted to the second terminal includes indicating the angle measuring manner executed by the second terminal to be the angle of arrival (AOA) measurement, and the corresponding subject type is the receiving side.

In an example, in order to further match with the capability of the second terminal to carry out the angle measuring negotiation, the second terminal may further feed back different angle measuring response messages according to own business needs. It is described below in conjunction with different examples:

Example 1

In the example, the angle measuring response message includes applying the angle measuring manner adopted by the second terminal and indicated by the first terminal, and applying the subject type corresponding to the execution of the second terminal for the angle measuring manner and indicated by the first terminal. The applying the angle measuring manner adopted by the second terminal and indicated by the first terminal may be understood as carrying out angle measuring (for example, as needed) on the basis of the angle measuring manner adopted by the second terminal and indicated by the first terminal; and applying the subject type corresponding to the execution of the second terminal for the angle measuring manner and indicated by the first terminal may be understood as carrying out angle measuring (for example, as needed) on the basis of the subject type corresponding to the execution of the second terminal for the angle measuring manner and indicated by the first terminal.

In the example, the angle measuring response message may have the following possibilities:

1) in response to indicating the angle measuring manner adopted by the second terminal to be the AOA measurement, the indicated subject type corresponding to the execution of the second terminal for the angle measuring manner includes: the transmitting side for the AOA measurement, or the receiving side for the AOA measurement.

The angle measuring response message is applying the angle measuring manner of AOA measurement, which is adopted by the second terminal, then the subject type corresponding to the execution for the angle measuring manner includes: the transmitting side for the AOA measurement, or the receiving side for the AOA measurement.

2) In response to indicating the angle measuring manner adopted by the second terminal to be the AOD measurement, the indicated subject type corresponding to the execution of the second terminal for the angle measuring manner includes: the transmitting side for the AOD measurement, or the receiving side for the AOD measurement.

The angle measuring response message is applying the angle measuring manner of AOD measurement, which is adopted by the second terminal, then the subject type corresponding to the execution for the angle measuring manner includes: the transmitting side for the AOD measurement, or the receiving side for the AOD measurement.

3) In response to indicating the angle measuring manner adopted by the second terminal to be the AOA measurement or the AOD measurement, the indicated subject type corresponding to the execution of the second terminal for the angle measuring manner includes: the transmitting side for the AOD measurement, or the receiving side for the AOD measurement, or the transmitting side for the AOA measurement, or the receiving side for the AOA measurement.

The angle measuring response message is applying the angle measuring manner of AOA measurement or AOD measurement, which is adopted by the second terminal, then the subject type corresponding to the execution for the angle measuring manner includes: the transmitting side for the AOD measurement, or the receiving side for the AOD measurement, or the transmitting side for the AOA measurement, or the receiving side for the AOA measurement.

Example 2

In the example, the angle measuring response message fed back by the second terminal includes: rejecting the angle measuring manner adopted by the second terminal and indicated by the first terminal, and/or rejecting the subject type corresponding to the execution of the second terminal for the angle measuring manner and indicated by the first terminal.

In the example, the angle measuring response message may have the following possibilities:

1) in response to indicating the angle measuring manner adopted by the second terminal to be the AOA measurement, the indicated subject type corresponding to the execution of the second terminal for the angle measuring manner includes: the transmitting side for the AOA measurement, or the receiving side for the AOA measurement.

The angle measuring response message is rejecting the AOA measurement, and rejecting the transmitting side for the angle measuring manner of AOA measurement or the receiving side for the AOA measurement.

The angle measuring response message may also be applying the AOA measurement, and rejecting the transmitting side for the angle measuring manner of AOA measurement. The applying the AOA measurement may be understood as carrying out angle measuring on the basis of the AOA measurement.

The angle measuring response message may also be applying the AOA measurement, and rejecting the receiving side for the AOA measurement.

2) In response to indicating the angle measuring manner adopted by the second terminal to be the AOD measurement, the indicated subject type corresponding to the execution of the second terminal for the angle measuring manner includes: the transmitting side for the AOD measurement, or the receiving side for the AOD measurement.

The angle measuring response message is rejecting the angle measuring manner of AOD measurement, which is adopted by the second terminal, and rejecting the subject type corresponding to the execution for the angle measuring manner to be the transmitting side for the AOD measurement, or the receiving side for the AOD measurement.

The angle measuring response message may also be: applying the angle measuring manner of AOD measurement, which is adopted by the second terminal, and rejecting the subject type corresponding to the execution for the angle measuring manner to be the transmitting side for the AOD measurement.

The angle measuring response message may also be: applying the angle measuring manner of AOD measurement, which is adopted by the second terminal, and rejecting the subject type corresponding to the execution for the angle measuring manner to be the receiving side for the AOD measurement.

3) In response to indicating the angle measuring manner adopted by the second terminal to be the AOA measurement or the AOD measurement, the indicated subject type corresponding to the execution of the second terminal for the angle measuring manner includes: the transmitting side for the AOD measurement, or the receiving side for the AOD measurement, or the transmitting side for the AOA measurement, or the receiving side for the AOA measurement.

The angle measuring response message may be rejecting the transmitting side for the angle measuring manner of AOA measurement.

The angle measuring response message may also be rejecting the receiving side for the AOA measurement.

The angle measuring response message may also be: rejecting the subject type corresponding to the execution for the angle measuring manner to be the transmitting side for the AOD measurement.

The angle measuring response message may also be: rejecting the subject type corresponding to the execution for the angle measuring manner to be the receiving side for the AOD measurement.

The angle measuring response message may also be: rejecting the angle measuring manner adopted by the second terminal to be the AOD measurement or the AOA measurement.

Certainly, in order to further increase the efficiency of the angle measuring negotiation, in the example, the angle measuring response message fed back by the second terminal further includes: re-indicating the angle measuring manner adopted by the second terminal, and/or re-indicating the subject type corresponding to the execution of the second terminal for the angle measuring manner.

For example, when the angle measuring response message of the second terminal includes:

1) in response to indicating the angle measuring manner adopted by the second terminal to be the AOA measurement, the indicated subject type corresponding to the execution of the second terminal for the angle measuring manner includes: the transmitting side for the AOA measurement, or the receiving side for the AOA measurement.

The angle measuring response message may be re-indicating the AOA measurement, rejecting the transmitting side for the angle measuring manner of AOA measurement, and re-indicating the receiving side for the AOA measurement.

The angle measuring response message may also be re-indicating the AOA measurement, re-indicating the transmitting side for the angle measuring manner of AOA measurement, and rejecting the receiving side for the AOA measurement.

2) In response to indicating the angle measuring manner adopted by the second terminal to be the AOD measurement, the indicated subject type corresponding to the execution of the second terminal for the angle measuring manner includes: the transmitting side for the AOD measurement, or the receiving side for the AOD measurement.

The angle measuring response message may also be: re-indicating the angle measuring manner adopted by the second terminal to be the AOD measurement, rejecting the subject type corresponding to the execution for the angle measuring manner to be the transmitting side for the AOD measurement, and re-indicating the subject type corresponding to the execution for the angle measuring manner to be the receiving side for the AOD measurement.

The angle measuring response message may also be: re-indicating the angle measuring manner adopted by the second terminal to be the AOD measurement, rejecting the subject type corresponding to the execution for the angle measuring manner to be the receiving side for the AOD measurement, and re-indicating the subject type corresponding to the execution for the angle measuring manner to be the transmitting side for the AOD measurement.

3) In response to indicating the angle measuring manner adopted by the second terminal to be the AOA measurement or the AOD measurement, the indicated subject type corresponding to the execution of the second terminal for the angle measuring manner includes: the transmitting side for the AOD measurement, or the receiving side for the AOD measurement, or the transmitting side for the AOA measurement, or the receiving side for the AOA measurement.

The angle measuring response message may be re-indicating the AOA measurement, rejecting the transmitting side for the angle measuring manner of AOA measurement, and re-indicating the receiving side for the AOA measurement.

The angle measuring response message may also be re-indicating the AOA measurement, re-indicating the transmitting side for the angle measuring manner of AOA measurement, and rejecting the receiving side for the AOA measurement.

The angle measuring response message may also be: re-indicating the angle measuring manner adopted by the second terminal to be the AOD measurement, rejecting the subject type corresponding to the execution for the angle measuring manner to be the transmitting side for the AOD measurement, and re-indicating the subject type corresponding to the execution for the angle measuring manner to be the receiving side for the AOD measurement.

The angle measuring response message may also be: re-indicating the angle measuring manner adopted by the second terminal to be the AOD measurement, rejecting the subject type corresponding to the execution for the angle measuring manner to be the receiving side for the AOD measurement, and re-indicating the subject type corresponding to the execution for the angle measuring manner to be the transmitting side for the AOD measurement.

Example 3

In the example, the angle measuring response message fed back by the second terminal includes: angle measuring request field information for the first terminal, where the angle measuring request field information includes: indicating an angle measuring manner adopted by the first terminal, and indicating a subject type corresponding to the execution of the first terminal for the angle measuring manner.

It may also be understood that, in the example, the second terminal indicates back the angle measuring request field information for the first terminal, informs the first terminal of the angle measuring manner needing to be adopted and the corresponding angle measuring type, so that the efficiency of the angle measuring negotiation is further increased.

Alternatively, the angle measuring response message fed back by the second terminal may have the following possibilities:

1) in response to indicating the angle measuring manner adopted by the first terminal to be the AOA measurement, the indicated subject type corresponding to the execution of the first terminal for the angle measuring manner includes: the transmitting side for the AOA measurement, or the receiving side for the AOA measurement.

2) In response to indicating the angle measuring manner adopted by the second terminal to be the AOD measurement, the indicated subject type corresponding to the execution of the second terminal for the angle measuring manner includes: the transmitting side for the AOD measurement, or the receiving side for the AOD measurement.

3) In response to indicating the angle measuring manner adopted by the first terminal to be the AOA measurement and the AOD measurement, the indicated subject type corresponding to the execution of the first terminal for the angle measuring manner includes: the transmitting side for the AOD measurement, or the receiving side for the AOD measurement, or the transmitting side for the AOA measurement, or the receiving side for the AOA measurement.

It needs to be noted that, in the example, the indicated angle measuring manner of the first terminal, and/or the indicated subject type corresponding to the execution of the first terminal for the angle measuring manner are certainly compatible with the angle measuring capability of the second terminal, and when the angle measuring capability of the second terminal only supports one subject type of one angle measuring manner, on the premise that the first terminal meets the corresponding angle measuring capability, the angle measuring request message transmitted to the first terminal certainly includes an opposite subject type of the angle measuring manner supported by the second terminal; when the angle measuring capability of the second terminal supports one subject type of all the angle measuring manners, on the premise that the first terminal meets the corresponding angle measuring capability, the angle measuring request message transmitted to the first terminal at least includes the subject types which cannot be supported by the second terminal in any angle measuring manner; and certainly, if the angle measuring capability of the second terminal supports all the subject types of all the angle measuring manners, on the premise that the first terminal meets the corresponding angle measuring capability, the angle measuring request message transmitted to the first terminal may include any angle measuring manner and the corresponding subject type.

For example, when the angle measuring manner corresponding to the angle measuring capability information of the second terminal is serving as the transmitting side for the angle of arrival (AOA) measurement, and the angle measuring capability information of the first terminal is supporting serving as the transmitting side and the receiving side for the angle of arrival (AOA) measurement, then the angle measuring response message includes indicating the angle measuring manner executed by the first terminal to be the angle of arrival (AOA) measurement, and indicating the corresponding subject type to be the receiving side.

Alternatively, after receiving the angle measuring request field information transmitted by the second terminal, the first terminal may further transmit an angle measuring response message to the second terminal.

It needs to be noted that, in different application scenes, the angle measuring response manners transmitted by the first terminal to the second terminal may be different, and examples are as follows:

Example 1

In an example, the angle measuring response message includes: applying the angle measuring manner adopted by the first terminal and indicated by the second terminal, and applying the subject type corresponding to the execution of the first terminal for the angle measuring manner and indicated by the second terminal. The applying the angle measuring manner adopted by the first terminal and indicated by the second terminal may be understood as carrying out angle measuring (for example, as needed) on the basis of the angle measuring manner adopted by the first terminal and indicated by the second terminal; and the applying the subject type corresponding to the execution of the first terminal for the angle measuring manner and indicated by the second terminal may be understood as carrying out angle measuring (for example, as needed) on the basis of the subject type corresponding to the execution of the first terminal for the angle measuring manner and indicated by the second terminal.

In the example, the angle measuring response message may have the following possibilities:

1) in response to indicating the angle measuring manner adopted by the first terminal to be the AOA measurement, the indicated subject type corresponding to the execution of the first terminal for the angle measuring manner includes: the transmitting side for the AOA measurement, or the receiving side for the AOA measurement.

The angle measuring response message is applying the angle measuring manner of AOA measurement, which is adopted by the first terminal, then the subject type corresponding to the execution for the angle measuring manner includes: the transmitting side for the AOA measurement, or the receiving side for the AOA measurement.

2) In response to indicating the angle measuring manner adopted by the first terminal to be the AOD measurement, the indicated subject type corresponding to the execution of the first terminal for the angle measuring manner includes: the transmitting side for the AOD measurement, or the receiving side for the AOD measurement.

The angle measuring response message is applying the angle measuring manner of AOD measurement, which is adopted by the first terminal, then the subject type corresponding to the execution for the angle measuring manner includes: the transmitting side for the AOD measurement, or the receiving side for the AOD measurement.

3) In response to indicating the angle measuring manner adopted by the first terminal to be the AOA measurement or the AOD measurement, the indicated subject type corresponding to the execution of the first terminal for the angle measuring manner includes: the transmitting side for the AOD measurement, or the receiving side for the AOD measurement, or the transmitting side for the AOA measurement, or the receiving side for the AOA measurement.

The angle measuring response message is applying the angle measuring manner of AOA measurement or AOD measurement, which is adopted by the first terminal, then the subject type corresponding to the execution for the angle measuring manner includes: the transmitting side for the AOD measurement, or the receiving side for the AOD measurement, or the transmitting side for the AOA measurement, or the receiving side for the AOA measurement.

Example 2

In an example, the angle measuring response message includes: rejecting the angle measuring manner adopted by the first terminal and indicated by the second terminal, and/or rejecting the subject type corresponding to the execution of the first terminal for the angle measuring manner and indicated by the second terminal.

In the example, the angle measuring response message may have the following possibilities:

1) in response to indicating the angle measuring manner adopted by the first terminal to be the AOA measurement, the indicated subject type corresponding to the execution of the first terminal for the angle measuring manner includes: the transmitting side for the AOA measurement, or the receiving side for the AOA measurement.

The angle measuring response message is rejecting the AOA measurement, and rejecting the transmitting side for the angle measuring manner of AOA measurement or the receiving side for the AOA measurement.

The angle measuring response message may also be applying the AOA measurement, and rejecting the transmitting side for the angle measuring manner of AOA measurement.

The angle measuring response message may also be applying the AOA measurement, and rejecting the receiving side for the AOA measurement.

2) In response to indicating the angle measuring manner adopted by the first terminal to be the AOD measurement, the indicated subject type corresponding to the execution of the first terminal for the angle measuring manner includes: the transmitting side for the AOD measurement, or the receiving side for the AOD measurement.

The angle measuring response message is rejecting the angle measuring manner adopted by the first terminal to be the AOD measurement, and rejecting the subject type corresponding to the execution for the angle measuring manner to be the transmitting side for the AOD measurement, or the receiving side for the AOD measurement.

The angle measuring response message may also be: applying the angle measuring manner of AOD measurement, which is adopted by the first terminal, and rejecting the subject type corresponding to the execution for the angle measuring manner to be the transmitting side for the AOD measurement.

The angle measuring response message may also be: applying the angle measuring manner of AOD measurement, which is adopted by the first terminal, and rejecting the subject type corresponding to the execution for the angle measuring manner to be the receiving side for the AOD measurement.

3) In response to indicating the angle measuring manner adopted by the first terminal to be the AOA measurement or the AOD measurement, the indicated subject type corresponding to the execution of the first terminal for the angle measuring manner includes: the transmitting side for the AOD measurement, or the receiving side for the AOD measurement, or the transmitting side for the AOA measurement, or the receiving side for the AOA measurement.

The angle measuring response message may be rejecting the transmitting side for the angle measuring manner of AOA measurement.

The angle measuring response message may also be rejecting the receiving side for the AOA measurement.

The angle measuring response message may also be: rejecting the subject type corresponding to the execution for the angle measuring manner to be the transmitting side for the AOD measurement.

The angle measuring response message may also be: rejecting the subject type corresponding to the execution for the angle measuring manner to be the receiving side for the AOD measurement.

The angle measuring response message may also be: rejecting the angle measuring manner adopted by the first terminal to be the AOD measurement or the AOA measurement.

Certainly, in order to further increase the efficiency of the angle measuring negotiation, in the example, the angle measuring response message fed back by the first terminal further includes: re-indicating the angle measuring manner adopted by the first terminal, and/or re-indicating the subject type corresponding to the execution of the first terminal for the angle measuring manner.

For example, when the angle measuring response message of the first terminal includes:

1) in response to indicating the angle measuring manner adopted by the first terminal to be the AOA measurement, the indicated subject type corresponding to the execution of the first terminal for the angle measuring manner includes: the transmitting side for the AOA measurement, or the receiving side for the AOA measurement.

The angle measuring response message may be re-indicating the AOA measurement, rejecting the transmitting side for the angle measuring manner of AOA measurement, and re-indicating the receiving side for the AOA measurement.

The angle measuring response message may also be re-indicating the AOA measurement, re-indicating the transmitting side for the angle measuring manner of AOA measurement, and rejecting the receiving side for the AOA measurement.

2) In response to indicating the angle measuring manner adopted by the first terminal to be the AOD measurement, the indicated subject type corresponding to the execution of the first terminal for the angle measuring manner includes: the transmitting side for the AOD measurement, or the receiving side for the AOD measurement.

The angle measuring response message may also be: re-indicating the angle measuring manner adopted by the first terminal to be the AOD measurement, rejecting the subject type corresponding to the execution for the angle measuring manner to be the transmitting side for the AOD measurement, and re-indicating the subject type corresponding to the execution for the angle measuring manner to be the receiving side for the AOD measurement.

The angle measuring response message may also be: re-indicating the angle measuring manner adopted by the first terminal to be the AOD measurement, rejecting the subject type corresponding to the execution for the angle measuring manner to be the receiving side for the AOD measurement, and re-indicating the subject type corresponding to the execution for the angle measuring manner to be the transmitting side for the AOD measurement.

3) In response to indicating the angle measuring manner adopted by the first terminal to be the AOA measurement or the AOD measurement, the indicated subject type corresponding to the execution of the first terminal for the angle measuring manner includes: the transmitting side for the AOD measurement, or the receiving side for the AOD measurement, or the transmitting side for the AOA measurement, or the receiving side for the AOA measurement.

The angle measuring response message may be re-indicating the AOA measurement, rejecting the transmitting side for the angle measuring manner of AOA measurement, and re-indicating the receiving side for the AOA measurement.

The angle measuring response message may also be re-indicating the AOA measurement, re-indicating the transmitting side for the angle measuring manner of AOA measurement, and rejecting the receiving side for the AOA measurement.

The angle measuring response message may also be: re-indicating the angle measuring manner adopted by the first terminal to be the AOD measurement, rejecting the subject type corresponding to the execution for the angle measuring manner to be the transmitting side for the AOD measurement, and re-indicating the subject type corresponding to the execution for the angle measuring manner to be the receiving side for the AOD measurement.

The angle measuring response message may also be: re-indicating the angle measuring manner adopted by the first terminal to be the AOD measurement, rejecting the subject type corresponding to the execution for the angle measuring manner to be the receiving side for the AOD measurement, and re-indicating the subject type corresponding to the execution for the angle measuring manner to be the transmitting side for the AOD measurement.

In an example of the present disclosure, the first terminal transmits an angle measuring request message to the second terminal, and the second terminal feeds back an angle measuring response message carrying the angle measuring request information of the second terminal to the first terminal, where an interface used for communication between the first terminal and the second terminal by adopting a Sidelink technology is a PC5 interface, and the above two protocols, that is, a PC5-S protocol and an RRC protocol, are supported in a control surface of the Sidelink technology. Therefore, the angle measuring request message and the response message are transmitted by adopting PC5 RRC messages, or PC5-S messages.

In conclusion, according to the angle measuring processing manner in the examples of the present disclosure, the first terminal directly indicates the angle measuring type of the second terminal and the corresponding subject type according to the angle measuring capability information of the second terminal, the second terminal may flexibly determine the content of the angle measuring response message fed back, and the angle measuring negotiation compatible with the angle measuring capabilities of the first terminal and the second terminal is ensured, so that the reliability and flexibility of the angle measuring negotiation are improved.

The following secondly focuses on a second terminal side to describe the angle measuring processing method in the examples of the present disclosure.

Figure 10:
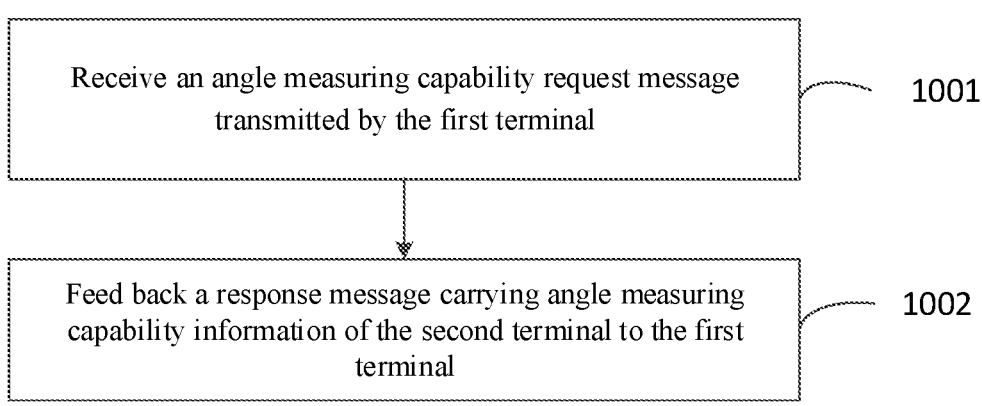
FIG. 10 is a flow diagram of an angle measuring processing method according to yet another example of the present disclosure.

FIG. 10 is a flow diagram of an angle measuring processing method according to yet another example of the present disclosure, and as shown in FIG. 10, the method includes:

step 1001, receiving the angle measuring capability request message transmitted by the first terminal.

In consideration of that in an actual execution process, in order to realize measurement for an angle of arrival, a receiving side for signals needs to have at least two antennas, while a transmitting side may only have one antenna. In an angle measuring manner for the angle of arrival, referring to FIG. 6 (*a*), the receiving side uses a plurality of signals received for calculating an angle of a signal source. Similarly, referring to FIG. 6 (*b*), the angle measuring manner for an angle of departure requires the transmitting side to have at least two antennas. The receiving side may only have one antenna, receive a plurality of signals, and calculate an angle of a signal source.

In specific angle measuring calculation, in the angle measuring manner for the angle of arrival, for example, a device with a multi-antenna linear array is taken as the receiving side, and another device with a single antenna is taken as the transmitting side, and it is assumed that a radio wave is a planar wave surface rather than a spherical surface. If the transmitting side transmitting a sine wave in the air is located on a normal perpendicular to an array line, each antenna in the array receives an input signal with the same phase. If the transmitter is not located on the normal, the receiving antennas measure a phase difference between channels, and use phase difference information for estimating the angle of arrival.

In the angle measuring manner for the angle of departure, a basic principle for measuring a phase difference is the same. In the angle measuring manner for the angle of departure, the tracked receiving side only uses a single antenna, while the transmitting side uses a plurality of antennas. In the angle measuring manner for the angle of departure, for example, the transmitting side such as a Bluetooth positioning beacon transmits a signal through an antenna array, while the receiving side such as a smart phone uses a single antenna for receiving the signal, and decodes the signal to calculate a relative signal direction.

Therefore, when the first terminal and the second terminal negotiates the angle measuring, the basis of the negotiation is the angle measuring capabilities of the first terminal and the second terminal, and the purpose of the negotiation is to determine a respective subject type (the receiving side or the transmitting side) of the first terminal and the second terminal in the angle measuring, etc, therefore, the first terminal transmits an angle measuring capability request message to the second terminal, the angle measuring capability request message may be any predetermined event that may indicate the angle measuring negotiation, and the following provides examples for describing a specific content of the angle measuring capability request message:

Example 1

In the example, the angle measuring capability request message includes angle measuring capability information of the first terminal, that is, the first terminal first transmits the own angle measuring capability information to the second terminal, so that the second terminal negotiates an angle measuring manner with the first terminal according to the angle measuring capability information.

The angle measuring capability information of the first terminal may include but is not limited to the following manners:

1) the angle measuring capability information includes whether serving as the transmitting side for the angle of arrival (AOA) measurement is supported or not, that is, whether serving as a single antenna of the transmitting side for the angle of arrival (AOA) measurement is supported or not, etc.

In an example, in the angle measuring capability information, pre-set codes may be adopted for indicating whether serving as the transmitting side for the angle of arrival (AOA) measurement is supported or not, for example, a code 'XXX1' indicates that serving as the transmitting side for the angle of arrival (AOA) measurement is supported, and a code 'XXX0' indicates that serving as the transmitting side for the angle of arrival (AOA) measurement is not supported; and certainly, in the angle measuring capability information, pre-set character keywords may be adopted for indicating whether serving as the transmitting side for the angle of arrival (AOA) measurement is supported or not, such as 'supporting AOA transmitting', and 'not supporting AOA transmitting', etc.

2) The angle measuring capability information includes whether serving as the receiving side for the angle of arrival (AOA) measurement is supported or not, that is, whether serving as a plurality of antennas of the receiving side for the angle of arrival (AOA) measurement is supported or not, etc.

In an example, in the angle measuring capability information, pre-set codes may be adopted for indicating whether serving as the receiving side for the angle of arrival (AOA) measurement is supported or not, for example, a code 'XX1X' indicates that serving as the receiving side for the angle of arrival (AOA) measurement is supported, and a code 'XX0X' indicates that serving as the receiving side for the angle of arrival (AOA) measurement is not supported; and certainly, in the angle measuring capability information, pre-set character keywords may be adopted for indicating whether serving as the receiving side for the angle of arrival (AOA) measurement is supported or not, such as 'supporting AOA receiving', and 'not supporting AOA receiving', etc.

3) The angle measuring capability information includes whether serving as the transmitting side for the angle of departure (AOD) measurement is supported or not, that is, whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of departure (AOD) measurement is supported or not, for example, a code 'X1XX' indicates that serving as the transmitting side for the angle of departure (AOD) measurement is supported, and a code 'X0XX' indicates that serving as the transmitting side for the angle of departure (AOD) measurement is not supported; and certainly, in the angle measuring capability information, pre-set character keywords may be adopted for indicating whether serving as the transmitting side for the angle of departure (AOD) measurement is supported or not, such as 'supporting AOD transmitting', and 'not supporting AOD transmitting', etc.

4) The angle measuring capability information includes whether serving as the receiving side for the angle of departure (AOD) measurement is supported or not, that is, whether serving as a single antenna of the receiving side for the angle of departure (AOD) measurement is supported or not, etc.

In an example, in the angle measuring capability information, pre-set codes may be adopted for indicating whether serving as the receiving side for the angle of departure (AOD) measurement is supported or not, for example, a code '1XXX' indicates that serving as the receiving side for the angle of departure (AOD) measurement is supported, and a code '0XXX' indicates that serving as the receiving side for the angle of departure (AOD) measurement is not supported; and certainly, in the angle measuring capability information, pre-set character keywords may be adopted for indicating whether serving as the receiving side for the angle of departure (AOD) measurement is supported or not, such as 'supporting AOD receiving', and 'not supporting AOD receiving', etc.

5) The angle measuring capability information includes whether serving as the transmitting side for the angle of arrival (AOA) measurement is supported or not, and whether serving as the receiving side for the angle of arrival (AOA) measurement is supported or not, that is, whether serving as a single antenna of the transmitting side for the angle of arrival (AOA) measurement is supported or not, and whether serving as a plurality of antennas of the receiving side for the angle of arrival (AOA) measurement is supported or not, etc.

In an example, in the angle measuring capability information, pre-set codes may be adopted for indicating whether serving as the transmitting side for the angle of arrival (AOA) measurement and serving as the receiving side for the angle of arrival (AOA) measurement are supported or not, for example, a code 'XX01' indicates that serving as the transmitting side for the angle of arrival (AOA) measurement is supported and serving as the receiving side for the angle of arrival (AOA) measurement is not supported, a code 'XX11' indicates that serving as the transmitting side for the angle of arrival (AOA) measurement is supported and serving as the receiving side for the angle of arrival (AOA) measurement is supported, a code 'XX10' indicates that serving as the transmitting side for the angle of arrival (AOA) measurement is not supported and serving as the receiving side for the angle of arrival (AOA) measurement is supported, and a code 'XX00' indicates that serving as the transmitting side for the angle of arrival (AOA) measurement is not supported and serving as the receiving side for the angle of arrival (AOA) measurement is not supported; and certainly, in the angle measuring capability information, pre-set character keywords may be adopted for indicating whether serving as the transmitting side for the angle of arrival (AOA) measurement and serving as the receiving side for the angle of arrival (AOA) measurement are supported or not, such as 'supporting AOA transmitting and receiving', and 'not supporting AOA transmitting and supporting AOA receiving', etc.

6) The angle measuring capability information includes whether serving as the transmitting side for the angle of arrival (AOA) measurement is supported or not, and whether serving as the transmitting side for the angle of departure (AOD) measurement is supported or not, that is, whether serving as a single antenna of the transmitting side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of arrival (AOA) measurement and serving as the transmitting side for the angle of departure (AOD) measurement are supported or not, for example, a code 'X0X1' indicates that serving as the transmitting side for the angle of arrival (AOA) measurement is supported and serving as the transmitting side for the angle of departure (AOD) measurement is not supported, a code 'X1X1' indicates that serving as the transmitting side for the angle of arrival (AOA) measurement is supported and serving as the transmitting side for the angle of departure (AOD) measurement is supported, a code 'X1X0' indicates that serving as the transmitting side for the angle of arrival (AOA) measurement is not supported and serving as the transmitting side for the angle of departure (AOD) measurement is supported, and a code 'X0X0' indicates that serving as the transmitting side for the angle of arrival (AOA) measurement is not supported and serving as the transmitting side for the angle of departure (AOD) measurement is not supported; and certainly, in the angle measuring capability information, pre-set character keywords may be adopted for indicating whether serving as the transmitting side for the angle of arrival (AOA) measurement and serving as the transmitting side for the angle of departure (AOD) measurement are supported or not, such as 'supporting AOA transmitting and AOD transmitting', and 'not supporting AOA transmitting and AOD transmitting', etc.

7) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of arrival (AOA) measurement and serving as the receiving side for the angle of departure (AOD) measurement are supported or not, for example, a code '0XX1' indicates that serving as the transmitting side for the angle of arrival (AOA) measurement is supported and serving as the receiving side for the angle of departure (AOD) measurement is not supported, a code '1XX1' indicates that serving as the transmitting side for the angle of arrival (AOA) measurement is supported and serving as the receiving side for the angle of departure (AOD) measurement is supported, a code '1XX0' indicates that serving as the transmitting side for the angle of arrival (AOA) measurement is not supported and serving as the receiving side for the angle of departure (AOD) measurement is supported, and a code '0XX0' indicates that serving as the transmitting side for the angle of arrival (AOA) measurement is not supported and serving as the receiving side for the angle of departure (AOD) measurement is not supported; and certainly, in the angle measuring capability information, pre-set character keywords may be adopted for indicating whether serving as the transmitting side for the angle of arrival (AOA) measurement and serving as the receiving side for the angle of departure (AOD) measurement are supported or not, such as 'supporting AOA transmitting and AOD receiving', and 'not supporting AOA transmitting and AOD receiving', etc.

8) The angle measuring capability information includes whether serving as the transmitting side and the receiving side for the angle of arrival (AOA) measurement is supported or not, and whether serving as the transmitting side and the receiving side for the angle of departure (AOD) measurement is supported or not, that is, whether serving as a single antenna of the transmitting side for the angle of arrival (AOA) measurement and serving as a plurality of antennas of the receiving side are supported or not, and whether serving as a single antenna of the receiving side for the angle of departure (AOD) measurement and serving as a plurality of antennas of the transmitting side are supported or not, etc.

In an example, in the angle measuring capability information, pre-set codes may be adopted for indicating whether serving as the transmitting side and the receiving side for the angle of arrival (AOA) measurement and serving as the transmitting side and the receiving side for the angle of departure (AOD) measurement are supported or not, for example, a code '0001' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is not supported, a code '0011' indicates that serving as the transmitting side and the receiving side for the angle of arrival (AOA) measurement is supported, serving as the receiving side for the angle of departure (AOD) measurement is not supported, and serving as the transmitting side for the angle of departure (AOD) measurement is not supported, a code '1001' indicates that serving as the transmitting side for the angle of arrival (AOA) measurement is supported, serving as the receiving side for the angle of arrival (AOA) measurement is not supported, serving as the receiving side for the angle of departure (AOD) measurement is supported, and serving as the transmitting side for the angle of departure (AOD) measurement is not supported, and a code '0101' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement is supported or not, and whether serving as the transmitting side and the receiving side for the angle of departure (AOD) measurement is supported or not, such as 'supporting AOA transmitting and receiving, and not supporting AOD transmitting and AOD receiving', and 'not supporting AOA transmitting and receiving, and not supporting AOD transmitting and AOD receiving', etc.

9) The angle measuring capability information includes whether serving as the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the receiving side for the angle of arrival (AOA) measurement and serving as the transmitting side for the angle of departure (AOD) measurement are supported or not, for example, a code 'X01X' indicates that serving as the receiving side for the angle of arrival (AOA) measurement is supported and serving as the transmitting side for the angle of departure (AOD) measurement is not supported, a code 'X11X' indicates that serving as the receiving side for the angle of arrival (AOA) measurement is supported and serving as the transmitting side for the angle of departure (AOD) measurement is supported, a code 'X00X' indicates that serving as the receiving side for the angle of arrival (AOA) measurement is not supported and serving as the transmitting side for the angle of departure (AOD) measurement is not supported, and a code 'X10X' indicates that serving as the receiving side for the angle of arrival (AOA) measurement is not supported and serving as the transmitting side for the angle of departure (AOD) measurement is supported; and certainly, in the angle measuring capability information, pre-set character keywords may be adopted for indicating whether serving as the receiving side for the angle of arrival (AOA) measurement and serving as the transmitting side for the angle of departure (AOD) measurement are supported or not, such as 'supporting AOA receiving and AOD transmitting', and 'not supporting AOA receiving and AOD transmitting', etc.

10) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the receiving side for the angle of arrival (AOA) measurement and serving as the receiving side for the angle of departure (AOD) measurement are supported or not, for example, a code '0X1X' indicates that serving as the receiving side for the angle of arrival (AOA) measurement is supported and serving as the receiving side for the angle of departure (AOD) measurement is not supported, a code '0X0X' indicates that serving as the receiving side for the angle of arrival (AOA) measurement is not supported and serving as the receiving side for the angle of departure (AOD) measurement is not supported, a code '1X1X' indicates that serving as the receiving side for the angle of arrival (AOA) measurement is supported and serving as the receiving side for the angle of departure (AOD) measurement is supported, and a code '1X0X' indicates that serving as the receiving side for the angle of arrival (AOA) measurement is not supported and serving as the receiving side for the angle of departure (AOD) measurement is supported; and certainly, in the angle measuring capability information, pre-set character keywords may be adopted for indicating whether serving as the receiving side for the angle of arrival (AOA) measurement and serving as the receiving side for the angle of departure (AOD) measurement are supported or not, such as 'supporting AOA receiving and AOD receiving', and 'not supporting AOA receiving and AOD receiving', etc.

11) The angle measuring capability information includes whether serving as the transmitting side and the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement and serving as a single antenna of the transmitting side are supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the transmitting side for the angle of departure (AOD) measurement are supported or not, for example, a code 'X111' indicates that serving as the receiving side for the angle of arrival (AOA) measurement is supported, serving as the transmitting side for the angle of arrival (AOA) measurement is supported, and serving as the transmitting side for the angle of departure (AOD) measurement is supported, a code 'X011' indicates that serving as the receiving side for the angle of arrival (AOA) measurement is supported, serving as the transmitting side for the angle of arrival (AOA) measurement is supported, and serving as the transmitting side for the angle of departure (AOD) measurement is not supported, a code 'X010' indicates that serving as the receiving side for the angle of arrival (AOA) measurement is supported, serving as the transmitting side for the angle of arrival (AOA) measurement is not supported, and serving as the transmitting side for the angle of departure (AOD) measurement is not supported, and a code 'X101' indicates that serving as the receiving side for the angle of arrival (AOA) measurement is not supported, serving as the transmitting side for the angle of arrival (AOA) measurement is supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the transmitting side for the angle of departure (AOD) measurement are supported or not, such as 'supporting AOA receiving and transmitting, and supporting AOD transmitting', and 'not supporting AOA receiving, and supporting AOA transmitting and AOD transmitting', etc.

12) The angle measuring capability information includes whether serving as the transmitting side and the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement and serving as a single antenna of the transmitting side are supported or not, and whether serving as a single antenna of the receiving side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the receiving side for the angle of departure (AOD) measurement are supported or not, for example, a code '1X11' indicates that serving as the receiving side for the angle of arrival (AOA) measurement is supported, serving as the transmitting side for the angle of arrival (AOA) measurement is supported, and serving as the receiving side for the angle of departure (AOD) measurement is supported, a code '0X11' indicates that serving as the receiving side for the angle of arrival (AOA) measurement is supported, serving as the transmitting side for the angle of arrival (AOA) measurement is supported, and serving as the receiving side for the angle of departure (AOD) measurement is not supported, '1X01' indicates that serving as the receiving side for the angle of arrival (AOA) measurement is not supported, serving as the transmitting side for the angle of arrival (AOA) measurement is supported, and serving as the receiving side for the angle of departure (AOD) measurement is supported, and '1X00' indicates that serving as the receiving side for the angle of arrival (AOA) measurement is not supported, serving as the transmitting side for the angle of arrival (AOA) measurement is not supported, and serving as the receiving side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the receiving side for the angle of departure (AOD) measurement are supported or not, such as 'supporting AOA receiving and transmitting, and supporting AOD receiving', and 'not supporting AOA receiving, and supporting AOA transmitting and AOD receiving', etc.

13) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the receiving side for the angle of arrival (AOA) measurement and serving as the transmitting side and the receiving side for the angle of departure (AOD) measurement are supported or not, for example, a code '111X' indicates that serving as the receiving side for the angle of arrival (AOA) measurement is supported, serving as the transmitting side for the angle of departure (AOD) measurement is supported, and serving as the receiving side for the angle of departure (AOD) measurement is supported, a code '011X' indicates that serving as the receiving side for the angle of arrival (AOA) measurement is supported, serving as the transmitting side for the angle of departure (AOD) measurement is supported, and serving as the receiving side for the angle of departure (AOD) measurement is not supported, a code '100X' indicates that serving as the receiving side for the angle of arrival (AOA) measurement is not supported, serving as the transmitting side for the angle of departure (AOD) measurement is not supported, and serving as the receiving side for the angle of departure (AOD) measurement is supported, and a code '000X' indicates that serving as the receiving side for the angle of arrival (AOA) measurement is not supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the receiving side for the angle of arrival (AOA) measurement is supported or not, and whether serving as the transmitting side and the receiving side for the angle of departure (AOD) measurement is supported or not, such as 'supporting AOA receiving, and supporting AOD transmitting and receiving', and 'supporting AOA receiving, and not supporting AOD transmitting and AOD receiving', etc.

14) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the transmitting side for the angle of arrival (AOA) measurement and serving as the transmitting side and the receiving side for the angle of departure (AOD) measurement are supported or not, for example, a code '11X1' indicates that serving as the transmitting side for the angle of arrival (AOA) measurement is supported, serving as the transmitting side for the angle of departure (AOD) measurement is supported, and serving as the receiving side for the angle of departure (AOD) measurement is supported, a code '10X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is supported, a code '01X1' indicates that serving as the transmitting side for the angle of arrival (AOA) measurement is supported, serving as the transmitting side for the angle of departure (AOD) measurement is supported, and serving as the receiving side for the angle of departure (AOD) measurement is not supported, and a code '00X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the transmitting side for the angle of arrival (AOA) measurement is supported or not, and whether serving as the transmitting side and the receiving side for the angle of departure (AOD) measurement is supported or not, such as 'supporting AOA transmitting, and supporting AOD transmitting and receiving', and 'supporting AOA transmitting, and not supporting AOD transmitting and AOD receiving', etc.

15) The angle measuring capability information includes whether serving as the transmitting side for the angle of departure (AOD) measurement is supported or not, and whether serving as the receiving side for the angle of departure (AOD) measurement is supported or not, that is, whether a plurality of antennas of the transmitting side for the angle of departure (AOD) measurement are provided or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of departure (AOD) measurement and serving as the receiving side for the angle of departure (AOD) measurement are supported or not, for example, a code '01XX' indicates that serving as the transmitting side for the angle of departure (AOD) measurement is supported and serving as the receiving side for the angle of departure (AOD) measurement is not supported, a code '11XX' indicates that serving as the transmitting side for the angle of departure (AOD) measurement is supported and serving as the receiving side for the angle of departure (AOD) measurement is supported, a code '10XX' indicates that serving as the transmitting side for the angle of departure (AOD) measurement is not supported and serving as the receiving side for the angle of departure (AOD) measurement is supported, and a code '00XX' indicates that serving as the transmitting side for the angle of departure (AOD) measurement is not supported and serving as the receiving side for the angle of departure (AOD) measurement is not supported; and certainly, in the angle measuring capability information, pre-set character keywords may be adopted for indicating whether serving as the transmitting side for the angle of departure (AOD) measurement is supported or not, and whether serving as the receiving side for the angle of departure (AOD) measurement is supported or not, such as 'supporting AOD transmitting and receiving', and 'not supporting AOD transmitting, and supporting AOD receiving', etc.

Example 2

In the example, the angle measuring capability request message includes a request indication field used for indicating the second terminal to transmit angle measuring capability information, that is, in the example, capability of the second terminal in angle measuring is directly specified according to angle measuring capability of the first terminal, a content indicated by the request indication field may be determined according to a scene, such as an indication field used for specifying the second terminal to serve as a transmitting side in an angle measuring manner for an angle of arrival (AOA), an indication field used for specifying the second terminal to serve as a receiving side in an angle measuring manner for an angle of departure (AOD), and an indication field used for specifying the second terminal to serve as a transmitting side in the angle measuring manner for the angle of departure (AOD).

Step 1002, feeding back a response message carrying angle measuring capability information of the second terminal to the first terminal.

In an example, the second terminal feeds back the response message carrying angle measuring capability information of the second terminal to the first terminal, and therefore, an angle measuring manner may be negotiated according to the angle measuring capability of the first terminal and the angle measuring capability message of the second terminal.

It needs to be noted that, the angle measuring capability information of the second terminal may include, but is not limited to, the following manners in different application scenes:

1) the angle measuring capability information includes whether serving as the transmitting side for the angle of arrival (AOA) measurement is supported or not, that is, whether serving as a single antenna of the transmitting side for the angle of arrival (AOA) measurement is supported or not, etc.

In an example, in the angle measuring capability information, pre-set codes may be adopted for indicating whether serving as the transmitting side for the angle of arrival (AOA) measurement is supported or not, for example, a code 'XXX1' indicates that serving as the transmitting side for the angle of arrival (AOA) measurement is supported, and a code 'XXX0' indicates that serving as the transmitting side for the angle of arrival (AOA) measurement is not supported; and certainly, in the angle measuring capability information, pre-set character keywords may be adopted for indicating whether serving as the transmitting side for the angle of arrival (AOA) measurement is supported or not, such as 'supporting AOA transmitting', and 'not supporting AOA transmitting', etc.

2) The angle measuring capability information includes whether serving as the receiving side for the angle of arrival (AOA) measurement is supported or not, that is, whether serving as a plurality of antennas of the receiving side for the angle of arrival (AOA) measurement is supported or not, etc.

In an example, in the angle measuring capability information, pre-set codes may be adopted for indicating whether serving as the receiving side for the angle of arrival (AOA) measurement is supported or not, for example, a code 'XX1X' indicates that serving as the receiving side for the angle of arrival (AOA) measurement is supported, and a code 'XX0X' indicates that serving as the receiving side for the angle of arrival (AOA) measurement is not supported; and certainly, in the angle measuring capability information, pre-set character keywords may be adopted for indicating whether serving as the receiving side for the angle of arrival (AOA) measurement is supported or not, such as 'supporting AOA receiving', and 'not supporting AOA receiving', etc.

3) The angle measuring capability information includes whether serving as the transmitting side for the angle of departure (AOD) measurement is supported or not, that is, whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of departure (AOD) measurement is supported or not, for example, a code 'X1XX' indicates that serving as the transmitting side for the angle of departure (AOD) measurement is supported, and a code 'X0XX' indicates that serving as the transmitting side for the angle of departure (AOD) measurement is not supported; and certainly, in the angle measuring capability information, pre-set character keywords may be adopted for indicating whether serving as the transmitting side for the angle of departure (AOD) measurement is supported or not, such as 'supporting AOD transmitting', and 'not supporting AOD transmitting', etc.

4) The angle measuring capability information includes whether serving as the receiving side for the angle of departure (AOD) measurement is supported or not, that is, whether serving as a single antenna of the receiving side for the angle of departure (AOD) measurement is supported or not, etc.

In an example, in the angle measuring capability information, pre-set codes may be adopted for indicating whether serving as the receiving side for the angle of departure (AOD) measurement is supported or not, for example, a code '1XXX' indicates that serving as the receiving side for the angle of departure (AOD) measurement is supported, and a code '0XXX' indicates that serving as the receiving side for the angle of departure (AOD) measurement is not supported; and certainly, in the angle measuring capability information, pre-set character keywords may be adopted for indicating whether serving as the receiving side for the angle of departure (AOD) measurement is supported or not, such as 'supporting AOD receiving', and 'not supporting AOD receiving', etc.

5) The angle measuring capability information includes whether serving as the transmitting side for the angle of arrival (AOA) measurement is supported or not, and whether serving as the receiving side for the angle of arrival (AOA) measurement is supported or not, that is, whether serving as a single antenna of the transmitting side for the angle of arrival (AOA) measurement is supported or not, and whether serving as a plurality of antennas of the receiving side for the angle of arrival (AOA) measurement is supported or not, etc.

In an example, in the angle measuring capability information, pre-set codes may be adopted for indicating whether serving as the transmitting side for the angle of arrival (AOA) measurement and serving as the receiving side for the angle of arrival (AOA) measurement are supported or not, for example, a code 'XX01' indicates that serving as the transmitting side for the angle of arrival (AOA) measurement is supported and serving as the receiving side for the angle of arrival (AOA) measurement is not supported, a code 'XX11' indicates that serving as the transmitting side for the angle of arrival (AOA) measurement is supported and serving as the receiving side for the angle of arrival (AOA) measurement is supported, a code 'XX10' indicates that serving as the transmitting side for the angle of arrival (AOA) measurement is not supported and serving as the receiving side for the angle of arrival (AOA) measurement is supported, and a code 'XX00' indicates that serving as the transmitting side for the angle of arrival (AOA) measurement is not supported and serving as the receiving side for the angle of arrival (AOA) measurement is not supported; and certainly, in the angle measuring capability information, pre-set character keywords may be adopted for indicating whether serving as the transmitting side for the angle of arrival (AOA) measurement and serving as the receiving side for the angle of arrival (AOA) measurement are supported or not, such as 'supporting AOA transmitting and receiving', and 'not supporting AOA transmitting and supporting AOA receiving', etc.

6) The angle measuring capability information includes whether serving as the transmitting side for the angle of arrival (AOA) measurement is supported or not, and whether serving as the transmitting side for the angle of departure (AOD) measurement is supported or not, that is, whether serving as a single antenna of the transmitting side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of arrival (AOA) measurement and serving as the transmitting side for the angle of departure (AOD) measurement are supported or not, for example, a code 'X0X1' indicates that serving as the transmitting side for the angle of arrival (AOA) measurement is supported and serving as the transmitting side for the angle of departure (AOD) measurement is not supported, a code 'X1X1' indicates that serving as the transmitting side for the angle of arrival (AOA) measurement is supported and serving as the transmitting side for the angle of departure (AOD) measurement is supported, a code 'X1X0' indicates that serving as the transmitting side for the angle of arrival (AOA) measurement is not supported and serving as the transmitting side for the angle of departure (AOD) measurement is supported, and a code 'X0X0' indicates that serving as the transmitting side for the angle of arrival (AOA) measurement is not supported and serving as the transmitting side for the angle of departure (AOD) measurement is not supported; and certainly, in the angle measuring capability information, pre-set character keywords may be adopted for indicating whether serving as the transmitting side for the angle of arrival (AOA) measurement and serving as the transmitting side for the angle of departure (AOD) measurement are supported or not, such as 'supporting AOA transmitting and AOD transmitting', and 'not supporting AOA transmitting and AOD transmitting', etc.

7) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of arrival (AOA) measurement and serving as the receiving side for the angle of departure (AOD) measurement are supported or not, for example, a code '0XX1' indicates that serving as the transmitting side for the angle of arrival (AOA) measurement is supported and serving as the receiving side for the angle of departure (AOD) measurement is not supported, a code '1XX1' indicates that serving as the transmitting side for the angle of arrival (AOA) measurement is supported and serving as the receiving side for the angle of departure (AOD) measurement is supported, a code '1XX0' indicates that serving as the transmitting side for the angle of arrival (AOA) measurement is not supported and serving as the receiving side for the angle of departure (AOD) measurement is supported, and a code '0XX0' indicates that serving as the transmitting side for the angle of arrival (AOA) measurement is not supported and serving as the receiving side for the angle of departure (AOD) measurement is not supported; and certainly, in the angle measuring capability information, pre-set character keywords may be adopted for indicating whether serving as the transmitting side for the angle of arrival (AOA) measurement and serving as the receiving side for the angle of departure (AOD) measurement are supported or not, such as 'supporting AOA transmitting and AOD receiving', and 'not supporting AOA transmitting and AOD receiving', etc.

8) The angle measuring capability information includes whether serving as the transmitting side and the receiving side for the angle of arrival (AOA) measurement is supported or not, and whether serving as the transmitting side and the receiving side for the angle of departure (AOD) measurement is supported or not, that is, whether serving as a single antenna of the transmitting side for the angle of arrival (AOA) measurement and serving as a plurality of antennas of the receiving side are supported or not, and whether serving as a single antenna of the receiving side for the angle of departure (AOD) measurement and serving as a plurality of antennas of the transmitting side are supported or not, etc.

In an example, in the angle measuring capability information, pre-set codes may be adopted for indicating whether serving as the transmitting side and the receiving side for the angle of arrival (AOA) measurement and serving as the transmitting side and the receiving side for the angle of departure (AOD) measurement are supported or not, for example, a code '0001' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is not supported, a code '0011' indicates that serving as the transmitting side and the receiving side for the angle of arrival (AOA) measurement is supported, serving as the receiving side for the angle of departure (AOD) measurement is not supported, and serving as the transmitting side for the angle of departure (AOD) measurement is not supported, a code '1001' indicates that serving as the transmitting side for the angle of arrival (AOA) measurement is supported, serving as the receiving side for the angle of arrival (AOA) measurement is not supported, serving as the receiving side for the angle of departure (AOD) measurement is supported, and serving as the transmitting side for the angle of departure (AOD) measurement is not supported, and a code '0101' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement is supported or not, and whether serving as the transmitting side and the receiving side for the angle of departure (AOD) measurement is supported or not, such as 'supporting AOA transmitting and receiving, and not supporting AOD transmitting and AOD receiving', and 'not supporting AOA transmitting and receiving, and not supporting AOD transmitting and AOD receiving', etc.

9) The angle measuring capability information includes whether serving as the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the receiving side for the angle of arrival (AOA) measurement and serving as the transmitting side for the angle of departure (AOD) measurement are supported or not, for example, a code 'X01X' indicates that serving as the receiving side for the angle of arrival (AOA) measurement is supported and serving as the transmitting side for the angle of departure (AOD) measurement is not supported, a code 'X11X' indicates that serving as the receiving side for the angle of arrival (AOA) measurement is supported and serving as the transmitting side for the angle of departure (AOD) measurement is supported, a code 'X00X' indicates that serving as the receiving side for the angle of arrival (AOA) measurement is not supported and serving as the transmitting side for the angle of departure (AOD) measurement is not supported, and a code 'X10X' indicates that serving as the receiving side for the angle of arrival (AOA) measurement is not supported and serving as the transmitting side for the angle of departure (AOD) measurement is supported; and certainly, in the angle measuring capability information, pre-set character keywords may be adopted for indicating whether serving as the receiving side for the angle of arrival (AOA) measurement and serving as the transmitting side for the angle of departure (AOD) measurement are supported or not, such as 'supporting AOA receiving and AOD transmitting', and 'not supporting AOA receiving and AOD transmitting', etc.

10) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the receiving side for the angle of arrival (AOA) measurement and serving as the receiving side for the angle of departure (AOD) measurement are supported or not, for example, a code '0X1X' indicates that serving as the receiving side for the angle of arrival (AOA) measurement is supported and serving as the receiving side for the angle of departure (AOD) measurement is not supported, a code '0X0X' indicates that serving as the receiving side for the angle of arrival (AOA) measurement is not supported and serving as the receiving side for the angle of departure (AOD) measurement is not supported, a code '1X1X' indicates that serving as the receiving side for the angle of arrival (AOA) measurement is supported and serving as the receiving side for the angle of departure (AOD) measurement is supported, and a code '1X0X' indicates that serving as the receiving side for the angle of arrival (AOA) measurement is not supported and serving as the receiving side for the angle of departure (AOD) measurement is supported; and certainly, in the angle measuring capability information, pre-set character keywords may be adopted for indicating whether serving as the receiving side for the angle of arrival (AOA) measurement and serving as the receiving side for the angle of departure (AOD) measurement are supported or not, such as 'supporting AOA receiving and AOD receiving', and 'not supporting AOA receiving and AOD receiving', etc.

11) The angle measuring capability information includes whether serving as the transmitting side and the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement and serving as a single antenna of the transmitting side are supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the transmitting side for the angle of departure (AOD) measurement are supported or not, for example, a code 'X111' indicates that serving as the receiving side for the angle of arrival (AOA) measurement is supported, serving as the transmitting side for the angle of arrival (AOA) measurement is supported, and serving as the transmitting side for the angle of departure (AOD) measurement is supported, a code 'X011' indicates that serving as the receiving side for the angle of arrival (AOA) measurement is supported, serving as the transmitting side for the angle of arrival (AOA) measurement is supported, and serving as the transmitting side for the angle of departure (AOD) measurement is not supported, a code 'X010' indicates that serving as the receiving side for the angle of arrival (AOA) measurement is supported, serving as the transmitting side for the angle of arrival (AOA) measurement is not supported, and serving as the transmitting side for the angle of departure (AOD) measurement is not supported, and a code 'X101' indicates that serving as the receiving side for the angle of arrival (AOA) measurement is not supported, serving as the transmitting side for the angle of arrival (AOA) measurement is supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the transmitting side for the angle of departure (AOD) measurement are supported or not, such as 'supporting AOA receiving and transmitting, and supporting AOD transmitting', and 'not supporting AOA receiving, and supporting AOA transmitting and AOD transmitting', etc.

12) The angle measuring capability information includes whether serving as the transmitting side and the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement and serving as a single antenna of the transmitting side are supported or not, and whether serving as a single antenna of the receiving side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the receiving side for the angle of departure (AOD) measurement are supported or not, for example, a code '1X11' indicates that serving as the receiving side for the angle of arrival (AOA) measurement is supported, serving as the transmitting side for the angle of arrival (AOA) measurement is supported, and serving as the receiving side for the angle of departure (AOD) measurement is supported, a code '0X11' indicates that serving as the receiving side for the angle of arrival (AOA) measurement is supported, serving as the transmitting side for the angle of arrival (AOA) measurement is supported, and serving as the receiving side for the angle of departure (AOD) measurement is not supported, '1X01' indicates that serving as the receiving side for the angle of arrival (AOA) measurement is not supported, serving as the transmitting side for the angle of arrival (AOA) measurement is supported, and serving as the receiving side for the angle of departure (AOD) measurement is supported, and '1X00' indicates that serving as the receiving side for the angle of arrival (AOA) measurement is not supported, serving as the transmitting side for the angle of arrival (AOA) measurement is not supported, and serving as the receiving side for the angle of departure (AOD) measurement is supported; and certainly, in the angle measuring capability information, pre-set character keywords may be adopted for indicating whether serving as the transmitting side and the receiving side for the angle of arrival (AOA)

measurement and serving as the receiving side for the angle of departure (AOD) measurement are supported or not, such as 'supporting AOA receiving and transmitting, and supporting AOD receiving', and 'not supporting AOA receiving, and supporting AOA transmitting and AOD receiving', etc.

13) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the receiving side for the angle of arrival (AOA) measurement and serving as the transmitting side and the receiving side for the angle of departure (AOD) measurement are supported or not, for example, a code '111X' indicates that serving as the receiving side for the angle of arrival (AOA) measurement is supported, serving as the transmitting side for the angle of departure (AOD) measurement is supported, and serving as the receiving side for the angle of departure (AOD) measurement is supported, a code '011X' indicates that serving as the receiving side for the angle of arrival (AOA) measurement is supported, serving as the transmitting side for the angle of departure (AOD) measurement is supported, and serving as the receiving side for the angle of departure (AOD) measurement is not supported, a code '100X' indicates that serving as the receiving side for the angle of arrival (AOA) measurement is not supported, serving as the transmitting side for the angle of departure (AOD) measurement is not supported, and serving as the receiving side for the angle of departure (AOD) measurement is supported, and a code '000X' indicates that serving as the receiving side for the angle of arrival (AOA) measurement is not supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the receiving side for the angle of arrival (AOA) measurement is supported or not, and whether serving as the transmitting side and the receiving side for the angle of departure (AOD) measurement is supported or not, such as 'supporting AOA receiving, and supporting AOD transmitting and receiving', and 'supporting AOA receiving, and not supporting AOD transmitting and AOD receiving', etc.

14) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the transmitting side for the angle of arrival (AOA) measurement and serving as the transmitting side and the receiving side for the angle of departure (AOD) measurement are supported or not, for example, a code '11X1' indicates that serving as the transmitting side for the angle of arrival (AOA) measurement is supported, serving as the transmitting side for the angle of departure (AOD) measurement is supported, and serving as the receiving side for the angle of departure (AOD) measurement is supported, a code '10X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is supported, a code '01X1' indicates that serving as the transmitting side for the angle of arrival (AOA) measurement is supported, serving as the transmitting side for the angle of departure (AOD) measurement is supported, and serving as the receiving side for the angle of departure (AOD) measurement is not supported, and a code '00X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the transmitting side for the angle of arrival (AOA) measurement is supported or not, and whether serving as the transmitting side and the receiving side for the angle of departure (AOD) measurement is supported or not, such as 'supporting AOA transmitting, and supporting AOD transmitting and receiving', and 'supporting AOA transmitting, and not supporting AOD transmitting and AOD receiving', etc.

15) The angle measuring capability information includes whether serving as the transmitting side for the angle of departure (AOD) measurement is supported or not, and whether serving as the receiving side for the angle of departure (AOD) measurement is supported or not, that is, whether a plurality of antennas of the transmitting side for the angle of departure (AOD) measurement are provided or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of departure (AOD) measurement and serving as the receiving side for the angle of departure (AOD) measurement are supported or not, for example, a code '01XX' indicates that serving as the transmitting side for the angle of departure (AOD) measurement is supported and serving as the receiving side for the angle of departure (AOD) measurement is not supported, a code '11XX' indicates that serving as the transmitting side for the angle of departure (AOD) measurement is supported and serving as the receiving side for the angle of departure (AOD) measurement is supported, a code '10XX' indicates that serving as the transmitting side for the angle of departure (AOD) measurement is not supported and serving as the receiving side for the angle of departure (AOD) measurement is supported, and a code '00XX' indicates that serving as the transmitting side for the angle of departure (AOD) measurement is not supported and serving as the receiving side for the angle of departure (AOD) measurement is not supported; and certainly, in the angle measuring capability information, pre-set character keywords may be adopted for indicating whether serving as the transmitting side for the angle of departure (AOD) measurement is supported or not, and whether serving as the receiving side for the angle of departure (AOD) measurement is supported or not, such as 'supporting AOD transmitting and receiving', and 'not supporting AOD transmitting, and supporting AOD receiving', etc.

Further, in an example, the specific angle measuring processing manner is negotiated and determined according to the angle measuring capability information of the first terminal and the second terminal, and results of the negotiation and determination may include, but is not limited to, the following results:

1) the angle measuring capability information of the first terminal is supporting serving as the receiving side for the angle of arrival (AOA) measurement, not supporting serving as the transmitting side for the angle of arrival (AOA) measurement, and not supporting serving as the transmitting side and the receiving side for the angle of departure (AOD) measurement, and the angle measuring capability information of the second terminal is supporting serving as the transmitting side for the angle of arrival (AOA) measurement.

Then the angle measuring processing manner in the example is that the first terminal serves as the receiving side for the angle of arrival (AOA) measurement, and the second terminal serves as the transmitting side for the angle of arrival (AOA) measurement.

2) The angle measuring capability information of the first terminal is supporting serving as the receiving side for the angle of arrival (AOA) measurement, supporting serving as the transmitting side for the angle of arrival (AOA) measurement, and not supporting serving as the transmitting side and the receiving side for the angle of departure (AOD) measurement, and the angle measuring capability information of the second terminal is supporting serving as the transmitting side for the angle of arrival (AOA) measurement, and not supporting serving as the receiving side for the angle of arrival (AOA) measurement.

Then the angle measuring processing manner in the example is that the first terminal serves as the receiving side for the angle of arrival (AOA) measurement, and the second terminal serves as the transmitting side for the angle of arrival (AOA) measurement.

3) The angle measuring capability information of the first terminal is supporting serving as the receiving side for the angle of arrival (AOA) measurement, supporting serving as the transmitting side for the angle of arrival (AOA) measurement, and supporting serving as the transmitting side and the receiving side for the angle of departure (AOD) measurement, and the angle measuring capability information of the second terminal is supporting serving as the transmitting side for the angle of arrival (AOA) measurement, supporting serving as the receiving side for the angle of arrival (AOA) measurement, and not supporting serving as the transmitting side and the receiving side for the angle of arrival (AOA) measurement.

Then the angle measuring processing manner in the example is that the first terminal serves as the receiving side for the angle of arrival (AOA) measurement, and the second terminal serves as the transmitting side for the angle of arrival (AOA) measurement.

Or, the angle measuring processing manner in the example is that the first terminal serves as the transmitting side for the angle of arrival (AOA) measurement, and the second terminal serves as the receiving side for the angle of arrival (AOA) measurement.

4) The angle measuring capability information of the first terminal is not supporting serving as the receiving side for the angle of arrival (AOA) measurement, not supporting serving as the transmitting side for the angle of arrival (AOA) measurement, and supporting serving as the transmitting side and the receiving side for the angle of departure (AOD) measurement, and the angle measuring capability information of the second terminal is supporting serving as the receiving side for the angle of arrival (AOA) measurement, and supporting serving as the transmitting side for the angle of departure (AOD) measurement.

Then the angle measuring processing manner in the example is that the first terminal serves as the receiving side for the angle of departure (AOD) measurement, and the second terminal serves as the transmitting side for the angle of departure (AOD) measurement.

Or, the angle measuring processing manner in the example is that the first terminal serves as the transmitting side for the angle of departure (AOD) measurement, and the second terminal serves as the receiving side for the angle of departure (AOD) measurement.

5) The angle measuring capability information of the first terminal is not supporting serving as the receiving side for the angle of arrival (AOA) measurement, not supporting serving as the transmitting side for the angle of arrival (AOA) measurement, and supporting serving as the transmitting side and the receiving side for the angle of departure (AOD) measurement, and the angle measuring capability information of the second terminal is not supporting serving as the receiving side for the angle of departure (AOD) measurement, and supporting serving as the transmitting side for the angle of departure (AOD) measurement.

Then the angle measuring processing manner in the example is that the first terminal serves as the receiving side for the angle of departure (AOD) measurement, and the second terminal serves as the transmitting side for the angle of departure (AOD) measurement.

6) The angle measuring capability information of the first terminal is supporting serving as the receiving side for the angle of arrival (AOA) measurement, supporting serving as the transmitting side for the angle of arrival (AOA) measurement, and supporting serving as the transmitting side and the receiving side for the angle of departure (AOD) measurement, and the angle measuring capability information of the second terminal is supporting serving as the receiving side for the angle of departure (AOD) measurement, supporting serving as the transmitting side for the angle of departure (AOD) measurement, and supporting serving as the transmitting side and the receiving side for the angle of arrival (AOA) measurement.

Then the angle measuring processing manner in the example is that the first terminal serves as the receiving side for the angle of departure (AOD) measurement, and the second terminal serves as the transmitting side for the angle of departure (AOD) measurement.

Or, the angle measuring processing manner in the example is that the first terminal serves as the transmitting side for the angle of departure (AOD) measurement, and the second terminal serves as the receiving side for the angle of departure (AOD) measurement.

Or, the angle measuring processing manner in the example is that the first terminal serves as the transmitting side for the angle of arrival (AOA) measurement, and the second terminal serves as the receiving side for the angle of arrival (AOA) measurement.

Or, the angle measuring processing manner in the example is that the first terminal serves as the receiving side for the angle of arrival (AOA) measurement, and the second terminal serves as the transmitting side for the angle of arrival (AOA) measurement.

In conclusion, according to the angle measuring processing method in the examples of the present disclosure, after receiving the angle measuring capability request message transmitted by the first terminal, the second terminal feeds back the response message carrying angle measuring capability information of the second terminal to the first terminal, and therefore, angle measuring processing between the first terminal and the second terminal on the basis of a manner of interactive handshake is realized, the manner of the angle measuring processing is expanded, and the flexibility of the angle measuring processing is improved.

In an actual execution process, in order to increase efficiency of the angle measuring negotiation, in some possible examples, the angle measuring manner of the second terminal and the corresponding subject type are directly specified, where the angle measuring manner may be AOA or AOD, and the subject type may be the receiving side or the transmitting side in the corresponding angle measuring manner, therefore, if the second terminal supports the corresponding specified angle measuring manner and the corresponding subject type, the corresponding angle measuring negotiation is directly completed, so that the efficiency of the angle measuring is greatly increased.

Figure 11:
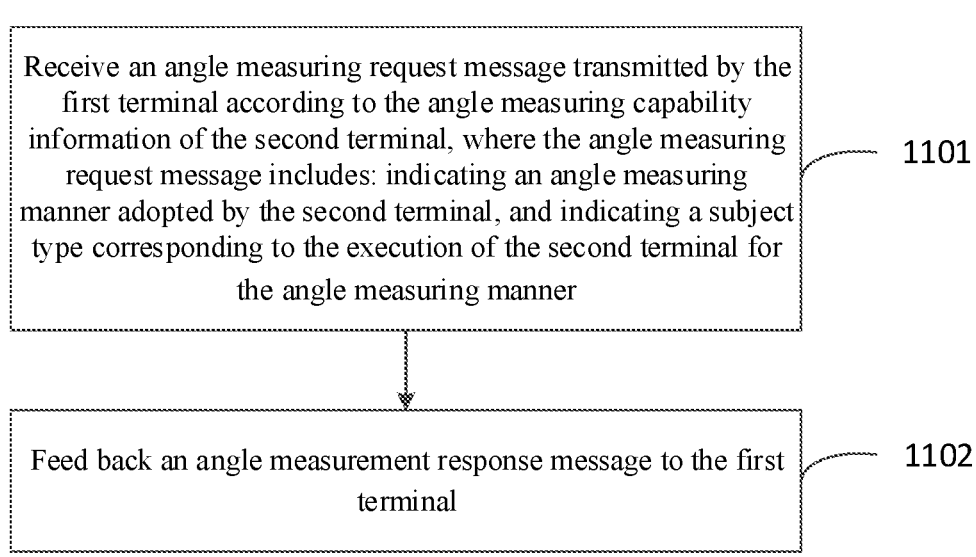
FIG. 11 is a flow diagram of an angle measuring processing method according to still another example of the present disclosure.

FIG. 11 is a flow diagram of an angle measuring processing method according to yet another example of the present disclosure, and as shown in FIG. 11, the method includes:

step 1101, receiving an angle measuring request message transmitted by the first terminal according to the angle measuring capability information of the second terminal, where the angle measuring request message includes: indicating an angle measuring manner adopted by the second terminal, and indicating a subject type corresponding to the execution of the second terminal for the angle measuring manner.

The angle measuring capability information in the example may include but is not limited to the following manners:

1) the angle measuring capability information includes whether serving as the transmitting side for the angle of arrival (AOA) measurement is supported or not, that is, whether serving as a single antenna of the transmitting side for the angle of arrival (AOA) measurement is supported or not, etc.

In an example, in the angle measuring capability information, pre-set codes may be adopted for indicating whether serving as the transmitting side for the angle of arrival (AOA) measurement is supported or not, for example, a code 'XXX1' indicates that serving as the transmitting side for the angle of arrival (AOA) measurement is supported, and a code 'XXX0' indicates that serving as the transmitting side for the angle of arrival (AOA) measurement is not supported; and certainly, in the angle measuring capability information, pre-set character keywords may be adopted for indicating whether serving as the transmitting side for the angle of arrival (AOA) measurement is supported or not, such as 'supporting AOA transmitting', and 'not supporting AOA transmitting', etc.

2) The angle measuring capability information includes whether serving as the receiving side for the angle of arrival (AOA) measurement is supported or not, that is, whether serving as a plurality of antennas of the receiving side for the angle of arrival (AOA) measurement is supported or not, etc.

In an example, in the angle measuring capability information, pre-set codes may be adopted for indicating whether serving as the receiving side for the angle of arrival (AOA) measurement is supported or not, for example, a code 'XXIX' indicates that serving as the receiving side for the angle of arrival (AOA) measurement is supported, and a code 'XX0X' indicates that serving as the receiving side for the angle of arrival (AOA) measurement is not supported; and certainly, in the angle measuring capability information, pre-set character keywords may be adopted for indicating whether serving as the receiving side for the angle of arrival (AOA) measurement is supported or not, such as 'supporting AOA receiving', and 'not supporting AOA receiving', etc.

3) The angle measuring capability information includes whether serving as the transmitting side for the angle of departure (AOD) measurement is supported or not, that is, whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of departure (AOD) measurement is supported or not, for example, a code 'X1XX' indicates that serving as the transmitting side for the angle of departure (AOD) measurement is supported, and a code 'X0XX' indicates that serving as the transmitting side for the angle of departure (AOD) measurement is not supported; and certainly, in the angle measuring capability information, pre-set character keywords may be adopted for indicating whether serving as the transmitting side for the angle of departure (AOD) measurement is supported or not, such as 'supporting AOD transmitting', and 'not supporting AOD transmitting', etc.

4) The angle measuring capability information includes whether serving as the receiving side for the angle of departure (AOD) measurement is supported or not, that is, whether serving as a single antenna of the receiving side for the angle of departure (AOD) measurement is supported or not, etc.

In an example, in the angle measuring capability information, pre-set codes may be adopted for indicating whether serving as the receiving side for the angle of departure (AOD) measurement is supported or not, for example, a code '1XXX' indicates that serving as the receiving side for the angle of departure (AOD) measurement is supported, and a code '0XXX' indicates that serving as the receiving side for the angle of departure (AOD) measurement is not supported; and certainly, in the angle measuring capability information, pre-set character keywords may be adopted for indicating whether serving as the receiving side for the angle of departure (AOD) measurement is supported or not, such as 'supporting AOD receiving', and 'not supporting AOD receiving', etc.

5) The angle measuring capability information includes whether serving as the transmitting side for the angle of arrival (AOA) measurement is supported or not, and whether serving as the receiving side for the angle of arrival (AOA) measurement is supported or not, that is, whether serving as a single antenna of the transmitting side for the angle of arrival (AOA) measurement is supported or not, and whether serving as a plurality of antennas of the receiving side for the angle of arrival (AOA) measurement is supported or not, etc.

In an example, in the angle measuring capability information, pre-set codes may be adopted for indicating whether serving as the transmitting side for the angle of arrival (AOA) measurement and serving as the receiving side for the angle of arrival (AOA) measurement are supported or not, for example, a code 'XX01' indicates that serving as the transmitting side for the angle of arrival (AOA) measurement is supported and serving as the receiving side for the angle of arrival (AOA) measurement is not supported, a code 'XX11' indicates that serving as the transmitting side for the angle of arrival (AOA) measurement is supported and serving as the receiving side for the angle of arrival (AOA) measurement is supported, a code 'XX10' indicates that serving as the transmitting side for the angle of arrival (AOA) measurement is not supported and serving as the receiving side for the angle of arrival (AOA) measurement is supported, and a code 'XX00' indicates that serving as the transmitting side for the angle of arrival (AOA) measurement is not supported and serving as the receiving side for the angle of arrival (AOA) measurement is not supported; and certainly, in the angle measuring capability information, pre-set character keywords may be adopted for indicating whether serving as the transmitting side for the angle of arrival (AOA) measurement and serving as the receiving side for the angle of arrival (AOA) measurement are supported or not, such as 'supporting AOA transmitting and receiving', and 'not supporting AOA transmitting and supporting AOA receiving', etc.

6) The angle measuring capability information includes whether serving as the transmitting side for the angle of arrival (AOA) measurement is supported or not, and whether serving as the transmitting side for the angle of departure (AOD) measurement is supported or not, that is, whether serving as a single antenna of the transmitting side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side for the angle of arrival (AOA) measurement and serving as the transmitting side for the angle of departure (AOD) measurement are supported or not, for example, a code 'X0X1' indicates that serving as the transmitting side for the angle of arrival (AOA) measurement is supported and serving as the transmitting side for the angle of departure (AOD) measurement is not supported, a code 'X1X1' indicates that serving as the transmitting side for the angle of arrival (AOA) measurement is supported and serving as the transmitting side for the angle of departure (AOD) measurement is supported, a code 'X1X0' indicates that serving as the transmitting side for the angle of arrival (AOA) measurement is not supported and serving as the transmitting side for the angle of departure (AOD) measurement is supported, and a code 'X0X0' indicates that serving as the transmitting side for the angle of arrival (AOA) measurement is not supported and serving as the transmitting side for the angle of departure (AOD) measurement is not supported; and certainly, in the angle measuring capability information, pre-set character keywords may be adopted for indicating whether serving as the transmitting side for the angle of arrival (AOA) measurement and serving as the transmitting side for the angle of departure (AOD) measurement are supported or not, such as 'supporting AOA transmitting and AOD transmitting', and 'not supporting AOA transmitting and AOD transmitting', etc.

7) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of arrival (AOA) measurement and serving as the receiving side for the angle of departure (AOD) measurement are supported or not, for example, a code '0XX1' indicates that serving as the transmitting side for the angle of arrival (AOA) measurement is supported and serving as the receiving side for the angle of departure (AOD) measurement is not supported, a code '1XX1' indicates that serving as the transmitting side for the angle of arrival (AOA) measurement is supported and serving as the receiving side for the angle of departure (AOD) measurement is supported, a code '1XX0' indicates that serving as the transmitting side for the angle of arrival (AOA) measurement is not supported and serving as the receiving side for the angle of departure (AOD) measurement is supported, and a code '0XX0' indicates that serving as the transmitting side for the angle of arrival (AOA) measurement is not supported and serving as the receiving side for the angle of departure (AOD) measurement is not supported; and certainly, in the angle measuring capability information, pre-set character keywords may be adopted for indicating whether serving as the transmitting side for the angle of arrival (AOA) measurement and serving as the receiving side for the angle of departure (AOD) measurement are supported or not, such as 'supporting AOA transmitting and AOD receiving', and 'not supporting AOA transmitting and AOD receiving', etc.

8) The angle measuring capability information includes whether serving as the transmitting side and the receiving side for the angle of arrival (AOA) measurement is supported or not, and whether serving as the transmitting side and the receiving side for the angle of departure (AOD) measurement is supported or not, that is, whether serving as a single antenna of the transmitting side for the angle of arrival (AOA) measurement and serving as a plurality of antennas of the receiving side are supported or not, and whether serving as a single antenna of the receiving side for the angle of departure (AOD) measurement and serving as a plurality of antennas of the transmitting side are supported or not, etc.

In an example, in the angle measuring capability information, pre-set codes may be adopted for indicating whether serving as the transmitting side and the receiving side for the angle of arrival (AOA) measurement and serving as the transmitting side and the receiving side for the angle of departure (AOD) measurement are supported or not, for example, a code '0001' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is not supported, a code '0011' indicates that serving as the transmitting side and the receiving side for the angle of arrival (AOA) measurement is supported, serving as the receiving side for the angle of departure (AOD) measurement is not supported, and serving as the transmitting side for the angle of departure (AOD) measurement is not supported, a code '1001' indicates that serving as the transmitting side for the angle of arrival (AOA) measurement is supported, serving as the receiving side for the angle of arrival (AOA) measurement is not supported, serving as the receiving side for the angle of departure (AOD) measurement is supported, and serving as the transmitting side for the angle of departure (AOD) measurement is not supported, and a code '0101' indicates that serving as the transmitting side for the angle of arrival (AOA) measurement is supported, serving as the receiving side for the angle of arrival (AOA) measurement is not supported, serving as the receiving side for the angle of departure (AOD) measurement is not supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement is supported or not, and whether serving as the transmitting side and the receiving side for the angle of departure (AOD) measurement is supported or not, such as 'supporting AOA transmitting and receiving, and not supporting AOD transmitting and AOD receiving', and 'not supporting AOA transmitting and receiving, and not supporting AOD transmitting and AOD receiving', etc.

9) The angle measuring capability information includes whether serving as the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement is supported or not, and whether serving as a plurality of antennas of the transmitting side for the angle of departure (AOD) measurement is supported or not, etc.

In an example, in the angle measuring capability information, pre-set codes may be adopted for indicating whether serving as the receiving side for the angle of arrival (AOA) measurement and serving as the transmitting side for the angle of departure (AOD) measurement are supported or not, for example, a code 'X01X' indicates that serving as the receiving side for the angle of arrival (AOA) measurement is supported and serving as the transmitting side for the angle of departure (AOD) measurement is not supported, a code 'X11X' indicates that serving as the receiving side for the angle of arrival (AOA) measurement is supported and serving as the transmitting side for the angle of departure (AOD) measurement is supported, a code 'X00X' indicates that serving as the receiving side for the angle of arrival (AOA) measurement is not supported and serving as the transmitting side for the angle of departure (AOD) measurement is not supported, and a code 'X10X' indicates that serving as the receiving side for the angle of arrival (AOA) measurement is not supported and serving as the transmitting side for the angle of departure (AOD) measurement is supported; and certainly, in the angle measuring capability information, pre-set character keywords may be adopted for indicating whether serving as the receiving side for the angle of arrival (AOA) measurement and serving as the transmitting side for the angle of departure (AOD) measurement are supported or not, such as 'supporting AOA receiving and AOD transmitting', and 'not supporting AOA receiving and AOD transmitting', etc.

10) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement is supported or not, etc.

In an example, in the angle measuring capability information, pre-set codes may be adopted for indicating whether serving as the receiving side for the angle of arrival (AOA) measurement and serving as the receiving side for the angle of departure (AOD) measurement are supported or not, for example, a code '0X1X' indicates that serving as the receiving side for the angle of arrival (AOA) measurement is supported and serving as the receiving side for the angle of departure (AOD) measurement is not supported, a code '0X0X' indicates that serving as the receiving side for the angle of arrival (AOA) measurement is not supported and serving as the receiving side for the angle of departure (AOD) measurement is not supported, a code '1X1X' indicates that serving as the receiving side for the angle of arrival (AOA) measurement is supported and serving as the receiving side for the angle of departure (AOD) measurement is supported, and a code '1X0X' indicates that serving as the receiving side for the angle of arrival (AOA) measurement is not supported and serving as the receiving side for the angle of departure (AOD) measurement is supported; and certainly, in the angle measuring capability information, pre-set character keywords may be adopted for indicating whether serving as the receiving side for the angle of arrival (AOA) measurement and serving as the receiving side for the angle of departure (AOD) measurement are supported or not, such as 'supporting AOA receiving and AOD receiving', and 'not supporting AOA receiving and AOD receiving', etc.

11) The angle measuring capability information includes whether serving as the transmitting side and the receiving side for the angle of arrival (AOA) measurement is supported or not, and whether serving as the transmitting side for the angle of departure (AOD) measurement is supported or not, that is, whether serving as a plurality of antennas of the receiving side for the angle of arrival (AOA) measurement and serving as a single antenna of the transmitting side are supported or not, and whether serving as a plurality of antennas of the transmitting side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the transmitting side for the angle of departure (AOD) measurement are supported or not, for example, a code 'X111' indicates that serving as the receiving side for the angle of arrival (AOA) measurement is supported, serving as the transmitting side for the angle of arrival (AOA) measurement is supported, and serving as the transmitting side for the angle of departure (AOD) measurement is supported, a code 'X011' indicates that serving as the receiving side for the angle of arrival (AOA) measurement is supported, serving as the transmitting side for the angle of arrival (AOA) measurement is supported, and serving as the transmitting side for the angle of departure (AOD) measurement is not supported, a code 'X010' indicates that serving as the receiving side for the angle of arrival (AOA) measurement is supported, serving as the transmitting side for the angle of arrival (AOA) measurement is not supported, and serving as the transmitting side for the angle of departure (AOD) measurement is not supported, and a code 'X101' indicates that serving as the receiving side for the angle of arrival (AOA) measurement is not supported, serving as the transmitting side for the angle of arrival (AOA) measurement is supported, and serving as the transmitting side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the transmitting side for the angle of departure (AOD) measurement are supported or not, such as 'supporting AOA receiving and transmitting, and supporting AOD transmitting', and 'not supporting AOA receiving, and supporting AOA transmitting and AOD transmitting', etc.

12) The angle measuring capability information includes whether serving as the transmitting side and the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement and serving as a single antenna of the transmitting side are supported or not, and whether serving as a single antenna of the receiving side for the angle of departure (AOD) measurement is supported or not, etc.

In an example, in the angle measuring capability information, pre-set codes may be adopted for indicating whether serving as the transmitting side and the receiving side for the angle of arrival (AOA) measurement and serving as the receiving side for the angle of departure (AOD) measurement are supported or not, for example, a code '1X11' indicates that serving as the receiving side for the angle of arrival (AOA) measurement is supported, serving as the transmitting side for the angle of arrival (AOA) measurement is supported, and serving as the receiving side for the angle of departure (AOD) measurement is supported, a code '0X11' indicates that serving as the receiving side for the angle of arrival (AOA) measurement is supported, serving as the transmitting side for the angle of arrival (AOA) measurement is supported, and serving as the receiving side for the angle of departure (AOD) measurement is not supported, '1X01' indicates that serving as the receiving side for the angle of arrival (AOA) measurement is not supported, serving as the transmitting side for the angle of arrival (AOA) measurement is supported, and serving as the receiving side for the angle of departure (AOD) measurement is supported, and '1X00' indicates that serving as the receiving side for the angle of arrival (AOA) measurement is not supported, serving as the transmitting side for the angle of arrival (AOA) measurement is not supported, and serving as the receiving side for the angle of departure (AOD) measurement is supported; and certainly, in the angle measuring capability information, pre-set character keywords may be adopted for indicating whether serving as the transmitting side and the receiving side for the angle of arrival (AOA) measurement and serving as the receiving side for the angle of departure (AOD) measurement are supported or not, such as 'supporting AOA receiving and transmitting, and supporting AOD receiving', and 'not supporting AOA receiving, and supporting AOA transmitting and AOD receiving', etc.

13) The angle measuring capability information includes whether serving as the receiving side for the angle of arrival (AOA) measurement is supported or not, and whether serving as the receiving side for the angle of departure (AOD) measurement is supported or not, that is, whether serving as a plurality of antennas of the receiving side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the receiving side for the angle of arrival (AOA) measurement and serving as the transmitting side and the receiving side for the angle of departure (AOD) measurement are supported or not, for example, a code '111X' indicates that serving as the receiving side for the angle of arrival (AOA) measurement is supported, serving as the transmitting side for the angle of departure (AOD) measurement is supported, and serving as the receiving side for the angle of departure (AOD) measurement is supported, a code '011X' indicates that serving as the receiving side for the angle of arrival (AOA) measurement is supported, serving as the transmitting side for the angle of departure (AOD) measurement is supported, and serving as the receiving side for the angle of departure (AOD) measurement is not supported, a code '100X' indicates that serving as the receiving side for the angle of arrival (AOA) measurement is not supported, serving as the transmitting side for the angle of departure (AOD) measurement is not supported, and serving as the receiving side for the angle of departure (AOD) measurement is supported, and a code '000X' indicates that serving as the receiving side for the angle of arrival (AOA) measurement is not supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the receiving side for the angle of arrival (AOA) measurement is supported or not, and whether serving as the transmitting side and the receiving side for the angle of departure (AOD) measurement is supported or not, such as 'supporting AOA receiving, and supporting AOD transmitting and receiving', and 'supporting AOA receiving, and not supporting AOD transmitting and AOD receiving', etc.

14) The angle measuring capability information includes whether serving as the transmitting side for the angle of arrival (AOA) measurement is supported or not, and whether serving as the receiving side for the angle of departure (AOD) measurement is supported or not, that is, whether serving as a single antenna of the transmitting side for the angle of arrival (AOA) measurement is supported or not, and whether serving as a single antenna of the receiving side for the angle of departure (AOD) measurement and serving as a plurality of antennas of a plurality of the transmitting sides are supported or not, etc.

In an example, in the angle measuring capability information, pre-set codes may be adopted for indicating whether serving as the transmitting side for the angle of arrival (AOA) measurement and serving as the transmitting side and the receiving side for the angle of departure (AOD) measurement are supported or not, for example, a code '11X1' indicates that serving as the transmitting side for the angle of arrival (AOA) measurement is supported, serving as the transmitting side for the angle of departure (AOD) measurement is supported, and serving as the receiving side for the angle of departure (AOD) measurement is supported, a code '10X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is supported, a code '01X1' indicates that serving as the transmitting side for the angle of arrival (AOA) measurement is supported, serving as the transmitting side for the angle of departure (AOD) measurement is supported, and serving as the receiving side for the angle of departure (AOD) measurement is not supported, and a code '00X1' indicates that serving as the transmitting side for the angle of arrival (AOA) measurement is supported, serving as the transmitting side for the angle of departure (AOD) measurement is not supported, and serving as the receiving side for the angle of departure (AOD) measurement is not supported; and certainly, in the angle measuring capability information, pre-set character keywords may be adopted for indicating whether serving as the transmitting side for the angle of arrival (AOA) measurement is supported or not, and whether serving as the transmitting side and the receiving side for the angle of departure (AOD) measurement is supported or not, such as 'supporting AOA transmitting, and supporting AOD transmitting and receiving', and 'supporting AOA transmitting, and not supporting AOD transmitting and AOD receiving', etc.

15) The angle measuring capability information includes whether serving as the transmitting side for the angle of departure (AOD) measurement is supported or not, and whether serving as the receiving side for the angle of departure (AOD) measurement is supported or not, that is, whether serving as a plurality of antennas of the transmitting side for the angle of departure (AOD) measurement is supported or not, and whether serving as a single antenna of the receiving side for the angle of departure (AOD) measurement is supported or not, etc.

In an example, in the angle measuring capability information, pre-set codes may be adopted for indicating whether serving as the transmitting side for the angle of departure (AOD) measurement and serving as the receiving side for the angle of departure (AOD) measurement are supported or not, for example, a code '01XX' indicates that serving as the transmitting side for the angle of departure (AOD) measurement is supported and serving as the receiving side for the angle of departure (AOD) measurement is not supported, a code '11XX' indicates that serving as the transmitting side for the angle of departure (AOD) measurement is supported and serving as the receiving side for the angle of departure (AOD) measurement is supported, a code '10XX' indicates that serving as the transmitting side for the angle of departure (AOD) measurement is not supported and serving as the receiving side for the angle of departure (AOD) measurement is supported, and a code '00XX' indicates that serving as the transmitting side for the angle of departure (AOD) measurement is not supported and serving as the receiving side for the angle of departure (AOD) measurement is not supported; and certainly, in the angle measuring capability information, pre-set character keywords may be adopted for indicating whether serving as the transmitting side for the angle of departure (AOD) measurement is supported or not, and whether serving as the receiving side for the angle of departure (AOD) measurement is supported or not, such as 'supporting AOD transmitting and receiving', and 'not supporting AOD transmitting, and supporting AOD receiving', etc.

In an example, the first terminal directly transmits an angle measuring request message to the second terminal according to the angle measuring capability information of the second terminal, where the angle measuring request message includes indicating an angle measuring manner adopted by the second terminal, and indicating a subject type corresponding to the execution of the second terminal for the angle measuring manner.

Alternatively, there may be the following possibilities for the first terminal directly transmitting an angle measuring request message to the second terminal according to the angle measuring capability information of the second terminal:

1) in response to indicating the angle measuring manner adopted by the second terminal to be the AOA measurement, the indicated subject type corresponding to the execution of the second terminal for the angle measuring manner includes: the transmitting side for the AOA measurement, or the receiving side for the AOA measurement.

2) In response to indicating the angle measuring manner adopted by the second terminal to be the AOD measurement, the indicated subject type corresponding to the execution of the second terminal for the angle measuring manner includes: the transmitting side for the AOD measurement, or the receiving side for the AOD measurement.

3) In response to indicating the angle measuring manner adopted by the second terminal to be the AOA measurement and the AOD measurement, the indicated subject type corresponding to the execution of the second terminal for the angle measuring manner includes: the transmitting side for the AOD measurement, or the receiving side for the AOD measurement, or the transmitting side for the AOA measurement, or the receiving side for the AOA measurement.

It needs to be noted that, in the example, the angle measuring request message transmitted to the second terminal according to the angle measuring capability information of the second terminal is certainly compatible with the angle measuring capability of the first terminal, and when the angle measuring capability of the first terminal only supports one subject type of one angle measuring manner, on the premise that the second terminal meets the corresponding angle measuring capability, the angle measuring request message transmitted to the second terminal certainly includes an opposite subject type of the angle measuring manner supported by the first terminal; when the angle measuring capability of the first terminal supports one subject type of all the angle measuring manners, on the premise that the second terminal meets the corresponding angle measuring capability, the angle measuring request message transmitted to the second terminal at least includes the subject types which cannot be supported by the first terminal in any angle measuring manner; and certainly, if the angle measuring capability of the first terminal supports all the subject types of all the angle measuring manners, on the premise that the second terminal meets the corresponding angle measuring capability, the angle measuring request message transmitted to the second terminal may include any angle measuring manner and the corresponding subject type.

For example, when the angle measuring manner corresponding to the angle measuring capability information of the first terminal is supporting serving as the transmitting side for the angle of arrival (AOA) measurement, and the angle measuring capability information of the second terminal is supporting serving as the transmitting side and the receiving side for the angle of arrival (AOA) measurement, the angle measuring request message transmitted to the second terminal includes indicating the angle measuring manner executed by the second terminal to be the angle of arrival (AOA) measurement, and the corresponding subject type is the receiving side.

Step 1102, feeding back an angle measuring response message to the first terminal.

In an example, the second terminal directly feeds back the angle measuring response message to the first terminal, so that the first terminal specifically determines the angle measuring manner with the second terminal according to the angle measuring response message, where the angle measuring response message may include applying the angle measuring manner, etc, and in response to applying an angle measuring response manner, determination for the angle measuring manner of the first terminal and the second terminal is directly completed, so that the efficiency of the angle measuring negotiation is increased.

It needs to be noted that, in the example, the content of the angle measuring response message fed back by the second terminal to the first terminal may refer to the detailed description of the above examples, and will not be repeated here.

In conclusion, according to the angle measuring processing in the examples of the present disclosure, the angle measuring type of the second terminal, and the corresponding subject type, which are directly indicated by the first terminal according to the angle measuring capability information of the second terminal, are received, and renegotiation for determining the corresponding angle measuring type and the corresponding subject type according to the angle measuring capability information fed back by the second terminal is avoided, so that the efficiency of the angle measuring negotiation is increased.

Figure 12:
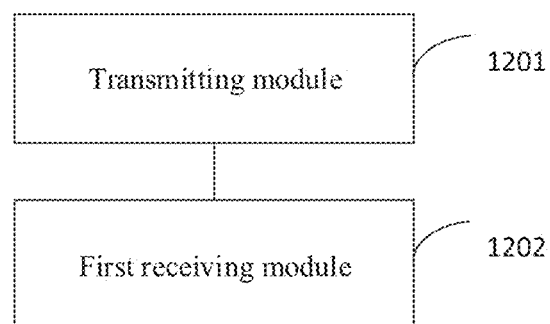
FIG. 12 is a structural schematic diagram of an angle measuring processing apparatus according to an example of the present disclosure.

By corresponding to the angle measuring processing methods provided by the above examples, the present disclosure further provides an angle measuring processing apparatus, and the angle measuring processing apparatus provided by the example of the present disclosure corresponds to the angle measuring processing methods provided by the above examples, therefore, the implementation manners in the angle measuring processing method are also applicable to the angle measuring processing apparatus provided by the example, and will not be described in detail in one example. FIG. 12 is a structural schematic diagram of an angle measuring processing apparatus according the present disclosure.

FIG. 12 is a structural schematic diagram of an angle measuring processing apparatus according to an example of the present disclosure, the apparatus is applied to a first terminal, and as shown in FIG. 12, the angle measuring processing apparatus includes: a transmitting module 1201 and a first receiving module 1202, where the transmitting module 1201 is used for transmitting an angle measuring capability request message to a second terminal; and the first receiving module 1202 is used for receiving a response message carrying angle measuring capability information of the second terminal and fed back by the second terminal.

In conclusion, according to the angle measuring processing apparatus in the examples of the present disclosure, the first terminal transmits the angle measuring capability request message to the second terminal, the first terminal receives the response message carrying angle measuring capability information of the second terminal and fed back by the second terminal, and therefore, angle measuring processing between the first terminal and the second terminal on the basis of a manner of interactive handshake is realized, the manner of the angle measuring processing is expanded, and the flexibility of the angle measuring processing is improved.

Figure 13:
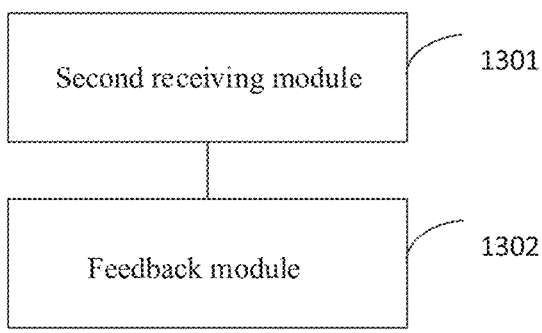
FIG. 13 is a structural schematic diagram of an angle measuring processing apparatus according to another example of the present disclosure.

By corresponding to the angle measuring processing methods provided by the above examples, the present disclosure further provides an angle measuring processing apparatus, and the angle measuring processing apparatus provided by the example of the present disclosure corresponds to the angle measuring processing methods provided by the above examples, therefore, the implementation manners in the angle measuring processing method are also applicable to the angle measuring processing apparatus provided by the example, and will not be described in detail in one example. FIG. 13 is a structural schematic diagram of another angle measuring processing apparatus according the present disclosure.

FIG. 13 is a structural schematic diagram of another angle measuring processing apparatus provided according the present disclosure, the apparatus is applied to a second terminal, and as shown in FIG. 13, the angle measuring processing apparatus includes: a second receiving module 1301 and a feedback module 1302, where the second receiving module 1301 is used for receiving an angle measuring capability request message transmitted by a first terminal; and the feedback module 1302 is used for feeding back a response message carrying angle measuring capability information of the second terminal to the first terminal.

In conclusion, according to the angle measuring processing apparatus in the examples of the present disclosure, the second terminal receives the angle measuring capability request message transmitted by the first terminal, and feeds back the response message carrying angle measuring capability information of the second terminal to the first terminal, and therefore, angle measuring processing between the first terminal and the second terminal on the basis of a manner of interactive handshake is realized, the manner of the angle measuring processing is expanded, and the flexibility of the angle measuring processing is improved.

According to the examples of the present disclosure, the present disclosure further provides a communication device and a non-transitory readable storage medium.

Figure 14:
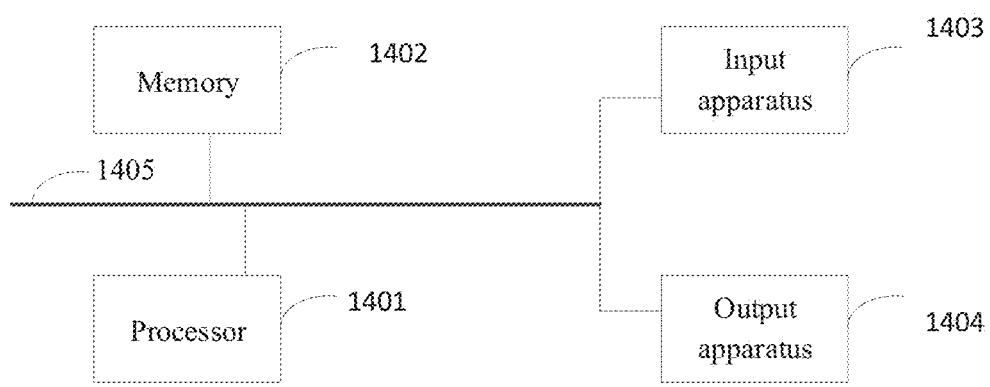
FIG. 14 is a structural block diagram of a communication device according to an example of the present disclosure.

FIG. 14 is a block diagram of a communication device for angle measuring processing according to an example of the present disclosure. The communication device is intended to represent digital computers in various forms, such as a laptop computer, a desktop computer, a workstation, a personal digital assistant, a server, a blade server, a mainframe computer, and other suitable computers. The communication device may further represent mobile apparatuses in various forms, such as a personal digital assistant, a cellular phone, a smart phone, a wearable device, and other similar computing apparatuses. The components shown herein, connections and relationships thereof, and functions thereof are merely examples, and are not intended to limit the realization of the present disclosure described and/or required herein.

As shown in FIG. 14, the communication device includes: one or more processors 1401, a memory 1402, and interfaces used for connecting the components, including high-speed interfaces and low-speed interfaces. The components are connected with each other by virtue of different buses, and may be installed on a common motherboard or may be installed in other manners as needed. The processor may process instructions executed within the communication device, including instructions stored in the memory or on the memory to display graphical information of a GUI on an external input/output apparatus (such as a display device coupled to an interface). In other implementation manners, a plurality of the processors and/or a plurality of the buses may be used together with a plurality of the memories and a plurality of the memories as needed. Similarly, a plurality of the communication devices may be connected, and each device provides part of necessary operations (such as serving as a server array, a set of blade servers, or a multi-processor system). One processor 1401 is taken as an example in FIG. 14.

The memory 1402 is a non-transitory computer-readable storage medium provided by the present disclosure. Instructions that may be executed by at least one processor are stored in the memory, so that the at least one processor executes the angle measuring processing method provided by the present disclosure. Computer instructions are stored in the non-transitory computer-readable storage medium of the present disclosure, and used for enabling a computer to execute the angle measuring processing method provided by the present disclosure.

As a non-transitory computer-readable storage medium, the memory 1402 may be used for storing non-instantaneous software programs, non-instantaneous computer-executable programs, and modules, such as program instructions/modules corresponding to the angle measuring processing method in the examples of the present disclosure. By running the non-instantaneous software programs, instructions, and modules stored in the memory 1402, the processor 1401 executes various functional applications and data processing of a server, that is, realizes the angle measuring processing method in the above method examples.

The memory 1402 may include a program storage area and a data storage area, where application programs required by an operating system and at least one function may be stored in the program storage area; and data created according to usage of a positioning communication device, etc may be stored in the data storage area. In addition, the memory 1402 may include a high-speed random access memory, and may further include a non-instantaneous memory, such as at least one magnetic disk storage device, a flash memory device, or other non-instantaneous solid-state storage devices. Alternatively, the memory 1402 may include memories which are remotely arranged relative to the processor 1401, and the remote memories may be connected to the positioning communication device through a network. Examples of the above network include, but are not limited to, the Internet, an enterprise Intranet, a local area network, a mobile communication network, and combinations thereof.

The communication device for executing the angle measuring processing may further include: an input apparatus 1403 and an output apparatus 1404. The processor 1401, the memory 1402, the input apparatus 1403, and the output apparatus 1404 may be connected through a bus or in other manners, and a bus 1405 connection is taken as an example in FIG. 14.

The input apparatus 1403 may receive input digital or character information, and generate key signal input related to user setting and function control of the positioning communication device, and may be a touch screen, a keypad, a mouse, a trackpad, a touchpad, an indicator rod, one or more mouse buttons, a trackball, a joystick, etc. The output apparatus 1404 may include a display device, an auxiliary illumination apparatus (such as an LED), a tactile feedback apparatus (such as a vibration motor), etc. The display device may include, but is not limited to, a liquid crystal display (LCD), a light-emitting diode (LED) display, and a plasma display. In some implementation manners, the display device may be a touch screen.

The implementation manners of the systems and technologies described herein may be realized in a digital electronic circuit system, an integrated circuit system, a dedicated ASIC (application-specific integrated circuit), computer hardware, firmware, software, and/or combinations thereof. The implementation manners may include: being implemented in one or more computer programs, the one or more computer programs may be executed and/or interpreted in a programmable system including at least one programmable processor, and the programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

The computing programs (also known as programs, software, software applications, or codes) include machine instructions of the programmable processor, and may be implemented by virtue of an advanced process and/or an object-oriented programming language, and/or an assembly/machine language. As used therein, the terms 'machine-readable medium' and 'computer-readable medium' refer to any computer program products, devices, and/or apparatuses (such as magnetic disks, optical disks, memories, and programmable logic apparatuses (PLDs)) used for providing the machine instructions and/or data to the programmable processor, and include machine-readable mediums that receive the machine instructions which are taken as machine-readable signals. The term 'machine-readable signal' refers to any signal used for providing the machine instructions and/or data to the programmable processor.

In order to provide interaction with a user, the systems and technologies described herein may be implemented in a computer, the computer is provided with: a display apparatus (such as a CRT (cathode ray tube) or an LCD (liquid crystal display) monitor) used for displaying information to the user; and a keyboard and a pointing apparatus (such as a mouse or a trackball), and the user may provide input to the computer through the keyboard and the pointing apparatus. Other types of apparatuses may also be used for providing interaction with the user; for example, feedback provided to the user may be sensory feedback in any form (such as visual feedback, auditory feedback, or tactile feedback); and the input of the user may be received in any form (including vocal input, speech input, or tactile input).

The systems and technologies described herein may be implemented in a computing system (for example, as a data server) including a background component, or a computing system (for example, an application server) including a middleware component, or a computing system (for example, a user computer with a graphical user interface or a web browser through which the user may interact with the implementation manners of the systems and technologies described herein) including a front-end component, or a computing system including any combination of the background component, the middleware component, or the front-end component. The components of the system may be connected with each other through digital data communication (for example, a communication network) in any form or medium. Examples of the communication network include: a local area network (LAN), a wide area network (WAN), and the Internet.

The computer system may include a client and a server. The client and the server are generally far away from each other and usually interact through the communications network. A relationship between the client and the server is generated by computer programs running in respective computers and having a client-server relationship with each other.

According to the angle measuring processing apparatus in the examples of the present disclosure, the second terminal receives the angle measuring capability request message transmitted by the first terminal, and feeds back the response message carrying angle measuring capability information of the second terminal to the first terminal, and therefore, angle measuring processing between the first terminal and the second terminal on the basis of a manner of interactive handshake is realized, the manner of the angle measuring processing is expanded, and the flexibility of the angle measuring processing is improved.

It needs to be understood that, the steps may be reordered, added, or deleted by using the flows in various forms, which are shown above. For example, the steps recorded in the present application may be executed in parallel, or in sequence, or in different orders, as long as the expected results of the technical solution provided by the present disclosure can be realized, which is not limited herein.

The above specific implementation manners do not constitute a limitation on the scope of protection of the present disclosure. Those skilled in the art need to understand that, various modifications, combinations, sub-combinations, and substitutions may be made according to design requirements and other factors. Any modifications, equivalent substitutions, and improvements made within the spirit and principles of the present disclosure may be included within the scope of protection of the present disclosure.

What is claimed is:

1. An angle processing method, wherein the angle processing method is performed by a first terminal, and comprises:
    transmitting an angle measuring capability request message to a second terminal;
    receiving a response message from the second terminal, the response message carrying angle measuring capability information of the second terminal,
    wherein the angle measuring capability information comprises one of the following manners, or a combination of a plurality of the following manners simultaneously:
    whether serving as a transmitting side for an angle of arrival (AOA) measurement is supported or not;
    whether serving as a receiving side for an angle of arrival (AOA) measurement is supported or not:
    whether serving as a transmitting side for an angle of departure (AOD) measurement is supported or not; and
    whether serving as a receiving side for an angle of departure (AOD) measurement is supported or not;
    transmitting an angle measuring request message to the second terminal according to the angle measuring capability information of the second terminal, wherein the angle measuring request message comprises: an angle measuring manner for the second terminal indicated by the first terminal, and a subject type corresponding to execution of the second terminal for the angle measuring manner indicated by the first terminal; and
    receiving an angle measuring response message from the second terminal.

2. The angle processing method according to claim 1, wherein the angle measuring capability request message comprises angle measuring capability information of the first terminal.

3. The angle processing method according to claim 1, wherein the angle measuring capability request message comprises a request indication field used for indicating the second terminal to transmit the angle measuring capability information.

4. The angle processing method according to claim 1, wherein
    the angle measuring capability request message and the response message are transmitted by PC5 RRC messages or PC5-S messages.

5. The angle processing method according to claim 4, wherein
    the angle measuring capability request message is transmitted by UECapabilityEnquirySidelink; and
    the response message is transmitted by UECapabilityInformationSidelink.

6. The angle processing method according to claim 1, wherein
    in response to indicating the angle measuring manner for the second terminal is an angle of arrival (AOA) measurement, the indicated subject type corresponding to the execution of the second terminal for the angle measuring manner comprises a transmitting side for the AOA measurement, or a receiving side for the AOA measurement; and
    in response to indicating the angle measuring manner for the second terminal is an angle of departure (AOD) measurement, the indicated subject type corresponding to the execution of the second terminal for the angle measuring manner comprises a transmitting side for the AOD measurement, or a receiving side for the AOD measurement.

7. The angle processing method according to claim 1, wherein the angle measuring response message fed back by the second terminal comprises:
    applying the angle measuring manner for the second terminal indicated by the first terminal, and applying the subject type corresponding to the execution of the second terminal for the angle measuring manner and indicated by the first terminal.

8. The angle processing method according to claim 1, wherein the angle measuring response message fed back by the second terminal comprises at least one of the following:
    rejecting the angle measuring manner for the second terminal indicated by the first terminal, or rejecting the subject type corresponding to the execution of the second terminal for the angle measuring manner and indicated by the first terminal.

9. The angle processing method according to claim 8, wherein the angle measuring response message fed back by the second terminal further comprises at least one of the following:
    re-indicating the angle measuring manner for the second terminal in a case where the angle measuring response message fed back by the second terminal comprises rejecting the angle measuring manner for the second terminal indicated by the first terminal, or
    re-indicating the subject type corresponding to the execution of the second terminal for the angle measuring manner in a case where the angle measuring response message fed back by the second terminal comprises rejecting the subject type corresponding to the execution of the second terminal for the angle measuring manner and indicated by the first terminal.

10. The angle processing method according to claim 1, wherein the angle measuring response message fed back by the second terminal comprises:
    angle measuring request field information for the first terminal, wherein the angle measuring request field information includes: an angle measuring manner for the first terminal indicated by the second terminal, and a subject type corresponding to execution of the first terminal for the angle measuring manner indicated by the second terminal.

11. The angle processing method according to claim 10, wherein in response to indicating the angle measuring manner for the first terminal is an angle of arrival (AOA) measurement, the indicated subject type corresponding to the execution of the first terminal for the angle measuring manner comprises: a transmitting side for the AOA measurement, or a receiving side for the AOA measurement; and in response to indicating the angle measuring manner for the first terminal is an angle of departure (AOD) measurement, the indicated subject type corresponding to the execution of the first terminal for the angle measuring manner comprises: a transmitting side for the AOD measurement, or a receiving side for the AOD measurement.

12. The angle processing method according to claim 10, further comprising:

transmitting an angle measuring response message to the second terminal according to the angle measuring request field information for the first terminal.

13. The angle processing method according to claim 12, wherein the transmitting the angle measuring response message to the second terminal comprises:

applying the angle measuring manner for the first terminal indicated by the second terminal, and applying the subject type corresponding to the execution of the first terminal for the angle measuring manner and indicated by the second terminal.

14. The angle processing method according to claim 12, wherein the transmitting the angle measuring response message to the second terminal comprises at least one of the following:

rejecting the angle measuring manner for the first terminal indicated by the second terminal, or rejecting the subject type corresponding to the execution of the first terminal for the angle measuring manner and indicated by the second terminal.

15. The angle processing method according to claim 14, wherein the transmitting the angle measuring response message to the second terminal further comprises at least one of the following:

re-indicating the angle measuring manner for the first terminal in a case where the angle measuring response message fed back by the second terminal comprises rejecting the angle measuring manner for the second terminal indicated by the first terminal, or re-indicating the subject type corresponding to the execution of the first terminal for the angle measuring manner in a case where the angle measuring response message fed back by the second terminal comprises rejecting the subject type corresponding to the execution of the second terminal for the angle measuring manner and indicated by the first terminal.

16. An angle processing method, wherein the angle processing method is performed by a second terminal, and comprises:

receiving an angle measuring capability request message transmitted by a first terminal;

feeding back a response message carrying angle measuring capability information of the second terminal to the first terminal, wherein the angle measuring capability information comprises one of the following manners, or a combination of a plurality of the following manners simultaneously:

whether serving as a transmitting side for an angle of arrival (AOA) measurement is supported or not;

whether serving as a receiving side for an angle of arrival (AOA) measurement is supported or not:

whether serving as a transmitting side for an angle of departure (AOD) measurement is supported or not; and whether serving as a receiving side for an angle of departure (AOD) measurement is supported or not;

receiving an angle measuring request message transmitted by the first terminal according to the angle measuring capability information of the second terminal, wherein the angle measuring request message comprises: an angle measuring manner for the second terminal indicated by the first terminal, and a subject type corresponding to execution of the second terminal for the angle measuring manner indicated by the first terminal; and transmitting an angle measuring response message to the first terminal.

17. The angle processing method according to claim 16, further comprising:

receiving an angle measuring request message transmitted by the first terminal according to the angle measuring capability information of the second terminal, wherein the angle measuring request message comprises: an angle measuring manner for the second terminal indicated by the first terminal, and a subject type corresponding to execution of the second terminal for the angle measuring manner indicated by the first terminal; and feeding back an angle measuring response message to the first terminal.

18. A communication device, comprising a processor, a transceiver, a memory, and a computer program stored in the memory, wherein the processor runs the computer program to perform:

transmitting an angle measuring capability request message to a second terminal;

receiving a response message from the second terminal, the response message carrying angle measuring capability information of the second terminal, wherein the angle measuring capability information comprises one of the following manners, or a combination of a plurality of the following manners simultaneously:

whether serving as a transmitting side for an angle of arrival (AOA) measurement is supported or not;

whether serving as a receiving side for an angle of arrival (AOA) measurement is supported or not;

whether serving as a transmitting side for an angle of departure (AOD) measurement is supported or not; and whether serving as a receiving side for an angle of departure (AOD) measurement is supported or not;

transmitting an angle measuring request message to the second terminal according to the angle measuring capability information of the second terminal, wherein the angle measuring request message comprises: an angle measuring manner for the second terminal indicated by the first terminal, and a subject type corresponding to execution of the second terminal for the angle measuring manner indicated by the first terminal; and receiving an angle measuring response message from the second terminal.

* * * * *